US008830277B2

(12) United States Patent
Higashi et al.

(10) Patent No.: US 8,830,277 B2
(45) Date of Patent: Sep. 9, 2014

(54) DRIVING METHOD OF IMAGE DISPLAY DEVICE

(75) Inventors: Amane Higashi, Aichi (JP); Toshiyuki Nagatsuma, Kanagawa (JP); Akira Sakaigawa, Kanagawa (JP); Masaaki Kabe, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 393 days.

(21) Appl. No.: 13/067,616

(22) Filed: Jun. 15, 2011

(65) Prior Publication Data

US 2012/0013649 A1 Jan. 19, 2012

(30) Foreign Application Priority Data

Jul. 16, 2010 (JP) ................................ 2010-161209

(51) Int. Cl.

*G09G 5/10* (2006.01)
*G09G 3/36* (2006.01)
*G09G 3/34* (2006.01)

(52) U.S. Cl.

CPC .......... *G09G 3/3426* (2013.01); *C09G 2340/06* (2013.01); *G09G 3/3648* (2013.01); *G09G 2320/0646* (2013.01); *G09G 2360/145* (2013.01); *G09G 2300/0452* (2013.01)
USPC .......................................... 345/690; 345/204

(58) Field of Classification Search

CPC .................. G09G 2300/0452; G09G 2340/06; G09G 2320/0666; G09G 3/3208; G09G 3/3426; G09G 3/2003; G09G 2320/0242; G09G 2320/043; G09G 2320/046; G09G 2320/064; G09G 2320/0646; G09G 2320/0686; G09G 2320/103; G09G 2340/16
See application file for complete search history.

(56) References Cited

U.S. PATENT DOCUMENTS 7,071,955 B2 7/2006 Miyachi et al.
7,277,075 B1 10/2007 Hirano et al.

(Continued)

FOREIGN PATENT DOCUMENTS

CN 1388499 A 1/2003
CN 101308625 A 11/2008

(Continued)

OTHER PUBLICATIONS

Japanese Office Action issued Jul. 2, 2013 for corresponding Japanese Application No. 2010-161209.

(Continued)

*Primary Examiner* — Srilakshmi K Kumar
*Assistant Examiner* — Damon Treitler
(74) *Attorney, Agent, or Firm* — Rader, Fishman & Grauer PLLC

(57) ABSTRACT

An image display device includes an image display panel configured of pixels made up of first, second, third, and fourth sub-pixels being arrayed in a two-dimensional matrix shape, and a signal processing unit into which an input signal is input and from which an output signal based on an extension coefficient is output, and causes the signal processing unit to obtain a maximum value of luminosity with saturation S in the HSV color space enlarged by adding a fourth color, as a variable, and to obtain a reference extension coefficient based on the maximum value, and further to determine an extension coefficient at each pixel from the reference extension coefficient, an input signal correction coefficient based on the sub-pixel input signal values at each pixel, and an external light intensity correction coefficient based on external light intensity.

1 Claim, 26 Drawing Sheets

(56) References Cited

U.S. PATENT DOCUMENTS

| | | | | |
|---|---|---|---|---|
| 8,194,094 | B2 | 6/2012 | Sakaigawa et al. | |
| 2005/0104840 | A1 | 5/2005 | Sohn et al. | |
| 2006/0262251 | A1 | 11/2006 | Kim et al. | |
| 2008/0284702 | A1 * | 11/2008 | Shidara et al. | 345/90 |
| 2009/0322802 | A1 * | 12/2009 | Noguchi et al. | 345/694 |

FOREIGN PATENT DOCUMENTS

| | | | |
|---|---|---|---|
| JP | 04-130395 | | 5/1992 |
| JP | 2001-147666 | | 5/2001 |
| JP | 2003-052050 | A | 2/2003 |
| JP | 2008-134664 | | 6/2008 |
| JP | 2010-033009 | A | 2/2010 |
| JP | 2010-033014 | A | 2/2010 |
| JP | 2010-091760 | A | 4/2010 |
| WO | WO-2004/086128 | | 10/2004 |

OTHER PUBLICATIONS

Chinese Office Action issued Apr. 25, 2014 for corresponding Chinese Application No. 201110199744.7.

* cited by examiner

DRIVING METHOD OF IMAGE DISPLAY DEVICE

BACKGROUND

The present disclosure relates to a driving method of an image display device.

In recent years, for example, with image display devices such as color liquid crystal display devices and so forth, increase in power consumption along with high performance thereof has become an issue. In particular, along with increased fineness, greater color reproduction range, and increased luminance, power consumption of backlight increases with color liquid crystal display devices for example. In order to solve this problem, a technique has drawn attention wherein in addition to three sub-pixels of a red display sub-pixel for displaying red, a green display sub-pixel for displaying green, and a blue display sub-pixel for displaying blue, for example, a white display sub-pixel for displaying white is added to make up a four-sub-pixel configuration, thereby improving luminance by this white display sub-pixel. High luminance is obtained with the same power consumption as with the related art by the four-sub-pixel configuration, and accordingly, power consumption of backlight can be decreased in the event of employing the same luminance as with the related art, and improvement in display quality can be realized.

Now, for example, a color image display device disclosed in Japanese Patent No. 3167026 includes a unit configured to generate three types of color signals by the three primary additive color method from an input signal, and a unit configured to generate an auxiliary signal obtained by adding each of the color signals of these three hues with the same ratio, and to supply the display signals in total of four types of the auxiliary signal, and the three types of color signals obtained by subtracting the auxiliary signal from the signals of the three hues to a display device. Note that, according to the three types of color signals, the red display sub-pixel, green display sub-pixel, and blue display sub-pixel are driven, and the white display sub-pixel is driven by the auxiliary signal.

Also, with Japanese Patent No. 3805150, there has been disclosed a liquid crystal display device capable of color display having a liquid crystal panel with a sub-pixel for red output, a sub-pixel for green output, a sub-pixel for blue output, and a sub-pixel for luminance serving as one principal pixel unit, including an arithmetic unit configured to obtain a digital value W for driving the sub-pixel for luminance using digital values Ri, Gi, and Bi of the sub-pixel for red input, sub-pixel for green input, sub-pixel for blue input, and sub-pixel for luminance obtained from the input image signal, and digital values Ro, Go, and Bo for driving the sub-pixel for red output, sub-pixel for green output, sub-pixel for blue output, and sub-pixel for luminance, the arithmetic unit obtains each value of the Ro, Go, Bo, and W so as to satisfy the following relationship, $$Ri{:}Gi{:}Bi=(Ro+W){:}(Go+W){:}(Bo+W)$$

and also so as to enhance luminance by addition of the sub-pixel for luminance as compared to a configuration made up of only the sub-pixel for red input, sub-pixel for green input, and sub-pixel for blue input.

Further, with PCT/KR2004/000659, there has been disclosed a liquid crystal display device configured of a first pixel made up of a red display sub-pixel, a green display sub-pixel, and a blue display sub-pixel, and a second pixel made up of a red display sub-pixel, a green display sub-pixel, and a white display sub-pixel, a first pixel and a second pixel are alternately arrayed in a first direction, and also arrayed in a second direction, or alternatively, there has been disclosed a liquid crystal display device wherein a first pixel and a second pixel are alternately arrayed in the first direction, and also in a second direction a first pixel is adjacently arrayed, and moreover, a second pixel is adjacently arrayed.

In the event that external light irradiates an image display device, or in a back lit state (under a bright environment), visibility of an image displayed on the image display device deteriorates. Examples of a method for handling such a phenomenon include a method for changing a tone curve (γ curve). For example, if description will be made with a tone curve as a reference, in the event that output gradation as to input gradation when there is no influence of external light has a relation such as a straight line “A” shown in FIG. 26A, output gradation as to input gradation when there is influence of external light is changed to a relation shown in a curve “B” in FIG. 26A. If this will be described with a γ curve as a reference, in the event that output luminance as to input gradation when there is no influence of external light has a relation such as a curve “A” (γ=2.2) shown in FIG. 26B, output luminance as to input gradation when there is influence of external light is changed to a relation shown in a curve “B” in FIG. 26B. Usually, such change is performed as to each of a red display sub-pixel, a green display sub-pixel, and a blue display sub-pixel making up each pixel.

SUMMARY

As described above, change of output gradation (output luminance) as to input gradation is performed as to each of a red display sub-pixel, a green display sub-pixel, and a blue display sub-pixel making up each pixel based on change of a tone curve (γ curve), and accordingly, a ratio of (luminance of a red display sub-pixel:luminance of a green display sub-pixel:luminance of a blue display sub-pixel) before change, and a ratio of (luminance of a red display sub-pixel:luminance of a green display sub-pixel:luminance of a blue display sub-pixel) after change usually differ. As a result thereof, in general, a problem occurs such that an image after change has a light color and loses contrast feeling as compared to an image before change.

A technique for increasing only luminance while maintaining a ratio of (luminance of a red display sub-pixel:luminance of a green display sub-pixel:luminance of a blue display sub-pixel) has been familiar from Japanese Unexamined Patent Application Publication No. 2008-134664, for example. With this technique, after (RGB) data is converted into (YUV) data, luminance data Y alone is changed, and the (YUV) data is then converted into (RGB) data again, but this causes a problem in that data processing such as conversion is cumbersome, and loss of information, and deterioration in saturation occur due to the conversion. Even with techniques disclosed in Japanese Patent No. 3167026, Japanese Patent No. 3805150, and PCT/KR2004/000659, a problem in that deterioration occurring in image quality is not solved.

Accordingly, it has been found to be desirable to provide an image display device driving method whereby a problem in that visibility of an image displayed on an image display device deteriorates under a bright environment where external light irradiates the image display device, can be solved.

An image display device driving method according to a first mode, a sixth mode, an eleventh mode, a sixteenth mode, or a twenty-first mode of the present disclosure for providing the above-described image display device driving method is a driving method of an image display device including an image display panel configured of pixels being arrayed in a two-dimensional matrix shape, each of which is made up of a first sub-pixel for displaying a first primary color, a second sub-pixel for displaying a second primary color, a third sub-pixel for displaying a third primary color, and a fourth sub-pixel for displaying a fourth color, and a signal processing unit, the method causing the signal processing unit to obtain a first sub-pixel output signal based on at least a first sub-pixel input signal and an extension coefficient $\alpha_0$ to output to the first sub-pixel, to obtain a second sub-pixel output signal based on at least a second sub-pixel input signal and the extension coefficient $\alpha_0$ to output to the second sub-pixel, to obtain a third sub-pixel output signal based on at least a third sub-pixel input signal and the extension coefficient $\alpha_0$ to output to the third sub-pixel, and to obtain a fourth sub-pixel output signal based on the first sub-pixel input signal, the second sub-pixel input signal, and the third sub-pixel input signal to output to the fourth sub-pixel.

An image display device driving method according to a second mode, a seventh mode, a twelfth mode, a seventeenth mode, or a twenty-second mode of the present disclosure for providing the above-described image display device driving method is a driving method of an image display device including an image display panel configured of pixels being arrayed in a two-dimensional matrix shape in a first direction and a second direction, each of which is made up of a first sub-pixel for displaying a first primary color, a second sub-pixel for displaying a second primary color, and a third sub-pixel for displaying a third primary color, a pixel group being made up of at least a first pixel and a second pixel arrayed in the first direction, and a fourth sub-pixel for displaying a fourth color being disposed between a first pixel and a second pixel at each pixel group, and a signal processing unit, the method causing the signal processing unit with regard to a first pixel to obtain a first sub-pixel output signal based on at least a first sub-pixel input signal and an extension coefficient $\alpha_0$ to output to the first sub-pixel, to obtain a second sub-pixel output signal based on at least a second sub-pixel input signal and the extension coefficient $\alpha_0$ to output to the second sub-pixel, and to obtain a third sub-pixel output signal based on at least a third sub-pixel input signal and the extension coefficient $\alpha_0$ to output to the third sub-pixel, and with regard to a second pixel to obtain a first sub-pixel output signal based on at least a first sub-pixel input signal and the extension coefficient $\alpha_0$ to output to the first sub-pixel, to obtain a second sub-pixel output signal based on at least a second sub-pixel input signal and the extension coefficient $\alpha_0$ to output to the second sub-pixel, and to obtain a third sub-pixel output signal based on at least a third sub-pixel input signal and the extension coefficient $\alpha_0$ to output to the third sub-pixel, and with regard to a fourth sub-pixel to obtain a fourth sub-pixel output signal based on a fourth sub-pixel control first signal obtained from the first sub-pixel input signal, the second sub-pixel input signal, and the third sub-pixel input signal as to the first pixel, a fourth sub-pixel control second signal obtained from the first sub-pixel input signal, the second sub-pixel input signal, and the third sub-pixel input signal as to the second pixel, to output the fourth sub-pixel.

An image display device driving method according to a third mode, an eighth mode, a thirteenth mode, an eighteenth mode, or a twenty-third mode of the present disclosure for providing the above-described image display device driving method is a driving method of an image display device including an image display panel configured of pixel groups being arrayed in a two-dimensional matrix shape in total of P×Q pixel groups of P pixel groups in a first direction, and Q pixel groups in a second direction, each pixel group of which is made up of a first pixel and a second pixel in the first direction, where the first pixel is made up of a first sub-pixel for displaying a first primary color, a second sub-pixel for displaying a second primary color, and a third sub-pixel for displaying a third primary color, and the second pixel is made up of a first sub-pixel for displaying a first primary color, a second sub-pixel for displaying a second primary color, and a fourth sub-pixel for displaying a fourth color, and a signal processing unit, the method causing the signal processing unit to obtain a third sub-pixel output signal as to the (p, q)'th (where p=1, 2, . . . , P, q=1, 2, . . . , Q) first pixel at the time of counting in the first direction based on at least a third sub-pixel input signal as to the (p, q)'th first pixel, and a third sub-pixel input signal as to the (p, q)'th second pixel, and an extension coefficient $\alpha_0$ to output the third sub-pixel of the (p, q)'th first pixel, and to obtain a fourth sub-pixel output signal as to the (p, q)'th second pixel based on a fourth sub-pixel control second signal obtained from the first sub-pixel input signal, second sub-pixel input signal, and third sub-pixel input signal as to the (p, q)'th second pixel, a fourth sub-pixel control first signal obtained from a first sub-pixel input signal, a second sub-pixel input signal, and a third sub-pixel input signal as to an adjacent pixel adjacent to the (p, q)'th second pixel in the first direction, and the extension coefficient $\alpha_0$ to output to the fourth sub-pixel of the (p, q)'th second pixel.

An image display device driving method according to a fourth mode, a ninth mode, a fourteenth mode, a nineteenth mode, or a twenty-fourth mode of the present disclosure for providing the above-described image display device driving method is a driving method of an image display device including an image display panel configured of pixels being arrayed in a two-dimensional matrix shape in total of $P_0 \times Q_0$ pixels of $P_0$ pixels in a first direction, and $Q_0$ pixels in a second direction, each pixel of which is made up of a first sub-pixel for displaying a first primary color, a second sub-pixel for displaying a second primary color, a third sub-pixel for displaying a third primary color, and a fourth sub-pixel for displaying a fourth color, and a signal processing unit, the method causing the signal processing unit to obtain a first sub-pixel output signal based on at least a first sub-pixel input signal and an extension coefficient $\alpha_0$ to output to the first sub-pixel, to obtain a second sub-pixel output signal based on at least a second sub-pixel input signal and the extension coefficient $\alpha_0$ to output to the second sub-pixel, to obtain a third sub-pixel output signal based on at least a third sub-pixel input signal and the extension coefficient $\alpha_0$ to output to the third sub-pixel, and to obtain a fourth sub-pixel output signal as to the (p, q)'th (where p=1, 2, . . . , $P_0$, q=1, 2, . . . , $Q_0$) pixel at the time of counting in the second direction based on a fourth sub-pixel control second signal obtained from a first sub-pixel input signal, a second sub-pixel input signal, and a third sub-pixel input signal as to the (p, q)'th pixel, and a fourth sub-pixel control first signal obtained from a first sub-pixel input signal, a second sub-pixel input signal, and a third sub-pixel input signal as to an adjacent pixel adjacent to the (p, q)'th pixel in the second direction to output the fourth sub-pixel of the (p, q)'th pixel.

An image display device driving method according to a fifth mode, a tenth mode, a fifteenth mode, a twentieth mode, or a twenty-fifth mode of the present disclosure for providing the above-described image display device driving method is a driving method of an image display device including an image display panel configured of pixel groups being arrayed in a two-dimensional matrix shape in total of P×Q pixel groups of P pixel groups in a first direction, and Q pixel groups in a second direction, each of which is made up of a first pixel and a second pixel in the first direction, where the first pixel is made up of a first sub-pixel for displaying a first primary color, a second sub-pixel for displaying a second primary color, and a third sub-pixel for displaying a third primary color, and the second pixel is made up of a first sub-pixel for displaying a first primary color, a second sub-pixel for displaying a second primary color, and a fourth sub-pixel for displaying a fourth color, and a signal processing unit, the method causing the signal processing unit to obtain a fourth sub-pixel output signal based on a fourth sub-pixel control second signal obtained from a first sub-pixel input signal a second sub-pixel input signal, and a third sub-pixel input signal as to the (p, q)'th (where p=1, 2, . . . , P, q=1, 2, . . . , Q) second pixel at the time of counting in the second direction, a fourth sub-pixel control first signal obtained from a first sub-pixel input signal, a second sub-pixel input signal, and a third sub-pixel input signal as to an adjacent pixel adjacent to the (p, q)'th second pixel in the second direction, and an extension coefficient $\alpha_0$ to output the fourth sub-pixel of the (p, q)'th second pixel, and to obtain a third sub-pixel output signal based on at least the third sub-pixel input signal as to the (p, q)'th second pixel, and the third sub-pixel input signal as to the (p, q)'th first pixel, and the extension coefficient $\alpha_0$ to output the third sub-pixel of the (p, q)'th first pixel.

The image display device driving methods according to the first mode through the fifth mode of the present disclosure include: obtaining the maximum value $V_{max}$ of luminosity at the signal processing unit with saturation S in the HSV color space enlarged by adding a fourth color, as a variable; obtaining a reference extension coefficient $\alpha_{0\text{-}std}$ at the signal processing unit based on the maximum value $V_{max}$; and determining an extension coefficient $\alpha_0$ at each pixel from the reference extension coefficient $\alpha_{0\text{-}std}$, an input signal correction coefficient based on the sub-pixel input signal values at each pixel, and an external light intensity correction coefficient based on external light intensity.

Here, the saturation S and luminosity V(S) are represented with $$S=(\text{Max}-\text{Min})/\text{Max}$$

$$V(S)=\text{Max}$$

where Max denotes the maximum value of three sub-pixel input signal values of a first sub-pixel input signal value, a second-sub pixel input signal value, and a third sub-pixel input signal value as to a pixel, and Min denotes the minimum value of three sub-pixel input signal values of the first sub-pixel input signal value, the second-sub pixel input signal value, and the third sub-pixel input signal value as to the pixel. Note that the saturation S can take a value from 0 to 1, and the luminosity V(S) can take a value from 0 to $(2^n-1)$, n is the number of display gradation bits, "H" of "HSV color space" means Hue indicating the type of color, "S" means Saturation (Saturation, chromaticity) indicating vividness of a color, and "V" means luminosity (Brightness Value, Lightness Value) indicating brightness of a color. This can be applied to the following description.

Also, the image display device driving methods according to the sixth mode through the tenth mode of the present disclosure include: obtaining a reference extension coefficient $\alpha_{0\text{-}std}$ from the following expression, assuming that the luminance of a group of a first sub-pixel, a second sub-pixel and a third sub-pixel making up a pixel (the sixth mode and ninth mode in the present disclosure) or a pixel group (the seventh mode, eighth mode, and tenth mode in the present disclosure) is $BN_{1\text{-}3}$ at the time of a signal having a value equivalent to the maximum signal value of a first sub-pixel output signal being input to a first sub-pixel, a signal having a value equivalent to the maximum signal value of a second sub-pixel output signal being input to a second sub-pixel, and a signal having a value equivalent to the maximum signal value of a third sub-pixel output signal being input to a third sub-pixel, and assuming that the luminance of the fourth sub-pixel is $BN_4$ at the time of a signal having a value equivalent to the maximum signal value of a fourth sub-pixel output signal being input to a fourth sub-pixel making up a pixel (the sixth mode and ninth mode in the present disclosure) or a pixel group (the seventh mode, eighth mode, and tenth mode in the present disclosure)

$\alpha_{0\text{-}std}=(BN_4/BN_{1\text{-}3})+1$; and determining an extension coefficient $\alpha_0$ at each pixel from the reference extension coefficient $\alpha_{0\text{-}std}$, an input signal correction coefficient based on the sub-pixel input signal values at each pixel, and an external light intensity correction coefficient based on external light intensity. Note that, broadly speaking, these modes can be taken as a mode with the reference extension coefficient $\alpha_{0\text{-}std}$ as a function of $(BN_4/BN_{1\text{-}3})$.

Also, the image display device driving methods according to the eleventh mode through the fifteenth mode of the present disclosure include: determining a reference extension coefficient $\alpha_{0\text{-}std}$ to be less than a predetermined value $\alpha'_{0\text{-}std}$ (e.g., specifically 1.3 or less) when a color defined with (R, G, B) is displayed with a pixel, hue H and saturation S in the HSV color space are defined with the following expressions, and a ratio of pixels satisfying the following ranges as to all the pixels exceeds a predetermined value $\beta'_0$ (e.g., specifically 2%)

$$40\leq H\leq 65$$

$$0.5\leq S\leq 1.0;$$

and determining an extension coefficient $\alpha_0$ at each pixel from the reference extension coefficient $\alpha_{0\text{-}std}$, an input signal correction coefficient based on the sub-pixel input signal values at each pixel, and an external light intensity correction coefficient based on external light intensity. Note that the lower limit value of the reference extension coefficient $\alpha_{0\text{-}std}$ is 1.0. This can be applied to the following description.

Here, with (R, G, B), when the value of R is the maximum, the hue H is represented with $$H=60(G-B)/(\text{Max}-\text{Min}),$$

when the value of G is the maximum, the hue H is represented with $$H=60(B-R)/(\text{Max}-\text{Min})+120,$$

and when the value of B is the maximum, the hue H is represented with $$H=60(R-G)/(\text{Max}-\text{Min})+240,$$

and the saturation S is represented with $$S=(\text{Max}-\text{Min})/\text{Max}$$

where Max denotes the maximum value of three sub-pixel input signal values of a first sub-pixel input signal value, a second-sub pixel input signal value, and a third sub-pixel input signal value as to a pixel, and Min denotes the minimum value of three sub-pixel input signal values of the first sub-pixel input signal value, the second-sub pixel input signal value, and the third sub-pixel input signal value as to the pixel.

Also, the image display device driving methods according to the sixteenth mode through the twentieth mode of the present disclosure include: determining a reference extension coefficient $\alpha_{0\text{-}std}$ to be less than a predetermined value $\alpha'_{0\text{-}std}$ (e.g., specifically 1.3 or less) when a color defined with (R, G, B) is displayed with a pixel, and a ratio of pixels of which the (R, G, B) satisfy the following expressions as to all the pixels exceeds a predetermined value $\beta'_0$ (e.g., specifically 2%); and determining an extension coefficient $\alpha_0$ at each pixel from the reference extension coefficient $\alpha_{0\text{-}std}$, an input signal correction coefficient based on the sub-pixel input signal values at each pixel, and an external light intensity correction coefficient based on external light intensity.

Here, with (R, G, B), this is a case where the value of R is the maximum value, and the value of B is the minimum value, and when the values of R, G, and B satisfy the following $$R \geq 0.78 \times (2^n - 1)$$

$$G \geq (2R/3) + (B/3)$$

$$B \geq 0.50R,$$

or alternatively, with (R, G, B), this is a case where the value of G is the maximum value, and the value of B is the minimum value, and when the values of R, G, and B satisfy the following $$R \geq (4B/60) + (56G/60)$$

$$G \geq 0.78 \times (2^n - 1)$$

$$B \geq 0.50R,$$

where n is the number of display gradation bits.

Also, the image display device driving methods according to the twenty-first mode through the twenty-fifth mode of the present disclosure include: determining a reference extension coefficient $\alpha_{0\text{-}std}$ to be less than a predetermined value (e.g., specifically 1.3 or less) when a ratio of pixels which display yellow as to all the pixels exceeds a predetermined value $\beta'_0$ (e.g., specifically 2%); and determining an extension coefficient $\alpha_0$ at each pixel from the reference extension coefficient $\alpha_{0\text{-}std}$, an input signal correction coefficient based on the sub-pixel input signal values at each pixel, and an external light intensity correction coefficient based on external light intensity.

The image display device driving methods according to the first mode through the twenty-fifth mode of the Present disclosure determine an extension coefficient $\alpha_0$ at each pixel from the reference extension coefficient $\alpha_{0\text{-}std}$, an input signal correction coefficient based on the sub-pixel input signal values at each pixel, and an external light intensity correction coefficient based on external light intensity. Accordingly, a problem in that visibility of an image displayed on an image display device under a bright environment where external light irradiates the image display device, can be solved, and moreover, optimization of luminance at each pixel can be realized.

Also, with the image display device driving methods according to the first mode through the twenty-fifth mode of the present disclosure, the color space (HSV color space) is enlarged by adding the fourth color, and a sub-pixel output signal can be obtained based on at least a sub-pixel input signal and the reference extension coefficient $\alpha_{0\text{-}std}$ and the extension coefficient $\alpha_0$. In this way, an output signal value is extended based on the reference extension coefficient $\alpha_{0\text{-}std}$ and the extension coefficient $\alpha_0$, and accordingly, an arrangement may not be made wherein, like the related art, through the luminance of the white display sub-pixel increases, the luminance of the red display sub-pixel, green display sub-pixel, and blue display sub-pixel does not increase. Specifically, for example, not only the luminance of the white display sub-pixel is increased, but also the luminance of the red display sub-pixel, green display sub-pixel, and blue display sub-pixel is increased. Moreover, a ratio of (luminance of a red display sub-pixel:luminance of a green display sub-pixel: luminance of a blue display sub-pixel) is not changed in principle. Therefore, change in a color can be prevented, and occurrence of a problem such as dullness of a color can be prevented in a sure manner. Note that when the luminance of the white display sub-pixel increases, but the luminance of the red display sub-pixel, green display sub-pixel, and blue display sub-pixel does not increase, dullness of a color occurs. Such a phenomenon is referred to as simultaneous contrast. In particular, occurrence of such phenomenon is marked regarding yellow where visibility is high.

Moreover, with preferred modes of the image display device driving methods according to the first mode through the fifth mode of the present disclosure, the maximum value $V_{max}$ of luminosity with the saturation S serving as a variable is obtained, and further, the reference extension coefficient $\alpha_{0\text{-}std}$ is determined so that a ratio of pixels wherein the value of extended luminosity obtained from product between the luminosity V(S) of each pixel and the reference extension coefficient $\alpha_{0\text{-}std}$ exceeds the maximum value $V_{max}$, as to all the pixels is less than a predetermined value ($\beta_0$). Accordingly, optimization of an output signal as to each sub-pixel can be realized, and occurrence of a phenomenon with marked conspicuous gradation deterioration which causes an unnatural image can be prevented, and on the other hand, increase in luminance can be realized in a sure manner, and reduction of power consumption of the entire image display device assembly in which the image display device has been built can be realized.

Also, with the image display device driving methods according to the sixth mode through the tenth mode of the present disclosure, the reference extension coefficient $\alpha_{0\text{-}std}$ is stipulated as follows $$\alpha_{0\text{-}std} = (BN_4/BN_{1\text{-}3}) + 1,$$

whereby occurrence of a phenomenon with marked conspicuous gradation deterioration, which causes an unnatural image, can be prevented, and on the other hand, increase in luminance can be realized in a sure manner, and reduction of power consumption of the entire image display device assembly in which the image display device has been built can be realized.

According to various experiments, it has been proved that in the event that yellow is greatly mixed in the color of an image, upon the reference extension coefficient $\alpha_{0\text{-}std}$ exceeding a predetermined value $\alpha'_{0\text{-}std}$ (e.g., $\alpha'_{0\text{-}std}=1.3$), the image becomes an unnatural colored image. With the image display device driving methods according to the eleventh mode through the fifteenth mode of the present disclosure, when a ratio of pixels where the hue H and saturation S in the HSV color space are included in a predetermined range as to all of the pixels exceeds a predetermined value $\beta'_0$ (e.g., specifically 2%) (in other words, when yellow is greatly mixed in the color of the image), the reference extension coefficient $\alpha_{0\text{-}std}$ is set to a predetermined value $\alpha'_{0\text{-}std}$ or less (e.g., specifically 1.3 or less). Thus, even in the event that yellow is greatly mixed in the color of the image, optimization of an output signal as to each sub-pixel can be realized, and this image can be prevented from becoming an unnatural image, and on the other hand, increase in luminance can be realized in a sure manner, and reduction of power consumption of the entire image display device assembly in which the image display device has been built can be realized.

Also, with the image display device driving methods according to the sixteenth mode through the twentieth mode of the present disclosure, when a ratio of pixels having particular values as (R, G, B) as to all of the pixels exceeds a predetermined value $\beta_0$ (e.g., specifically 2%) (in other words, when yellow is greatly mixed in the color of the image), the reference extension coefficient $\alpha_{0\text{-}std}$ is set to a predetermined value $\alpha'_{0\text{-}std}$ or less (e.g., specifically 1.3 or less). Thus, even in the event that yellow is greatly mixed in the color of the image, optimization of an output signal as to each sub-pixel can be realized, and this image can be prevented from becoming an unnatural image, and on the other hand, increase in luminance can be realized in a sure manner, and reduction of power consumption of the entire image display device assembly in which the image display device has been built can be realized. Moreover, it can be determined with small calculation amount whether or not yellow is greatly mixed in the color of the image, the circuit scale of the signal processing unit can be reduced, and also reduction in computing time can be realized.

Also, with the image display device driving methods according to the twenty-first mode through the twenty-fifth mode of the present disclosure, when a ratio of pixels which display yellow as to all of the pixels exceeds a predetermined value $\beta'_0$ (e.g., specifically 2%), the reference extension coefficient $\alpha_{0\text{-}std}$ is set to a predetermined value or less (e.g., specifically 1.3 or less). Thus as well, optimization of an output signal as to each sub-pixel can be realized, and this image can be prevented from becoming an unnatural image, and on the other hand, increase in luminance can be realized in a sure manner, and reduction of power consumption of the entire image display device assembly in which the image display device has been built can be realized.

Also, the image display device driving methods according to the first mode, sixth mode, eleventh mode, sixteenth mode, and twenty-first mode of the present disclosure can realize increase in the luminance of a display image, and are the most appropriate to image display such as still images, advertising media, standby screen for cellar phones, and so forth, for example. On the other hand, the image display device driving methods according to the first mode, sixth mode, eleventh mode, sixteenth mode, and twenty-first mode of the present disclosure are applied to an image display device assembly driving method, whereby the luminance of a planar light source device can be reduced based on the reference extension coefficient $\alpha_{0\text{-}std}$, and accordingly, reduction in the power consumption of the planar light source device can be realized.

Also, the image display device driving methods according to the second mode, third mode, seventh mode, eighth mode, twelfth mode, thirteenth mode, seventeenth mode, eighteenth mode, twenty-second mode, and twenty-third mode of the present disclosure cause the signal processing unit to obtain the fourth sub-pixel output signal from the first sub-pixel input signal, second sub-pixel input signal, and third sub-pixel input signal as to the first pixel and the second pixel of each pixel group, and output this. That is to say, the fourth sub-pixel output signal is obtained based on the input signals as to the adjacent first and second pixels, and accordingly, optimization of the output signal as to the fourth sub-pixel is realized. More over, with the image display device driving methods according to the second mode, third mode, seventh mode, eighth mode, twelfth mode, thirteenth mode, seventeenth mode, eighteenth mode, twenty-second mode, and twenty-third mode of the present disclosure, a single fourth sub-pixel is disposed as to the pixel group made up of at least the first pixel and the second pixel, and accordingly, reduction in the area of an opening region at a sub-pixel can be suppressed. As a result thereof, increase in luminance can be realized in a sure manner, and improvement in display quality can be realized. Also, the consumption power of backlight can be reduced.

Also, with the image display device driving methods according to the fourth mode, ninth mode, fourteenth mode, nineteenth mode, and twenty-fourth mode of the present disclosure, the fourth sub-pixel output signal as to the (p, q)'th pixel is obtained based on a sub-pixel input signal as to the (p, q)'th pixel, and a sub-pixel input signal as to an adjacent pixel adjacent to the (p, q)'th pixel in the second direction. That is to say, a fourth sub-pixel output signal as to a certain pixel is obtained based on an input signal as to an adjacent pixel adjacent to this certain pixel, and accordingly, optimization of an output signal as to the fourth sub-pixel is realized. Also, according to the fourth sub-pixel being provided, increase in luminance can be realized in a sure manner, and also improvement in display quality can be realized.

Also, with the image display device driving methods according to the fifth mode, tenth mode, fifteenth mode, twentieth mode, and twenty-fifth mode of the present disclosure, the fourth sub-pixel output signal as to the (p, q)'th second pixel is obtained based on a sub-pixel input signal as to the (p, q)'th second pixel, and a sub-pixel input signal as to an adjacent pixel adjacent to this second pixel in the second direction. That is to say, the fourth sub-pixel output signal as to the second pixel making up a certain pixel group is obtained based on not only an input signal as to the second pixel making up this certain pixel group but also an input signal as to an adjacent pixel adjacent to this second pixel, and accordingly, optimization of an output signal as to the fourth sub-pixel is realized. Moreover, a single fourth sub-pixel is disposed as to a pixel group made up of the first pixel and the second pixel, and accordingly, reduction in the area of an opening region in a sub-pixel can be suppressed. As a result thereof, increase in luminance can be realized in a sure manner, and also improvement in display quality can be realized.

DETAILED DESCRIPTION OF EMBODIMENTS

Figure 1:
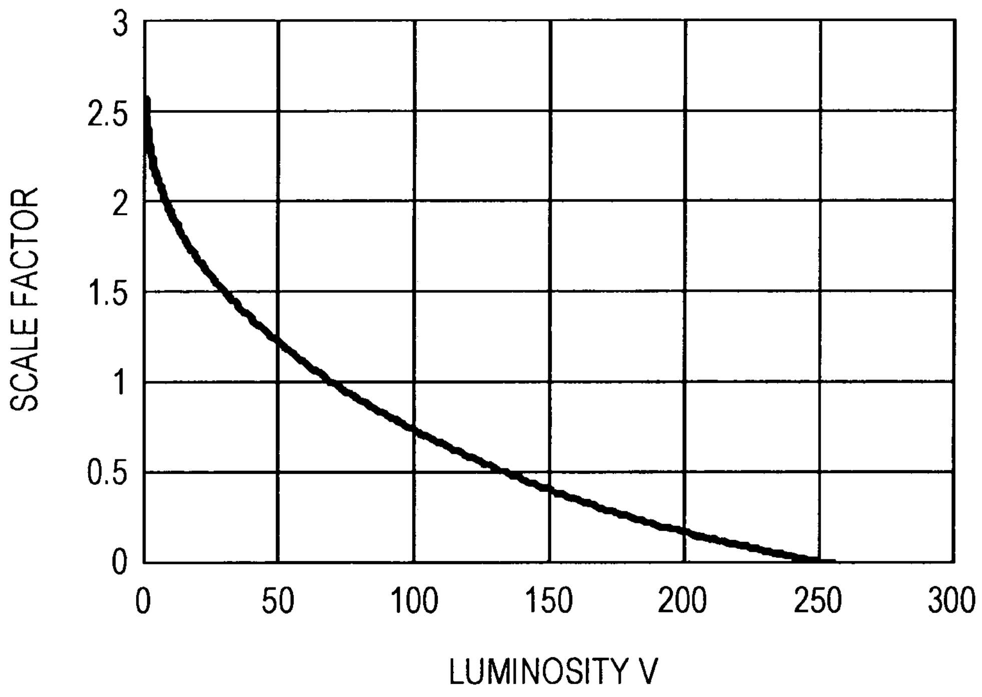
FIG. 1 is a schematic graph of an input signal correction coefficient represented with a function with luminosity at each pixel serving as a parameter.

Hereafter, the present disclosure will be described based on embodiments with reference to the drawings, but the present disclosure is not restricted to the embodiments, various numeric values and materials according to the embodiments are examples. Note that description will be made in accordance with the following sequence.

1. General Description Relating to Image Display Device Driving Method According to First Mode Through Twenty-fifth Mode
2. First Embodiment (Image Display Device Driving Method According to First Mode, Sixth Mode, Eleventh Mode, Sixteenth Mode, and Twenty-first Mode of Present Disclosure)
3. Second Embodiment (Modification of First Embodiment)
4. Third Embodiment (Another Modification of First Embodiment)
5. Fourth Embodiment (Image Display Device Driving Method According to Second Mode, Seventh Mode, Twelfth Mode, Seventeenth Mode, and Twenty-second Mode of Present Disclosure)
6. Fifth Embodiment (Modification of Fourth Embodiment)
7. Sixth Embodiment (Another Modification of Fourth Embodiment)
8. Seventh Embodiment (Image Display Device Driving Method According to Third Mode, Eighth Mode, Thirteenth Mode, Eighteenth Mode, and Twenty-third Mode of Present Disclosure)
9. Eighth Embodiment (Modification of Seventh Embodiment)
10. Ninth Embodiment (Image Display Device Driving Method According to Fourth Mode, Ninth Mode, Fourteenth Mode, Nineteenth Mode, and Twenty-fourth Mode of Present Disclosure)
11. Tenth Embodiment (Image Display Device Driving Method According to Fifth Mode, Tenth Mode, Fifteenth Mode, Twentieth Mode, and Twenty-fifth Mode of Present Disclosure) and ETC.

General Description Relating to Image Display Device Driving Method According to First Mode Through Twenty-fifth Mode The image display device assembly according to the image display device assembly driving methods according to the first mode through the twenty-fifth mode for providing a desirable image display device driving method is the above-described image display devices according to the first mode through the twenty-fifth mode of the present disclosure, and an image display device assembly including a planar light source device which irradiates the image display devices from behind. The image display device driving methods according to the first mode through the twenty-fifth mode of the present disclosure can be applied to the image display device assembly driving methods according to the first mode through the twenty-fifth mode.

Now, the image display device driving method according to the first mode and the image display device assembly driving method according to the first mode including the above preferred mode, the image display device driving method according to the sixth mode and the image display device assembly driving method according to the sixth mode including the above preferred mode, the image display device driving method according to the eleventh mode and the image display device assembly driving method according to the eleventh mode including the above preferred mode, the image display device driving method according to the sixteenth mode and the image display device assembly driving method according to the sixteenth mode including the above preferred mode, and the image display device driving method according to the twenty-first mode and the image display device assembly driving method according to the twenty-first mode including the above preferred mode will collectively simply be referred to as "driving method according to the first mode and so forth of the present disclosure". Also, the image display device driving method according to the second mode and the image display device assembly driving method according to the second mode including the above preferred mode, the image display device driving method according to the seventh mode and the image display device assembly driving method according to the seventh mode including the above preferred mode, the image display device driving method according to the twelfth mode and the image display device assembly driving method according to the twelfth mode including the above preferred mode, the image display device driving method according to the seventeenth mode and the image display device assembly driving method according to the seventeenth mode including the above preferred mode, and the image display device driving method according to the twenty-second mode and the image display device assembly driving method according to the twenty-second mode including the above preferred mode will collectively simply be referred to as "driving method according to the second mode and so forth of the present disclosure". Further, the image display device driving method according to the third mode and the image display device assembly driving method according to the third mode including the above preferred mode, the image display device driving method according to the eighth mode and the image display device assembly driving method according to the eighth mode including the above preferred mode, the image display device driving method according to the thirteenth mode and the image display device assembly driving method according to the thirteenth mode including the above preferred mode, the image display device driving method according to the eighteenth mode and the image display device assembly driving method according to the eighteenth mode including the above preferred mode, and the image display device driving method according to the twenty-third mode and the image display device assembly driving method according to the twenty-third mode including the above preferred mode will collectively simply be referred to as "driving method according to the third mode and so forth of the present disclosure". Also, the image display device driving method according to the fourth mode and the image display device assembly driving method according to the fourth mode including the above preferred mode, the image display device driving method according to the ninth mode and the image display device assembly driving method according to the ninth mode including the above preferred mode, the image display device driving method according to the fourteenth mode and the image display device assembly driving method according to the fourteenth mode including the above preferred mode, the image display device driving method according to the nineteenth mode and the image display device assembly driving method according to the nineteenth mode including the above preferred mode, and the image display device driving method according to the twenty-fourth mode and the image display device assembly driving method according to the twenty-fourth mode including the above preferred mode will collectively simply be referred to as "driving method according to the fourth mode and so forth of the present disclosure". Further, the image display device driving method according to the fifth mode and the image display device assembly driving method according to the fifth mode including the above preferred mode, the image display device driving method according to the tenth mode and the image display device assembly driving method according to the tenth mode including the above preferred mode, the image display device driving method according to the fifteenth mode and the image display device assembly driving method according to the fifteenth mode including the above preferred mode, the image display device driving method according to the twentieth mode and the image display device assembly driving method according to the twentieth mode including the above preferred mode, and the image display device driving method according to the twenty-fifth mode and the image display device assembly driving method according to the twenty-fifth mode including the above preferred mode will collectively simply be referred to as "driving method according to the fifth mode and so forth of the present disclosure". Further, the image display device driving methods according to the first mode through the twenty-fifth mode and the image display device assembly driving methods according to the first mode through the twenty-fifth mode including the above-described preferred mode will collectively referred to simply as "driving method of the present disclosure".

With the driving method of the present disclosure, the extension coefficient $\alpha_0$ at each pixel is determined from the reference extension coefficient $\alpha_{0\text{-}std}$, an input signal correction coefficient $k_{IS}$ based on sub-pixel inputs signal values at each pixel, and an external light intensity correction coefficient $k_{OL}$ based on external light intensity, but determination factors are not restricted to these, and for example, the extension coefficient $\alpha_0$ may be determined from a relation such as $$\alpha_0=\alpha_{0\text{-}std}\times(k_{IS}\times k_{OL}+1).$$

Here, the input signal correction coefficient $k_{IS}$ can be represented with a function with sub-pixel input signal values at each pixel serving as parameters, and specifically, a function with luminosity V(S) at each pixel serving as a parameter, for example. More specifically, for example, there can be exemplified a function wherein the value of the input signal correction coefficient $k_{IS}$ is the minimum value (e.g., "0") when the value of the luminosity V(S) is the maximum value, and the value of the input signal correction coefficient $k_{IS}$ is the maximum value when the value of the luminosity V(S) is the minimum value, and an upward protruding function wherein the value of the input signal correction coefficient $k_{IS}$ is the minimum value (e.g., "0") when the value of the luminosity V(S) is the maximum value and the minimum value. Also, the external light intensity correction coefficient $k_{OL}$ is a constant depending on external light intensity, and for example, the value of the external light intensity correction coefficient $k_{OL}$ is increased under an environment where the sunlight in the summer is strong, and the value of the external light intensity correction coefficient $k_{OL}$ is decreased under an environment where the sunlight is weak or an indoor environment. The value of the external light intensity correction coefficient $k_{OL}$ may be selected by the user of the image display device using a changeover switch or the like provided to the image display device, for example, or an arrangement may be made wherein external light intensity is measured by an optical sensor provided to the image display device, and the image display device selects the value of the external light intensity correction coefficient $k_{OL}$ based on the result thereof. A function of the input signal correction coefficient $k_{IS}$ is suitably selected, whereby increase in the luminance of a pixel from intermediate gradation to low gradation can be realized for example, and on the other hand, gradation deterioration at pixels of high gradation can be suppressed, and also a signal exceeding the maximum luminance can be prevented from being output to a pixel of high gradation, or alternatively, for example, change (increase or decrease) of the contrast of a pixel having intermediate gradation can be obtained, and additionally, the value of the external light intensity correction coefficient $k_{OL}$ is suitably selected, and accordingly, correction according to external light intensity can be performed, and visibility of an image displayed on the image display device can be prevented in a surer manner from deteriorating due to environment light being changed.

With the driving method according to the first mode and so forth of the present disclosure, the reference extension coefficient $\alpha_{0\text{-}std}$ is obtained based on the maximum value $V_{max}$, but specifically, of the values of $V_{max}/V(S)$ obtained at multiple pixels, the reference extension coefficient $\alpha_{0\text{-}std}$ can be obtained based on at least one value. Here, the $V_{max}$ means the maximum value of the V(S) obtained at multiple pixels, as described above. More specifically, this may be taken as a mode wherein of the values of $V_{max}/V(S)$ [≡α(S)] obtained at multiple pixels, the minimum value ($\alpha_{min}$) is taken as the reference extension coefficient $\alpha_{0\text{-}std}$. Alternatively, though depending on the image to be displayed, for example, of $(1\pm0.4)\cdot\alpha_{min}$, one of the values may be taken as the reference extension coefficient $\alpha_{0\text{-}std}$. Also, the reference extension coefficient $\alpha_{0\text{-}std}$ may be obtained based on one value (e.g., the minimum value $\alpha_{min}$), or an arrangement may be made wherein multiple values α(S) are obtained in order from the minimum value, a mean value ($\alpha_{ave}$) of these values is taken as the reference extension coefficient $\alpha_{0\text{-}std}$, or further, a mean value of multiple values of $(1\pm0.4)\cdot\alpha_{ave}$ may be taken as the reference extension coefficient $\alpha_{0\text{-}std}$. Alternatively, in the event that the number of pixels at the time of obtaining multiple values α(S) in order from the minimum value is less than a predetermined number, multiple values α(S) may be obtained again in order from the minimum value after changing the number of the multiple values. Alternatively, the reference extension coefficient $\alpha_{0\text{-}std}$ may be determined such that a ratio of pixels wherein the value of extended luminosity obtained from product between luminosity V(S) and the reference extension coefficient $\alpha_{0\text{-}std}$ exceeds the maximum value $V_{max}$, as to all of the pixels is a predetermined value ($\beta_0$) or less. Here, 0.003 through 0.05 may be given as the predetermined value N. Specifically, there can be taken as a mode wherein the reference extension coefficient $\alpha_{0\text{-}std}$ is determined such that a ratio of pixels wherein the value of extended luminosity obtained from product between the luminosity V(S) and the reference extension coefficient $\alpha_{0\text{-}std}$ exceeds the maximum value $V_{max}$ becomes equal to or greater than 0.3% and also equal to or less than 5% as to all of the pixels.

With the driving method according to the first mode and so forth of the present disclosure or the fourth mode and so forth of the present disclosure including the above-described preferred mode, with regard to the (p, q)'th pixel (where $1\leq p\leq P_0$, $1\leq q\leq Q_0$), a first sub-pixel input signal of which the signal value is $x_{1\text{-}(p,q)}$, a second sub-pixel input signal of which the signal value is $x_{2\text{-}(p,q)}$, and a third sub-pixel input signal of which the signal value is $x_{3\text{-}(p,q)}$ are input to the signal processing unit, and the signal processing unit may be configured to output a first sub-pixel output signal for determining the display gradation of a first sub-pixel of which the signal value is $X_{1\text{-}(p,q)}$, to output a second sub-pixel output signal for determining the display gradation of a second sub-pixel of which the signal value is $X_{2\text{-}(p,q)}$, to output a third sub-pixel output signal for determining the display gradation of a third sub-pixel of which the signal value is $X_{3\text{-}(p,q)}$, and to output a fourth sub-pixel output signal for determining the display gradation of a fourth sub-pixel of which the signal value is $X_{4\text{-}(p,q)}$.

Also, the driving method according to the second mode and so forth of the present disclosure, the third mode and so forth of the present disclosure, or the fifth mode and so forth of the present disclosure including the above-described preferred mode, with regard to a first pixel making up the (p, q)'th pixel group (where $1\leq p\leq P$, $1\leq q\leq Q$), a first sub-pixel input signal of which the signal value is $x_{1\text{-}(p,q)\text{-}1}$, a second sub-pixel input signal of which the signal value is $x_{2\text{-}(p,q)\text{-}1}$, and a third sub-pixel input signal of which the signal value is $x_{3\text{-}(p,q)\text{-}1}$ are input to the signal processing unit, and with regard to a second pixel making up the (p, q)'th pixel group, a first sub-pixel input signal of which the signal value is $x_{1\text{-}(p,q)\text{-}2}$, a second sub-pixel input signal of which the signal value is $x_{2\text{-}(p,q)\text{-}2}$, and a third sub-pixel input signal of which the signal value is $x_{3\text{-}(p,q)\text{-}2}$ are input to the signal processing unit, and the signal processing unit outputs, regarding the first pixel making up the (p, q)'th pixel group, a first sub-pixel output signal for determining the display gradation of a first sub-pixel of which the signal value is $X_{1\text{-}(p,q)\text{-}1}$, a second sub-pixel output signal for determining the display gradation of a second sub-pixel of which the signal value is $X_{2\text{-}(p,q)\text{-}1}$, and a third sub-pixel output signal for determining the display gradation of a third sub-pixel of which the signal value is $X_{3\text{-}(p,q)\text{-}1}$, and outputs, regarding the second pixel making up the (p, q)'th pixel group, a first sub-pixel output signal for determining the display gradation of a first sub-pixel of which the signal value is $X_{1\text{-}(p,q)\text{-}2}$, a second sub-pixel output signal for determining the display gradation of a second sub-pixel of which the signal value is $X_{2\text{-}(p,q)\text{-}2}$, and a third sub-pixel output signal for determining the display gradation of a third sub-pixel of which the signal value is $X_{3\text{-}(p,q)\text{-}2}$ (the driving method according to the second mode and so forth of the present disclosure), and outputs, regarding the fourth sub-pixel, a fourth sub-pixel output signal for determining the display gradation of a fourth sub-pixel of which the signal value is $X_{4\text{-}(p,q)\text{-}2}$ (the driving method according to the second mode and so forth, the third mode and so forth, or the fifth mode and so forth of the present disclosure).

Also, with the driving method according to the third mode and so forth of the present disclosure, regarding an adjacent pixel adjacent to the (p, q)'th pixel, a first sub-pixel input signal of which the signal value is $x_{1\text{-}(p',q)}$, a second sub-pixel input signal of which the signal value is $x_{2\text{-}(p',q)}$, and a third sub-pixel input signal of which the signal value is $x_{3\text{-}(p',q)}$ may be arranged to be input to the signal processing unit.

Also, with the driving methods according to the fourth mode and so forth, and the fifth mode and so forth of the present disclosure, regarding an adjacent pixel adjacent to the (p, q)'th pixel, a first sub-pixel input signal of which the signal value is $x_{1\text{-}(p,q')}$, a second sub-pixel input signal of which the signal value is $x_{2\text{-}(p,q')}$, and a third sub-pixel input signal of which the signal value is $x_{3\text{-}(p,q')}$ may be arranged to be input to the signal processing unit.

Further, $Max_{(p,q)}$, $Min_{(p,q)}$, $Max_{(p,q)\text{-}1}$, $Min_{(p,q)\text{-}1}$, $Max_{(p,q)\text{-}2}$, $Min_{(p,q)\text{-}2}$, $Max_{(p',q)\text{-}1}$, $Min_{(p',q)\text{-}1}$, $Max_{(p,q')}$, and $Min_{(p,q')}$, are defined as follows.

$Max_{(p, q)}$: the maximum value of three sub-pixel input signal values of a first sub-pixel input signal value $x_{1-(p, q)}$, a second sub-pixel input signal value $x_{2-(p, q)}$, and a third sub-pixel input signal value $x_{3-(p, q)}$ as to the (p, q)'th pixel $Min_{(p, q)}$: the minimum value of three sub-pixel input signal values of the first sub-pixel input signal value $X_{1-(p, q)}$, the second sub-pixel input signal value $x_{2-(p, q)}$, and the third sub-pixel input signal value $x_{3-(p, q)}$ as to the (p, q)'th pixel $Max_{(p, q)-1}$: the maximum value of three sub-pixel input signal values of a first sub-pixel input signal value $x_{1-(p, q)-1}$, a second sub-pixel input signal value $x_{2-(p, q)-1}$, and a third sub-pixel input signal value $x_{3-(p, q)-1}$ as to the (p, q)'th first pixel $Min_{(p, q)-1}$: the minimum value of three sub-pixel input signal values of the first sub-pixel input signal value $x_{1-(p, q)-1}$, the second sub-pixel input signal value $x_{2-(p, q)-1}$, and the third sub-pixel input signal value $x_{3-(p, q)-1}$ as to the (p, q)'th first pixel $Max_{(p, q)-2}$: the maximum value of three sub-pixel input signal values of a first sub-pixel input signal value $x_{1-(p, q)-2}$, a second sub-pixel input signal value $x_{2-(p, q)-2}$ and a third sub-pixel input signal value $x_{3-(p, q)-2}$ as to the (p, q)'th second pixel $Min_{(p, q)-2}$: the minimum value of three sub-pixel input signal values of the first sub-pixel input signal value $x_{1-(p, q)-2}$, the second sub-pixel input signal value $x_{2-(p, q)-2}$, and the third sub-pixel input signal value $x_{3-(p, q)-2}$ as to the (p, q)'th second pixel $Max_{(p', q)-1}$: the maximum value of three sub-pixel input signal values of a first sub-pixel input signal value $x_{1-(p', q)}$, a second sub-pixel input signal value $x_{2-(p', q)}$, and a third sub-pixel input signal value $x_{3-(p', q)}$ as to an adjacent pixel adjacent to the (p, q)'th second pixel in the first direction $Min_{(p', q)-1}$: the minimum value of three sub-pixel input signal values of the first sub-pixel input signal value $x_{1-(p', q)}$, the second sub-pixel input signal value $x_{2-(p', q)}$, and the third sub-pixel input signal value $x_{3-(p', q)}$ as to an adjacent pixel adjacent to the (p, q)'th second pixel in the first direction $Max_{(p, q')}$: the maximum value of three sub-pixel input signal values of a first sub-pixel input signal value $x_{1-(p, q')}$, a second sub-pixel input signal value $x_{2-(p, q')}$, and a third sub-pixel input signal value $x_{3-(p, q')}$ as to an adjacent pixel adjacent to the (p, q)'th second pixel in the second direction $Min_{(p, q')}$: the minimum value of three sub-pixel input signal values of the first sub-pixel input signal value $x_{1-(p, q')}$, the second sub-pixel input signal value $x_{2-(p, q')}$, and the third sub-pixel input signal value $x_{3-(p, q')}$ as to an adjacent pixel adjacent to the (p, q)'th second pixel in the second direction With the driving method according to the first mode and so forth of the present disclosure, the value of the fourth sub-pixel output signal may be arranged to be obtained based on at least the value of Min and the extension coefficient $\alpha_0$. Specifically, a fourth sub-pixel output signal value $X_{4-(p, q)}$ can be obtained from the following Expressions, for example, where $c_{11}$, $c_{12}$, $c_{13}$, $C_{14}$, $c_{15}$, and $c_{16}$ are constants. Note that, it is desirable to determine what kind of value or expression is used as the value of the $X_{4-(p, q)}$ as appropriate by experimentally manufacturing an image display device or image display device assembly, and performing image evaluation by an image observer.

$$X_{4-(p,q)}=c_{11}(\mathrm{Min}_{(p,q)})\cdot\alpha_0 \quad (1\text{-}1)$$

or alternatively, $$X_{4-(p,q)}=c_{12}(\mathrm{Min}_{(p,q)})^2\cdot\alpha_0 \quad (1\text{-}2)$$

or alternatively, $$X_{4-(p,q)}=c_{13}(\mathrm{Max}_{(p,q)})^{1/2}\cdot\alpha_0 \quad (1\text{-}3)$$

or alternatively, $$X_{4-(p,q)}=c_{14}\{\text{product between either } (\mathrm{Min}_{(p,q)}/\mathrm{Max}_{(p,q)}) \text{ or } (2^n-1) \text{ and } \alpha_0\} \quad (1\text{-}4)$$

or alternatively, $$X_{4-(p,q)}=c_{15}[\text{product between either } \{(2^n-1)\times(\mathrm{Min}_{(p,q)}/(\mathrm{Max}_{(p,q)}-\mathrm{Min}_{(p,q)})\} \text{ or } (2^n-1) \text{ and } \alpha_0\} \quad (1\text{-}5)$$

or alternatively, $$X_{4-(p,q)}=c_{16}\{\text{product between a smaller value of } \mathrm{Max}_{(p,q)}^{1/2} \text{ and } \mathrm{Min}_{(p,q)}, \text{ and } \alpha_0\} \quad (1\text{-}6)$$

With the driving method according to the first mode and so forth or the fourth mode and so forth of the present disclosure, an arrangement may be made wherein a first sub-pixel output signal is obtained based on at least a first sub-pixel input signal and the extension coefficient $\alpha_0$, a second sub-pixel output signal is obtained based on at least a second sub-pixel input signal and the extension coefficient $\alpha_0$, and a third sub-pixel output signal is obtained based on at least a third sub-pixel input signal and the extension coefficient $\alpha_0$.

More specifically, with the driving method according to the first mode and so forth or the fourth mode and so forth of the present disclosure, when assuming that $\chi$ is taken as a constant depending on the image display device, the signal processing unit can obtain a first sub-pixel output signal value $X_{1-(p, q)}$, a second sub-pixel output signal value $X_{2-(p, q)}$, and a third sub-pixel output signal value $X_{3-(p, q)}$ as to the (p, q)'th pixel (or a set of a first sub-pixel, second sub-pixel, and third sub-pixel) from the following expressions. Note that description will be made later regarding a fourth sub-pixel control second signal value $SG_{2-(p, q)}$, a fourth sub-pixel control first signal value $SG_{1-(p, q)}$, and a control signal value (a third sub-pixel control signal value) $SG_{3-(p, q)}$.

First Mode and ETC. of Present Disclosure $$X_{1-(p,q)}=\alpha_0\cdot x_{1-(p,q)}-\chi\cdot X_{4-(p,q)} \quad (1\text{-A})$$

$$X_{2-(p,q)}=\alpha_0\cdot x_{2-(p,q)}-\chi\cdot X_{4-(p,q)} \quad (1\text{-B})$$

$$X_{3-(p,q)}=\alpha_0\cdot x_{3-(p,q)}-\chi\cdot X_{4-(p,q)} \quad (1\text{-C})$$

Fourth Mode and ETC. of Present Disclosure $$X_{1-(p,q)}=\alpha_0\cdot x_{1-(p,q)}-\chi\cdot SG_{2-(p,q)} \quad (1\text{-D})$$

$$X_{2-(p,q)}=\alpha_0\cdot x_{2-(p,q)}-\chi\cdot SG_{2-(p,q)} \quad (1\text{-E})$$

$$X_{3-(p,q)}=\alpha_0\cdot x_{3-(p,q)}-\chi\cdot SG_{2-(p,q)} \quad (1\text{-F})$$

Now, if we say that when a signal having a value equivalent to the maximum signal value of a first sub-pixel output signal is input to the first sub-pixel, a signal having a value equivalent to the maximum signal value of a second sub-pixel output signal is input to the second sub-pixel, and a signal having a value equivalent to the maximum signal value of a third sub-pixel output signal is input to the third sub-pixel, the luminance of a group of a first sub pixel, a second sub-pixel, and a third sub-pixel making up a pixel (the first mode and so forth of the present disclosure, the fourth mode and so forth of the present disclosure) or pixel group (the second mode and so forth of the present disclosure, the third mode and so forth of the present disclosure, the fifth mode and so forth of the present disclosure) is taken as $BN_{1-3}$, and when a signal having a value equivalent to the maximum signal value of a fourth sub-pixel output signal is input to a fourth sub-pixel making up a pixel (the first mode and so forth of the present disclosure, the fourth mode and so forth of the present disclosure) or pixel group (the second mode and so forth of the present disclosure, the third mode and so forth of the present disclosure, the fifth mode and so forth of the present disclosure), the luminance of the fourth sub-pixel is taken as $BN_4$, the constant $\chi$ can be represented with $$\chi = BN_4/BN_{1-3}$$

Accordingly, with the image display device driving methods according to the above-described sixth mode through tenth mode, the expression of $$\alpha_{0-std} = (BN_4/BN_{1-3}) + 1$$

can be rewritten with $$\alpha_{0-std} = \chi + 1.$$

Note that the constant $\chi$ is a value is a value specific to an image display device or image display device assembly, and is unambiguously determined by the image display device or image display device assembly. The constant $\chi$ can also be applied to the following description in the same way.

With the driving method according to the second mode and so forth of the present disclosure, an arrangement may be made wherein, with regard to a first pixel, a first sub-pixel output signal is obtained based on at least a first sub-pixel input signal and the extension coefficient $\alpha_0$, but a first sub-pixel output signal (signal value $X_{1-(p, q)-1}$) is obtained based on at least a first sub-pixel input signal (signal value $x_{1-(p, q)-1}$) and the extension coefficient $\alpha_0$, and a fourth sub-pixel control first signal (signal value $SG_{1-(p, 1)}$), a second sub-pixel output signal is obtained based on at least a second sub-pixel input signal and the extension coefficient $\alpha_0$, but a second sub-pixel output signal (signal value $X_{2-(p, q)-1}$) is obtained based on at least a second sub-pixel input signal (signal value $x_{2-(p, q)-1}$) and the extension coefficient $\alpha_0$, and the fourth sub-pixel control first signal (signal value $SG_{1-(p, q)}$), a third sub-pixel output signal is obtained based on at least a third sub-pixel input signal and the extension coefficient $\alpha_0$, but a third sub-pixel output signal (signal value $X_{3-(p, q)-1}$) is obtained based on at least a third sub-pixel input signal (signal value $X_{3-(p, q)-1}$) and the extension coefficient $\alpha_0$, and the fourth sub-pixel control first signal (signal value $SG_{1-(p, q)}$), and with regard to a second pixel, a first sub-pixel output signal is obtained based on at least a first sub-pixel input signal and the extension coefficient $\alpha_0$, but a first sub-pixel output signal (signal value $X_{1-(p, q)-2}$) is obtained based on at least a first sub-pixel input signal (signal value $x_{1-(p, q)-2}$) and the extension coefficient $\alpha_0$, and a fourth sub-pixel control second signal (signal value $SG_{2-(p, q)}$), a second sub-pixel output signal is obtained based on at least a second sub-pixel input signal and the extension coefficient $\alpha_0$, but a second sub-pixel output signal (signal value $X_{2-(p, q)-2}$) is obtained based on at least a second sub-pixel input signal (signal value $x_{2-(p, q)-2}$) and the extension coefficient $\alpha_0$, and the fourth sub-pixel control second signal (signal value $SG_{2-(p, q)}$), a third sub-pixel output signal is obtained based on at least a third sub-pixel input signal and the extension coefficient $\alpha_0$, but a third sub-pixel output signal (signal value $X_{3-(p, q)-2}$) is obtained based on at least a third sub-pixel input signal (signal value $x_{3-(p, q)-2}$) and the extension coefficient $\alpha_0$, and the fourth sub-pixel control second signal (signal value $SG_{2-(p, q)}$).

With the driving method according to the second mode and so forth of the present disclosure, as described above, the first sub-pixel output signal value $X_{1-(p, q)-1}$ is obtained based on at least the first sub-pixel input signal value $X_{1-(p, q)-1}$ and the extension coefficient $\alpha_0$, and the fourth sub-pixel control first signal value $SG_{1-(p, q)}$, but the first sub-pixel output signal value $X_{1-(p, q)-1}$ may be obtained based on $$[x_{1-(p,q)-1}, \alpha_0, SG_{1-(p,q)}],$$

or may be obtained based on $$[x_{1-(p,q)-1}, x_{1-(p,q)-2}, \alpha_0, SG_{1-(p,q)}].$$

In the same way, the second sub-pixel output signal value $X_{2-(p, q)-1}$ is obtained based on at least the second sub-pixel input signal value $x_{2-(p, q)-1}$ and the extension coefficient $\alpha_0$, and the fourth sub-pixel control first signal value $SG_{1-(p, q)}$, but the second sub-pixel output signal value $X_{2-(p, q)-1}$ may be obtained based on $$[x_{2-(p,q)-1}, \alpha_0, SG_{1-(p,q)}],$$

or may be obtained based on $$[x_{2-(p,q)-1}, x_{2-(p,q)-2}, \alpha_0, SG_{1-(p,q)}].$$

In the same way, the third sub-pixel output signal value $X_{3-(p, q)-1}$ is obtained based on at least the third sub-pixel input signal value $x_{3-(p, q)-1}$ and the extension coefficient $\alpha_0$, and the fourth sub-pixel control first signal value $SG_{1-(p, q)}$, but the third sub-pixel output signal value $X_{3-(p, q)-1}$ may be obtained based on $$[x_{3-(p,q)-1}, \alpha_0, SG_{1-(p,q)}],$$

or may be obtained based on $$[x_{3-(p,q)-1}, x_{3-(p,q)-2}, \alpha_0, SG_{1-(p,q)}].$$

The output signal values $X_{1-(p, q)-2}$, $X_{2-(p, q)-2}$, and $X_{3-(p, q)-2}$ may be obtained in the same way.

More specifically, with the driving method according to the second mode and so forth of the present disclosure, the output signal values $X_{1-(p, q)-1}$, $X_{2-(p, q)-1}$, $X_{3-(p, q)-1}$, $X_{1-(p, q)-2}$, $X_{2-(p, q)-2}$, and $X_{3-(p, q)-2}$ can be obtained at the signal processing unit from the following expressions.

$$X_{1-(p,q)-1} = \alpha_0 \cdot x_{1-(p,q)-1} - \chi \cdot SG_{1-(p,q)} \quad \text{(2-A)}$$

$$X_{2-(p,q)-1} = \alpha_0 \cdot x_{2-(p,q)-1} - \chi \cdot SG_{1-(p,q)} \quad \text{(2-B)}$$

$$X_{3-(p,q)-1} = \alpha_0 \cdot x_{3-(p,q)-1} - \chi \cdot SG_{1-(p,q)} \quad \text{(2-C)}$$

$$X_{1-(p,q)-2} = \alpha_0 \cdot x_{1-(p,q)-2} - \chi \cdot SG_{2-(p,q)} \quad \text{(2-D)}$$

$$X_{2-(p,q)-2} = \alpha_0 \cdot x_{2-(p,q)-2} - \chi \cdot SG_{2-(p,q)} \quad \text{(2-E)}$$

$$X_{3-(p,q)-2} = \alpha_0 \cdot x_{3-(p,q)-2} - \chi \cdot SG_{2-(p,q)} \quad \text{(2-F)}$$

With the driving method according to the third mode and so forth or the fifth mode and so forth of the present disclosure, an arrangement may be made wherein, with regard to a second pixel, a first sub-pixel output signal is obtained based on at least a first sub-pixel input signal and the extension coefficient $\alpha_0$, but a first sub-pixel output signal (signal value $X_{1-(p, q)-2}$) is obtained based on at least a first sub-pixel input signal value $x_{1-(p, q)-2}$ and the extension coefficient $\alpha_0$, and a fourth sub-pixel control second signal (signal value $SG_{2-(p, q)}$), a second sub-pixel output signal is obtained based on at least a second sub-pixel input signal and the extension coefficient $\alpha_0$, but a second sub-pixel output signal (signal value $X_{2-(p, q)-2}$) is obtained based on at least a second sub-pixel input signal value $X_{2-(p, q)-2}$ and the extension coefficient $\alpha_0$, and the fourth sub-pixel control second signal (signal value $SG_{2-(p, q)}$), and also with regard to a first pixel, a first sub-pixel output signal is obtained based on at least a first sub-pixel input signal and the extension coefficient $\alpha_0$, but a first sub-pixel output signal (signal value $X_{1-(p, q)-1}$) is obtained based on at least a first sub-pixel input signal value $x_{1-(p,q)-1}$ and the extension coefficient $\alpha_0$, and a third sub-pixel control signal (signal value $SG_{3-(p,q)}$) or a fourth sub-pixel control first signal (signal value $SG_{1-(p,q)}$), a second sub-pixel output signal is obtained based on at least a second sub-pixel input signal and the extension coefficient $\alpha_0$, but a second sub-pixel output signal (signal value $X_{2-(p,q)-1}$) is obtained based on at least a second sub-pixel input signal value $X_{2-(p,q)-1}$ and the extension coefficient $\alpha_0$, and the third sub-pixel control signal (signal value $SG_{3-(p,q)}$) or the fourth sub-pixel control first signal (signal value $SG_{1-(p,q)}$), a third sub-pixel output signal is obtained based on at least a third sub-pixel input signal and the extension coefficient $\alpha_0$, but a third sub-pixel output signal (signal value $X_{3-(p,q)-1}$) is obtained based on at least a third sub-pixel input signal values $X_{3-(p,q)-1}$ and $x_{3-(p,q)-2}$, and the extension coefficient $\alpha_0$, and the third sub-pixel control signal (signal value $SG_{3-(p,q)}$) or the fourth sub-pixel control second signal (signal value $SG_{2-(p,q)}$), or alternatively, based on at least a third sub-pixel input signal values $x_{3-(p,q)-1}$ and $x_{3-(p,q)-2}$, and the extension coefficient $\alpha_0$, and the fourth sub-pixel control first signal (signal value $SG_{1-(p,q)}$) and the fourth sub-pixel control second signal (signal value $SG_{2-(p,q)}$).

More specifically, with the driving method according to the third mode and so forth or the fifth mode and so forth of the present disclosure, the output signal values $X_{1-(p,q)-2}$, $X_{2-(p,q)-2}$, $X_{1-(p,q)-1}$, and $X_{2-(p,q)-1}$ can be obtained at the signal processing unit from the following expressions.

$$X_{1-(p,q)-2}=\alpha_0 \cdot x_{1-(p,q)-2}-\chi \cdot SG_{2-(p,q)} \quad (3\text{-A})$$

$$X_{2-(p,q)-2}=\alpha_0 \cdot x_{2-(p,q)-2}-\chi \cdot SG_{2-(p,q)} \quad (3\text{-B})$$

$$X_{1-(p,q)-1}=\alpha_0 \cdot x_{1-(p,q)-1}-\chi \cdot SG_{1-(p,q)} \quad (3\text{-C})$$

$$X_{2-(p,q)-1}=\alpha_0 \cdot x_{2-(p,q)-1}-\chi \cdot SG_{1-(p,q)} \quad (3\text{-D})$$

or $$X_{1-(p,q)-1}=\alpha_0 \cdot x_{1-(p,q)-1}-\chi \cdot SG_{3-(p,q)} \quad (3\text{-E})$$

$$X_{2-(p,q)-1}=\alpha_0 \cdot x_{2-(p,q)-1}-\chi \cdot SG_{3-(p,q)} \quad (3\text{-F})$$

Further, the third sub-pixel output signal (third sub-pixel output signal value $X_{3-(p,q)-1}$) of the first pixel can be obtained from the following expressions when assuming that $C_{31}$ and $C_{32}$ are taken as constants, for example.

$$X_{3-(p,q)-1}=(C_{31} \cdot X'_{3-(p,q)-1}+C_{32} \cdot X'_{3-(p,q)-2})/(C_{21}+C_{22}) \quad (3\text{-a})$$

or $$X_{3-(p,q)-1}=C_{31} \cdot X''_{3-(p,q)-1}+C_{32} \cdot X'_{3-(p,q)-2} \quad (3\text{-b})$$

or $$X_{3-(p,q)-1}=C_{21} \cdot (X'_{3-(p,q)-1}-X'_{3-(p,q)-2})+C_{22} \cdot X'_{3-(p,q)-2} \quad (3\text{-c})$$

where $$X'_{3-(p,q)-1}=\alpha_0 \cdot x_{3-(p,q)-1}-\chi \cdot SG_{1-(p,q)} \quad (3\text{-d})$$

$$X'_{3-(p,q)-2}=\alpha_0 \cdot x_{3-(p,q)-2}-\chi \cdot SG_{2-(p,q)} \quad (3\text{-e})$$

or $$X'_{3-(p,q)-1}=\alpha_0 \cdot x_{3-(p,q)-1}-\chi \cdot SG_{3-(p,q)} \quad (3\text{-f})$$

$$X'_{3-(p,q)-2}=\alpha_0 \cdot x_{3-(p,q)-2}-\chi \cdot SG_{2-(p,q)} \quad (3\text{-g})$$

With the driving methods according to the second mode and so forth through the fifth mode and so forth of the present disclosure, the fourth sub-pixel control first signal (signal value $SG_{1-(p,q)}$) and the fourth sub-pixel control second signal (signal value $SG_{2-(p,q)}$) can specifically be obtained from the following expressions, for example, where $c_{21}$, $c_{22}$, $c_{23}$, $c_{24}$, $c_{25}$, and $c_{26}$ are constants. Note that, it is desirable to determine what kind of value or expression is used as the values of the $X_{4-(p,q)}$ and $X_{4-(p,q)-2}$ as appropriate by experimentally manufacturing an image display device or image display device assembly, and performing image evaluation by an image observer, for example.

$$SG_{1-(p,q)}=c_{21}(\mathrm{Min}_{(p,q)-1}) \cdot \alpha_0 \quad (2\text{-}1\text{-}1)$$

$$SG_{2-(p,q)}=c_{21}(\mathrm{Min}_{(p,q)-2}) \cdot \alpha_0 \quad (2\text{-}1\text{-}2)$$

or $$SG_{1-(p,q)}=c_{22}(\mathrm{Min}_{(p,q)-1})^2 \cdot \alpha_0 \quad (2\text{-}2\text{-}1)$$

$$SG_{2-(p,q)}=c_{22}(\mathrm{Min}_{(p,q)-2})^2 \cdot \alpha_0 \quad (2\text{-}2\text{-}2)$$

or $$SG_{1-(p,q)}=c_{23}(\mathrm{Max}_{(p,q)-1})^{1/2} \cdot \alpha_0 \quad (2\text{-}3\text{-}1)$$

$$SG_{2-(p,q)}=c_{23}(\mathrm{Max}_{(p,q)-2})^{1/2} \cdot \alpha_0 \quad (2\text{-}3\text{-}2)$$

or alternatively, $$SG_{1-(p,q)}=c_{24}\{\text{product between either } (\mathrm{Min}_{(p,q)-1}/\mathrm{Max}_{(p,q)-1}) \text{ or } (2^n-1) \text{ and } \alpha_0\} \quad (2\text{-}4\text{-}1)$$

$$SG_{2-(p,q)}=c_{24}\{\text{product between either } (\mathrm{Min}_{(p,q)-2}/\mathrm{Max}_{(p,q)-2}) \text{ or } (2^n-1) \text{ and } \alpha_0\} \quad (2\text{-}4\text{-}2)$$

or alternatively, $$SG_{1-(p,q)}=c_{25}[\text{product between either } \{(2^n-1) \cdot \mathrm{Min}_{(p,q)-1}/(\mathrm{Max}_{(p,q)-1}-\mathrm{Min}_{(p,q)-1}\} \text{ or } (2^n-1) \text{ and } \alpha_0\} \quad (2\text{-}5\text{-}1)$$

$$SG_{2-(p,q)}=c_{25}[\text{product between either } \{(2^n-1) \cdot \mathrm{Min}_{(p,q)-2}/(\mathrm{Max}_{(p,q)-2}-\mathrm{Min}_{(p,q)-2}\} \text{ or } (2^n-1) \text{ and } \alpha_0\} \quad (2\text{-}5\text{-}2)$$

or alternatively, $$SG_{1-(p,q)}=c_{26}\{\text{product between a smaller value of } (\mathrm{Max}_{(p,q)-1}))^{1/2} \text{ and } \mathrm{Min}_{(p,q)-1}, \text{ and } \alpha_0\} \quad (2\text{-}6\text{-}1)$$

$$SG_{2-(p,q)}=c_{26}\{\text{product between a smaller value of } (\mathrm{Max}_{(p,q)-2}))^{1/2} \text{ and } \mathrm{Min}_{(p,q)-2}, \text{ and } \alpha_0\} \quad (2\text{-}6\text{-}2)$$

However, with the driving method according to the third mode and so forth of the present disclosure, the $\mathrm{Max}_{(p,q)-1}$ and $\mathrm{Min}_{(p,q)-1}$ in the above-described expressions should be read as $\mathrm{Max}_{(p',q)-1}$ and $\mathrm{Min}_{(p',q)-1}$. Also, with the driving methods according to the fourth mode and so forth and the fifth mode and so forth of the present disclosure, the $\mathrm{Max}_{(p,q)-1}$ and $\mathrm{Min}_{(p,q)-1}$ in the above-described expressions should be read as $\mathrm{Max}_{(p,q')}$ and $\mathrm{Min}_{(p,q')}$. Also, the control signal value (third sub-pixel control signal value) $SG_{3-(p,q)}$ can be obtained by replacing "$SG_{1-(p,q)}$" in the left-hand side in the Expression (2-1-1), Expression (2-2-1), Expression (2-3-1), Expression (2-4-1), Expression (2-5-1), and Expression (2-6-1) with "$SG_{3-(p,q)}$".

With the driving methods according to the second mode and so forth through the fifth mode and so forth of the present disclosure, when assuming that $C_{21}$, $C_{22}$, $C_{23}$, $C_{24}$, $C_{25}$, and $C_{26}$ are taken as constants, the signal value $X_{4-(p, q)}$ can be obtained by $$X_{4-(p,q)}=(C_{21}\cdot SG_{1-(p,q)}+C_{22}\cdot SG_{2-(p,q)})/(C_{21}+C_{22}) \quad (2\text{-}11)$$

or alternatively obtained by $$X_{4-(p,q)}=C_{23}\cdot SG_{1-(p,q)}+C_{24}\cdot SG_{2-(p,q)} \quad (2\text{-}12)$$

or alternatively obtained by $$X_{4-(p,q)}=C_{25}(SG_{1-(p,q)}-SG_{2-(p,q)})+C_{26}\cdot SG_{2-(p,q)} \quad (2\text{-}13)$$

or alternatively obtained by root-mean-square, i.e., $$X_{4-(p,q)}=[(SG_{1-(p,q)}{}^2-SG_{2-(p,q)}{}^2)/2]^{1/2} \quad (2\text{-}13)$$

However, with the driving method according to the third mode and so forth or the fifth mode and so forth of the present disclosure, "$X_{4-(p, q)}$" in Expression (2-11) through Expression (2-14) should be replaced with "$X_{4-(p, q)-2}$".

One of the above-described expressions may be selected depending on the value of $SG_{1-(p, q)}$, one of the above-described expressions may be selected depending on the value of $SG_{2-(p, q)}$, or one of the above-described expressions may be selected depending on the values of $SG_{1-(p, q)}$ and $SG_{2-(p, q)}$. Specifically, with each pixel group, $X_{4-(p, q)}$ and $X_{4-(p, q)-2}$ may be obtained by fixing to one of the above expressions, or with each pixel group, $X_{4-(p, q)}$ and $X_{4-(p, q)-2}$ may be obtained by selecting one of the above expressions.

With the driving method according to the second mode and so forth of the present disclosure or the third mode and so forth of the present disclosure, when assuming that the number of pixels making up each pixel group is taken as $p_0$, $p_0=2$. However, $p_0$ is not restricted to $p_0=2$, and $p_0\geq 3$ may be employed.

With the image display device driving method according to the third mode and so forth of the present disclosure, the adjacent pixel is adjacent to the (p, q)'th second pixel in the first direction, but the adjacent pixel may be arranged to be adjacent to the (p, q)'th first pixel, or alternatively, the adjacent pixel may be arranged to be adjacent to the (p+1, q)'th first pixel.

With the image display device driving method according to the third mode and so forth of the present disclosure, an arrangement may be made wherein, in the second direction, a first pixel and a first pixel are adjacently disposed, and a second pixel and a second pixel are adjacently disposed, or alternatively, an arrangement may be made wherein, in the second direction, a first pixel and a second pixel are adjacently disposed. Further, it is desirable that a first pixel is, in the first direction, made up of a first sub-pixel for displaying a first primary color, a second sub-pixel for displaying a second primary color, and a third sub-pixel for displaying a third primary color being sequentially arrayed, and a second pixel is, in the first direction, made up of a first sub-pixel for displaying a first primary color, a second sub-pixel for displaying a second primary color, and a fourth sub-pixel for displaying a fourth color being sequentially arrayed. That is to say, it is desirable to dispose a fourth sub-pixel a downstream edge portion of a pixel group in the first direction. However, the layout is not restricted to these, and for example, such as an arrangement wherein a first pixel is, in the first direction, made up of a first sub-pixel for displaying a first primary color, a third sub-pixel for displaying a third primary color, and a second sub-pixel for displaying a second primary color being sequentially arrayed, and a second pixel is, in the first direction, made up of a first sub-pixel for displaying a first primary color, a fourth sub-pixel for displaying a fourth color, and a second sub-pixel for displaying a second primary color being sequentially arrayed, it is desirable to select one of 36 combinations of 6×6 in total. Specifically, six combinations can be given as array combinations of (first sub-pixel, second sub-pixel, and third sub-pixel) in a first pixel, and six combinations can be given as array combinations of (first sub-pixel, second sub-pixel, and fourth sub-pixel) in a second pixel. Note that, in general, the shape of a sub-pixel is a rectangle, but it is desirable to dispose a sub-pixel such that the longer side of this rectangle is parallel to the second direction, and the shorter side is parallel to the first direction.

With the driving method according to the fourth mode and so forth or the fifth mode and so forth of the present disclosure, the (p, q−1)'th pixel may be given as an adjacent pixel adjacent to the (p, q)'th pixel or as an adjacent pixel adjacent to the (p, q)'th second pixel, or alternatively, the (p, q+1)'th pixel may be given, or alternatively, the (p, q−1)'th pixel and the (p, q+1)'th pixel may be given.

With the driving methods according to the first mode and so forth through the fifth mode and so forth of the present disclosure, the reference extension coefficient $\alpha_{0\text{-}std}$ may be arranged to be determined for each one image display frame. Also, with the driving methods according to the first mode and so forth through the fifth mode and so forth of the present disclosure, an arrangement may be made depending on circumstances wherein the luminance of a light source for illuminating an image display device (e.g., planar light source device) is reduced based on the reference extension coefficient $\alpha_{0\text{-}std}$.

In general, the shape of a sub-pixel is a rectangle, but it is desirable to dispose a sub-pixel such that the longer side of this rectangle is parallel to the second direction, and the shorter side is parallel to the first direction. However, the shape is not restricted to this.

As for a mode for employing multiple pixels or pixel groups from which the saturation S and luminosity V(S) are to be obtained, there may be available a mode for employing all of the pixels or pixel groups, or alternatively, a mode for employing (1/N) of all the pixels or pixel groups. Note that "N" is a natural number of two or more. As specific values of N, factorial of 2 such as 2, 4, 8, 16, and so on can be exemplified. If the former mode is employed, image quality can suitably be held at a maximum without change in image quality. On the other hand, if the latter mode is employed, improvement in processing speed, and simplification of the circuits of the signal processing unit can be realized.

Further, with the present disclosure including the above-described preferred arrangements and modes, a mode may be employed wherein the fourth color is white. However, the fourth color is not restricted to this, and additionally, yellow, cyan, or magenta may be taken as the fourth color, for example. Even with these cases, in the event that the image display device is configured of a color liquid crystal display device, an arrangement may be made wherein a first color filter disposed between a first sub-pixel and the image observer for passing a first primary color, a second color filter disposed between a second sub-pixel and the image observer for passing a second primary color, and a third color filter disposed between a third sub-pixel and the image observer for passing a third primary color are further provided.

Examples of a light source making up the planar light source device include a light emitting device, and specifically, a light emitting diode (LED). A light emitting device made up of a light emitting diode has small occupied volume, which is suitable for disposing multiple light emitting devices. Examples of a light emitting diode serving as a light emitting device include a white light emitting diode (e.g., a light emitting diode which emits white by combining an ultraviolet or blue light emitting diode and a light emitting particle).

Here, examples of a light emitting particle include a red-emitting fluorescent particle, a green-emitting fluorescent particle, and a blue-emitting fluorescent particle. Examples of materials making up a red-emitting fluorescent particle include $Y_2O_3$:Eu, $YVO_4$:Eu, $Y(P,V)O_4$:Eu, 3.5MgO.0.5$MgF_2$.$Ge_2$:Mn, $CaSiO_3$:Pb,Mn, $Mg_6AsO_{11}$:Mn, $(Sr,Mg)_3(PO_4)_3$:Sn, $La_2O_2S$:Eu, $Y_2O_2S$:Eu, (ME:Eu)S [where "ME" means at least one kind of atom selected from a group made up of Ca, Sr, and Ba, this can be applied to the following description], $(M:Sm)_x(Si,Al)_{12}(O,N)_{16}$ [where "M" means at least one kind of atom selected from a group made up of Li, Mg, and Ca, this can be applied to the following description], $ME_2Si_5N_8$:Eu, (Ca:Eu)$SiN_2$, and (Ca:Eu) $AlSiN_3$. Examples of materials making up a green-emitting fluorescent particle include $LaPO_4$:Ce,Tb, $BaMgAl_{11}O_{17}$,: Eu,Mn, $Zn_2SiO_4$:Mn, $MgAl_{11}O_{19}$:Ce,Tb, $Y_2SiO_5$:Ce,Tb, $MgAl_{11}O_{19}$:CE,Tb,Mn, and further include (ME:Eu)$Ga_2S_4$, $(M:RE)_x(Si,Al)_{12}(O,N)_{16}$ [where "RE" means Tb and Yb], $(M:Tb)_x(Si,Al)_{12}(O,N)_{16}$, and $(M:Yb)_x(Si, Al)_{12}(O,N)_{16}$. Further, examples of materials making up a blue-emitting fluorescent particle include $BaMgAl_{10}O_{17}$:Eu, $BaMg_2Al_{16}O_{27}$:Eu, $Sr_2P_2O_7$:Eu, $Sr_5(PO_4)_3Cl$:Eu, (Sr,Ca,Ba, $Mg)_5(PO_4)_3Cl$:Eu, $CaWO_4$, and $CaWO_4$:Pb. However, light emitting particles are not restricted to fluorescent particles, and for example, with an indirect transition type silicon material, there can be given a light emitting particle to which a quantum well structure such as a two-dimensional quantum well structure, a one-dimensional quantum well structure (quantum wire), a zero-dimensional quantum well structure (quantum dots) or the like has been applied which localizes a carrier wave function for effectively converting carriers into light using quantum effects like a direct transition type, it is familiar that RE atom added to a semiconductor material emits light keenly by interior transition, and a light emitting particle to which such a technique has been applied can also be given.

Alternatively, a light source making up the planar light source device can be configured of a combination of a red-emitting device (e.g., lighting emitting diode) for emitting red (e.g., main emission wavelength of 640 nm), a green-emitting device (e.g., GaN lighting emitting diode) for emitting red (e.g., main emission wavelength of 530 nm), and a blue-emitting device (e.g., GaN lighting emitting diode) for emitting blue (e.g., main emission wavelength of 450 nm). There may further be provided light emitting devices for emitting the fourth color, the fifth color, and so on other than red, green, and blue.

Light emitting diodes may have what we might call a face-up configuration, or may have a flip-chip configuration. Specifically, light emitting diodes are configured of a substrate, and a light emitting layer formed on the substrate, and may have a configuration where light is externally emitted from the light emitting layer, or may have a configuration where the light from the light emitting layer is passed through the substrate and externally emitted. More specifically, light emitting diodes (LEDs) have a layered configuration of a first compound semiconductor layer having a first electro-conductive type (e.g., n-type) formed on the substrate, an active layer formed on the first compound semiconductor layer, and a second compound semiconductor layer having a second electro-conductive type (e.g., p-type) formed on the active layer, have a first electrode electrically connected to the first compound semiconductor layer, and a second electrode electrically connected to the second compound semiconductor layer. A layer making up a light emitting diode should be configured of a familiar compound semiconductor material which depends on light emitting wavelength.

The planar light source device may be two types of planar light source devices (backlight), i.e., a direct-type planar light source device disclosed, for example, in Japanese Unexamined Utility Model Registration No. 63-187120 or Japanese Unexamined Patent Application Publication No. 2002-277870, and an edge-light-type (also referred to as side-light-type) planar light source device disclosed in, for example, in Japanese Unexamined Patent Application Publication No. 2002-131552.

The direct-type planar light source device can have a configuration wherein the above-described light emitting devices serving as light sources are disposed and arrayed within a casing, but is not restricted to this. Now, in the event that multiple red-emitting devices, multiple green-emitting devices, and multiple blue-emitting devices are disposed and arrayed in the casing, as the array state of these light emitting devices, an array can be exemplified wherein multiple light emitting device groups each made up of a set of a red-emitting device, a green-emitting device, and a blue-emitting device are put in a row in the screen horizontal direction of an image display panel (specifically, for example, liquid crystal display device) to form a light emitting group array, and a plurality of this light emitting device group array are arrayed in the screen vertical direction of the image display panel. Note that, as light emitting device groups, multiple combinations can be given, such as (one red-emitting device, one green-emitting device, one blue-emitting device), (one red-emitting device, two green-emitting devices, one blue-emitting device), (two red-emitting devices, two green-emitting devices, one blue-emitting device) and so forth. Note that the light emitting devices may have a light extraction lens such as described in the 128th page of Vol. 889 Dec. 20, 2004, Nikkei Electronics, for example.

Also, in the event that the direct-type planar light source device is configured of multiple planar light source units, one planar light source unit may be configured of one light emitting device group, or may be configured of multiple light emitting device groups. Alternatively, one planar light source unit may be configured of one white-emitting diode, or may be configured of multiple white-emitting diodes.

In the event that the direct-type planar light source device is configured of multiple planar light source units, a partition may be disposed between planar light source units. As a material making up a partition, a material transparent as to light emitted form a light emitting device provided to a planar light source unit can be given, such as an Acrylic resin, a polycarbonate resin, and an ABS resin, and as a material transparent as to light emitted from a light emitting device provided to a planar light source unit, there can be exemplified a methyl polymethacrylate resin (PMMA), a polycarbonate resin (PC), a polyarylate resin (PAR), a polyethylene terephthalate resin (PET), and glass. The partition surface may have a light diffuse reflection function, or may have a specular reflection function. In order to provide a light diffuse reflection function to the partition surface, protrusions and recessions may be formed on the partition surface by sandblasting, or a film having protrusions and recessions (light diffusion film) may be adhered to the partition surface. Also, in order to provide a mirror reflection function to the partition surface, a light reflection film may be adhered to the partition surface, or a light reflection layer may be formed on the partition surface by electroplating, for example.

The direct-type planar light source device may be configured so as to include an optical function sheet group, such as a light diffusion plate, a light diffusion sheet, a prism sheet, and a polarization conversion sheet, or a light reflection sheet. A widely familiar material can be used as a light diffusion plate, a light diffusion sheet, a prism sheet, a polarization conversion sheet, and a light reflection sheet. The optical function sheet group may be configured of various sheets separately disposed, or may be configured as a layered integral sheet. For example, a light diffusion sheet, a prism sheet, a polarization conversion sheet, and so forth may be layered to generate an integral sheet. A light diffusion plate and optical function sheet group are disposed between the planar light source device and the image display panel.

On the other hand, with the edge-light-type planar light source device, a light guide plate is disposed facing the image display panel (specifically, for example, liquid crystal display device), a light emitting device is disposed on a side face (first side face which will be described next) of the light guide plate. The light guide plate has a first face (bottom face), a second face facing this first face (top face), a first side face, a second side face, a third side face facing the first side face, and a fourth side face facing the second side face. As a specific shape of the light guide plate, a wedge-shaped truncated pyramid shape can be given as a whole, and in this case, two opposite side faces of the truncated pyramid are equivalent to the first face and the second face, and the bottom face of the truncated pyramid is equivalent to the first side face. It is desirable that a protruding portion and/or a recessed portion are provided to the surface portion of the first face (bottom face). Light is input from the first side face of the light guide plate, and the light is emitted from the second face (top face) toward the image display panel. Here, the second face of the light guide plate may be smooth (i.e., may be taken as a mirrored face), or blasted texturing having light diffusion effect may be provided (i.e., may be taken as a minute protruding and recessed face).

It is desirable to provide a protruding portion and/or a recessed portion on the first face (bottom face) of the light guide plate. Specifically, it is desirable that a protruding portion, or a recessed portion, or a protruding and recessed portion is provided to the first face of the light guide plate. In the event that a protruding and recessed portion is provided, a recessed portion and a protruding portion may continue, or may not continue. A protruding portion and/or a recessed portion provided to the first face of the light guide plate may be configured as a continuous protruding portion and/or a recessed portion extending in a direction making up a predetermined angle against the light input direction as to the light guide plate. With such a configuration, as the cross-sectional shape of a continuous protruding shape or recessed shape at the time of cutting away the light guide plate at a virtual plane perpendicular to the first face in the light input direction as to the light guide plate, there can be exemplified a triangle; an arbitrary quadrangle including a square, a rectangle, and a trapezoid; an arbitrary polygon; and an arbitrary smooth curve including a circle, a ellipse, a parabola, a hyperbola, a catenary, and so forth. Note that the direction making up a predetermined angle against the light input direction as to the light guide plate means a direction of 60 degrees through 120 degrees when assuming that the light input direction as to the light guide plate is zero degree. This can be applied to the following description. Alternatively, the protruding portion and/or recessed portion provided to the first face of the light guide plate may be configured as a discontinuous protruding portion and/or recessed portion extending in the direction making up a predetermined angle against the light input direction as to the light guide plate. With such a configuration, as a discontinuous protruding shape or recessed shape, there can be exemplified various types of smooth curved faces, such as a polygonal column including a pyramid, a cone, a cylinder, a triangular prism, and a quadrangular prism, part of a sphere, part of a spheroid, part of a rotating paraboloid, and part of a rotating hyperboloid. Note that, with the light guide plate, neither a protruding portion nor a recessed portion may be formed on the circumferential edge portion of the first face depending on cases. Further, the light emitted from a light source and input to the light guide plate crashes against the protruding portion or recessed portion formed on the first face of the light guide plate and scattered, but the height, depth, pitch, shape of the protruding portion or recessed portion provided to the first face of the light guide plate may be set fixedly, or may be changed as the distance is separated from the light source. In the latter case, the pitch of the protruding portion or recessed portion may be set finely as the distance is separated from the light source, for example. Here, the pitch of the protruding portion, or the pitch of the recessed portion means the pitch of the protruding portion or the pitch of the recessed portion in the light input direction as to the light guide plate.

With the planar light source device including the light guide plate, it is desirable to dispose a light reflection member facing the first face of the light guide plate. The image display panel (specifically, e.g., liquid crystal display device) is disposed facing the second face of the light guide plate. The light emitted from the light source is input to the light guide plate from the first side face (e.g., the face equivalent to the bottom face of the truncated pyramid) of the light guide plate, crashed against the protruding portion or recessed portion of the first face, scattered, emitted from the first face, reflected at the light reflection member, input to the first face again, emitted from the second face, and irradiates the image display panel. A light diffusion sheet or prism sheet may be disposed between the image display panel and the second face of the light guide plate, for example. Also, the light emitted from the light source may directly be guide to the light guide plate, or may indirectly be guided to the light guide plate. In the latter case, an optical fiber should be employed, for example.

It is desirable to manufacture the light guide plate from a material which seldom absorbs light emitted from the light source. Specifically, examples of a material making up the light guide plate include glass, a plastic material (e.g., PMMA, polycarbonate resin, acryl resin, amorphous polypropylene resin, styrene resin including AS resin).

With the present disclosure, the driving method and driving conditions of the planar light source device are not restricted to particular ones, and the light source may be controlled in an integral manner. That is to say, for example, multiple light emitting devices may be driven at the same time. Alternatively, multiple light emitting devices may partially be driven (split driven). Specifically, in the event that the planar light source device is made up of multiple light source units, when assuming that the display region of the image display panel is divided into S×T virtual display region units, an arrangement may be made wherein the planar light source device is configured of S×T planar light source units corresponding to the S×T virtual display region units, and the emitting states of the S×T planar light source units are individually controlled.

A driving circuit for driving the planar light source device and the image display panel includes a planar light source device control circuit configured of, for example, a light emitting diode (LED) driving circuit, an arithmetic circuit, a storage device (memory), and so forth, and an image display panel driving circuit configured of a familiar circuit. Note that a temperature control circuit may be included in the planar light source device control circuit. Control of the luminance (display luminance) of a display region portion, and the luminance (light source luminance) of a planar light source unit is performed for each image display frame. Note that the number of image information to be transmitted to the driving circuit for one second (image per second) as electrical signals is a frame frequency (frame rate), and the reciprocal number of the frame frequency is frame time (unit: seconds).

A transmissive liquid crystal display device is configured of, for example, a front panel having a transparent first electrode, a rear panel having a transparent second electrode, and a liquid crystal material disposed between the front panel and the rear panel.

The front panel is configured of, more specifically, for example, a first substrate made up of a glass substrate or silicon substrate, a transparent first electrode (also referred to as "common electrode", which is made up of ITO for example) provided to the inner face of the first substrate, and a polarization film provided to the outer face of the first substrate. Further, with a transmissive color liquid crystal display device, a color filter coated by an overcoat layer made up of an acrylic resin or epoxy resin is provided to the inner face of the first substrate. The front panel further has a configuration where the transparent first electrode is formed on the overcoat layer. Note that an oriented film is formed on the transparent first electrode. On the other hand, the rear panel is configured of, more specifically, for example, a second substrate made up of a glass substrate or silicon substrate, a switching device formed on the inner face of the second substrate, a transparent second electrode (also referred to pixel electrode, which is configured of ITO for example) where conduction/non-conduction is controlled by the switching device, and a polarization film provided to the outer face of the second substrate. An oriented film is formed on the entire face including the transparent second electrode. Various members and a liquid crystal material making up the liquid crystal display device including the transmissive color liquid crystal display device may be configured of familiar members and materials. As the switching device, there can be exemplified a three-terminal device such as a MOS-FET or thin-film transistor (TFT) formed on a monocrystalline silicon semiconductor substrate, and a two-terminal device such as an MIM device, a varistor device, a diode, and so forth. Examples of a layout pattern of the color filters include an array similar to a delta array, an array similar to a stripe array, an array similar to a diagonal array, and an array similar to a rectangle array.

When representing the number of pixels $P_0 \times Q_0$ arrayed in a two-dimensional matrix shape with $(P_0, Q_0)$, as the values of $(P_0, Q_0)$, specifically, there can be exemplified several resolutions for image display such as VGA(640, 480), S-VGA (800, 600), XGA(1024, 768), APRC(1152, 900), S-XGA (1280, 1024), U-XGA(1600, 1200), HD-TV(1920, 1080), Q-XGA(2048, 1536), and additionally, (1920, 1035), (720, 480), (1280, 960), and so forth, but the resolution is not restricted to these values. Also, as a relation between the values of $(P_0, Q_0)$ and the values of (S, T) there can be exemplified in the following Table 1 though not restricted to this. As the number of pixels making up one display region unit, 20×20 through 320×240, and more preferably, 50×50 through 200×200 can be exemplified. The number of pixels in a display region unit may be constant, or may differ.

TABLE 1

| | VALUE OF S | VALUE OF T |
|---|---|---|
| VGA(640, 480) | 2 through 32 | 2 through 24 |
| S-VGA(800, 600) | 3 through 40 | 2 through 30 |
| XGA(1024, 768) | 4 through 50 | 3 through 39 |
| APRC(1152, 900) | 4 through 58 | 3 through 45 |
| S-XGA(1280, 1024) | 4 through 64 | 4 through 51 |
| U-XGA(1600, 1200) | 6 through 80 | 4 through 60 |
| HD-TV(1920, 1080) | 6 through 86 | 4 through 54 |
| Q-XGA(2048, 1536) | 7 through 102 | 5 through 77 |
| (1920, 1035) | 7 through 64 | 4 through 52 |
| (720, 480) | 3 through 34 | 2 through 24 |
| (1280, 960) | 4 through 64 | 3 through 48 |

Examples of an array state of sub-pixels include an array similar to a delta array (triangle array), an array similar to a stripe array, an array similar to a diagonal array (mosaic array), and an array similar to a rectangle array. In general, an array similar to a stripe array is suitable for displaying data or a letter string at a personal computer or the like. On the other hand, an array similar to a mosaic array is suitable for displaying a natural image at a video camera recorder, a digital still camera, or the like.

With the image display device driving method of an embodiment of the present disclosure, as the image display device, there can be given a direct-view-type or projection-type color display image display device, and a color display image display device (direct view type or projection type) of a field sequential method. Note that the number of light emitting devices making up the image display device should be determined based on the specifications demanded for the image display device. Also, an arrangement may be made wherein a light bulb is further provided based on the specifications demanded for the image display device.

The image display device is not restricted to the color liquid crystal display device, and additionally, there can be given an organic electroluminescence display device (organic EL display device), an inorganic electroluminescence display device (inorganic EL display device), a cold cathode field electron emission display device (FED), a surface conduction type electron emission display device (SED), a plasma display device (PDP), a diffraction-grating-light modulation device including a diffraction grating optical modulator (GLV), a digital micro mirror device (DMD), a CRT, and so forth. Also, the color liquid crystal display device is not restricted to the transmissive liquid crystal display device, and a reflection-type liquid crystal display device or semi-transmissive liquid crystal display device may be employed.

First Embodiment

A first embodiment relates to the image display device driving method according to the first mode, sixth mode, eleventh mode, sixteenth mode, and twenty-first mode of the present disclosure, and the image display device assembly driving method according to the first mode, sixth mode, eleventh mode, sixteenth mode, and twenty-first mode of the present disclosure.

Figure 2:
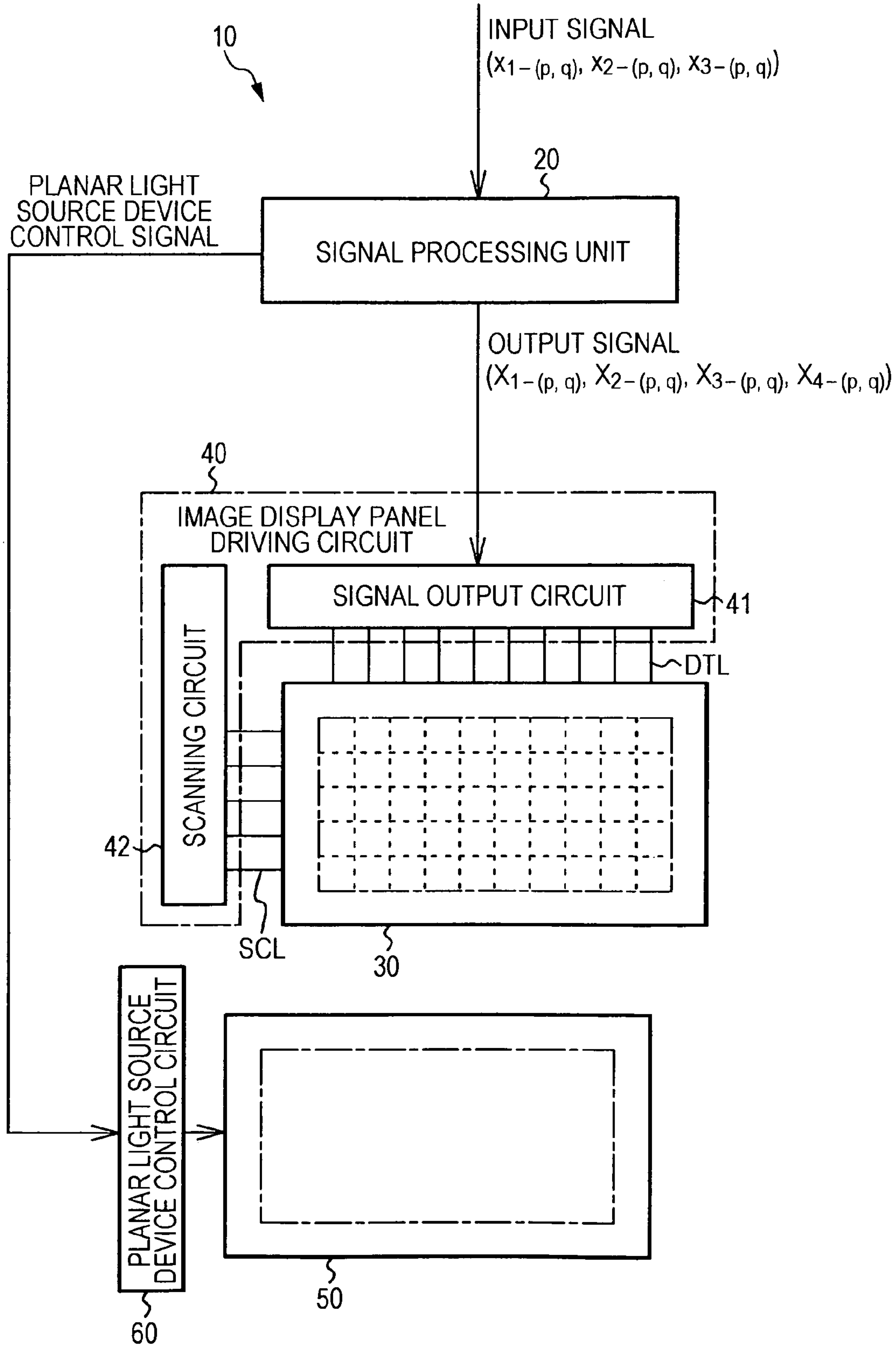
FIG. 2 is a conceptual diagram of an image display device according a first embodiment.

As shown in a conceptual diagram in FIG. 2, an image display device 10 according to the first embodiment includes an image display panel 30 and a signal processing unit 20. Also, an image display device assembly according to the first embodiment includes the image display device 10, and a planar light source device 50 which irradiates the image display device (specifically, image display panel 30) from the back. Now, as shown in conceptual diagrams in FIGS. 3A and 3B, the image display panel 30 is configured of $P_0 \times Q_0$ pixels ($P_0$ pixels in the horizontal direction, $Q_0$ pixels in the vertical direction) being arrayed in a two-dimensional matrix shape each of which is configured of a first sub-pixel for displaying a first primary color (e.g., red, which can be applied to later-described various embodiments) (indicated by "R"), a second sub-pixel for displaying a second primary color (e.g., green, which can be applied to later-described various embodiments) (indicated by "G"), a third sub-pixel for displaying a third primary color (e.g., blue, which can be applied to later-described various embodiments) (indicated by "B"), and a fourth sub-pixel for displaying a fourth color (specifically, white, which can be applied to later-described various embodiments) (indicated by "W").

The image display device according to the first embodiment is configured of, more specifically, a transmissive color liquid crystal display device, the image display panel 30 is configured of a color liquid crystal display panel, and further includes a first color filter, which is disposed between the first sub-pixels R and the image observer, for passing the first primary color, a second color filter, which is disposed between the second sub-pixels G and the image observer, for passing the second primary color, and a third color filter, which is disposed between the third sub-pixels B and the image observer, for passing the third primary color. Note that no color filter is provided to the fourth sub-pixel W. Here, with the fourth sub-pixel W, a transparent resin layer may be provided instead of a color filter, and thus, a great step can be prevented from occurring with the fourth sub-pixel W by omitting a color filter. This can be applied to later-described various embodiments.

Figure 3A:
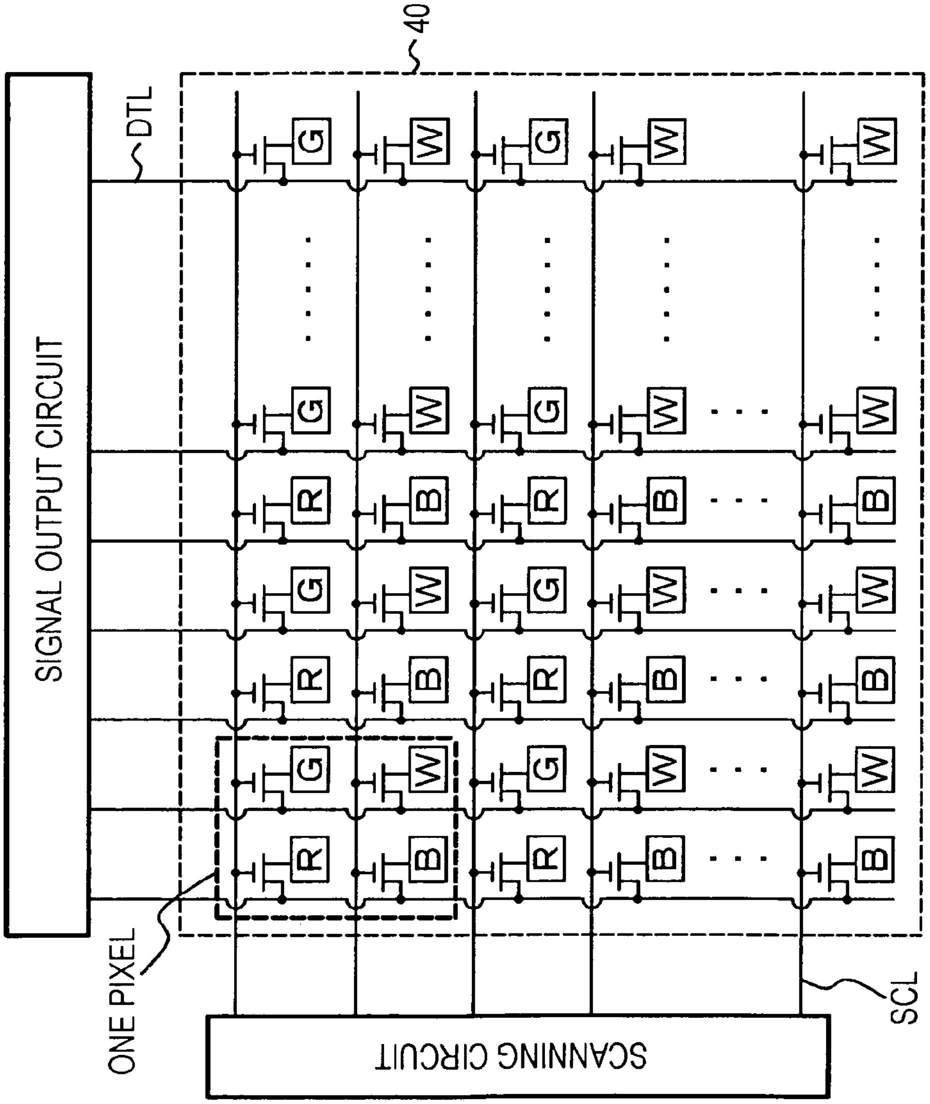
FIGS. 3A and 3B are conceptual diagrams of an image display panel and an image display panel driving circuit of the image display device according to the first embodiment.
Figure 3B:
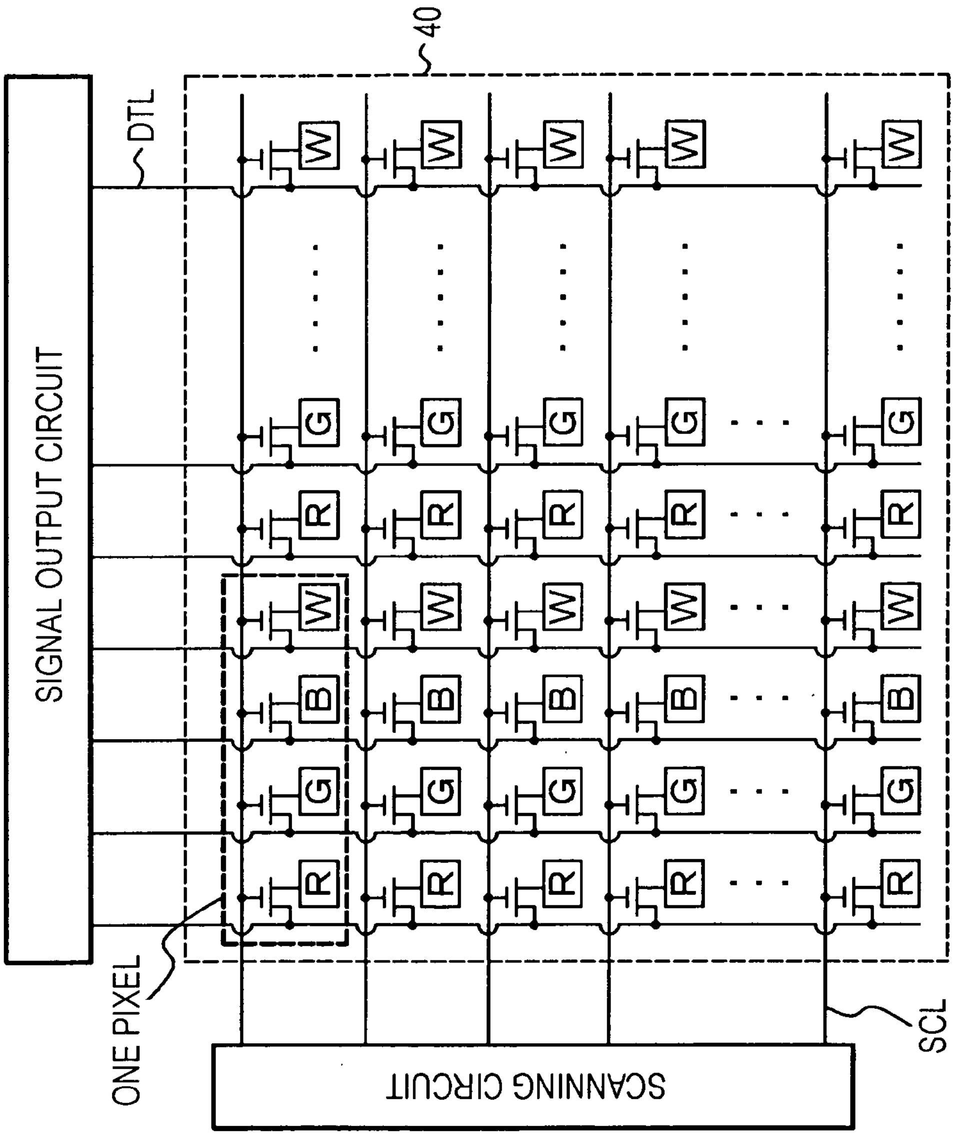

With the first embodiment, in the example shown in FIG. 3A, the first sub-pixels R, second sub-pixels G, third sub-pixels B, and fourth sub-pixels W are arrayed with an array similar to a diagonal array (mosaic array). On the other hand, in the example shown in FIG. 3B, the first sub-pixels R, second sub-pixels G, third sub-pixels B, and fourth sub-pixels W are arrayed with an array similar to a stripe array.

With the first embodiment, the signal processing unit 20 includes an image display panel driving circuit 40 for driving the image display panel (more specifically, color liquid crystal display panel), and a planar light source control circuit 60 for driving a planar light source device 50, and the image display panel driving circuit 40 includes a signal output circuit 41 and a scanning circuit 42. Note that, according to the scanning circuit 42, a switching device (e.g., TFT) for controlling the operation (light transmittance) of a sub-pixel in the image display panel 30 is subjected to on/off control. On the other hand, according to the signal output circuit 41, video signals are held, and sequentially output to the image display panel 30. The signal output circuit 41 and the image display panel 30 are electrically connected by wiring DTL, and the scanning circuit 42 and the image display panel 30 are electrically connected by wiring SCL. This can be applied to later-described various embodiments.

Here, with regard to the (p, q)'th pixel (where $1 \le p \le P_0$, $1 \le q \le Q_0$), a first sub-pixel input signal of which the signal value is $x_{1-(p, q)}$, a second sub-pixel input signal of which the signal value is $x_{2-(p, q)}$, and a third sub-pixel input signal of which the signal value is $x_{3-(p, q)}$ are input to the signal processing unit 20 according to the first embodiment, and the signal input unit 20 outputs a first sub-pixel output signal of which the signal value is $X_{1-(p, q)}$ for determining the display gradation of the first sub-pixel R, a second sub-pixel output signal of which the signal value is $X_{2-(p, q)}$ for determining the display gradation of the second sub-pixel G, a third sub-pixel output signal of which the signal value is $X_{3-(p, q)}$ for determining the display gradation of the third sub-pixel B, and a fourth sub-pixel output signal of which the signal value is $X_{4-(p, q)}$ for determining the display gradation of the fourth sub-pixel W.

With the first embodiment or later-described various embodiments, the maximum value $V_{max}$ of luminosity with the saturation S in the HSV color space enlarged by adding the fourth color (white) as a variable is stored in the signal processing unit 20. That is to say, the dynamic range of the luminosity in the HSV color space is widened by adding the fourth color (white).

Further, the signal processing unit 20 according to the first embodiment obtains a first sub-pixel output signal (signal value $X_{1-(p, q)}$) based on at least the first sub-pixel input signal (signal value $x_{1-(p, q)}$) and the extension coefficient $\alpha_0$ to output to the first sub-pixel R, obtains a second sub-pixel output signal (signal value $X_{2-(p, q)}$) based on at least the second sub-pixel input signal (signal value $x_{2-(p, q)}$) and the extension coefficient $\alpha_0$ to output to the second sub-pixel G, obtains a third sub-pixel output signal (signal value $X_{3-(p, q)}$) based on at least the third sub-pixel input signal (signal value $x_{3-(p, q)}$) and the extension coefficient $\alpha_0$ to output to the third sub-pixel B, and obtains a fourth sub-pixel output signal (signal value $X_{4-(p, q)}$) based on at least the first sub-pixel input signal (signal value $x_{1-(p, q)}$), the second sub-pixel input signal (signal value $x_{2-(p, q)}$), and the third sub-pixel input signal (signal value $x_{3-(p, q)}$) to output to the fourth sub-pixel W.

Specifically, with the first embodiment, the signal processing unit 20 obtains a first sub-pixel output signal based on at least the first sub-pixel input signal and the extension coefficient $\alpha_0$, and the fourth sub-pixel output signal, obtains a second sub-pixel output signal based on at least the second sub-pixel input signal and the extension coefficient $\alpha_0$, and the fourth sub-pixel output signal, and obtains a third sub-pixel output signal based on at least the third sub-pixel input signal and the extension coefficient $\alpha_0$, and the fourth sub-pixel output signal.

Specifically, when assuming that $\chi$ is a constant depending on the image display device, the signal processing unit 20 can obtain the first sub-pixel output signal value $X_{1-(p, q)}$, the second sub-pixel output signal value $X_{2-(p, q)}$, and the third sub-pixel output signal value $X_{3-(p, q)}$, as to the (p, q)'th pixel (or a set of the first sub-pixel R, the second sub-pixel G, and the third sub-pixel B) from the following expressions.

$$X_{1-(p,q)} = \alpha_0 \cdot x_{1-(p,q)} - \chi \cdot X_{4-(p,q)} \tag{1-A}$$

$$X_{2-(p,q)} = \alpha_0 \cdot x_{2-(p,q)} - \chi \cdot X_{4-(p,q)} \tag{1-B}$$

$$X_{3-(p,q)} = \alpha_0 \cdot x_{3-(p,q)} - \chi \cdot X_{4-(p,q)} \tag{1-C}$$

With the first embodiment, the signal processing unit 20 further obtains the maximum value $V_{max}$ of the luminosity with the saturation S in the HSV color space enlarged by adding the fourth color as a variable, and further obtains a reference extension coefficient $\alpha_{0-std}$ based on the maximum value $V_{max}$, and determines the extension coefficient $\alpha_0$ at each pixel from the reference extension coefficient $\alpha_{0-std}$, an input signal correction coefficient $k_{IS}$ based on the sub-pixel input signal value and an external light intensity correction coefficient $k_{OL}$ based on external light intensity at each pixel.

Here, the saturation S and the luminosity V(S) are represented with $$S = (\mathrm{Max} - \mathrm{Min})/\mathrm{Max}$$

$$V(S) = \mathrm{Max},$$

the saturation S can take a value from 0 to 1, the luminosity V(S) can take a value from 0 to $(2^n-1)$, and n represents the number of display gradation bits. Also, Max represents the maximum value of the three of a first sub-pixel input signal value, a second sub-pixel input signal value, and a third sub-pixel input signal value as to a pixel, and Min represents the minimum value of the three of a first sub-pixel input signal value, a second sub-pixel input signal value, and a third sub-pixel input signal value as to a pixel. These can be applied to the following description.

With the first embodiment, specifically, based on the following Expression [i], the extension coefficient $\alpha_0$ is determined.

$$\alpha_0=\alpha_{0\text{-}std}\times(k_{IS}\times k_{OL}+1) \quad [i]$$

Here, the input signal correction coefficient $k_{IS}$ is represented with a function with the sub-pixel input signal values at each pixel as parameters, and specifically a function with the luminosity V(S) at each pixel as a parameter. More specifically, as shown in FIG. 1, this function is a downward protruding monotonically decreasing function wherein when the value of the luminosity V(S) is the maximum value, the value of the input signal correction coefficient $k_{IS}$ is the minimum value ("0"), and when the value of the luminosity V(S) is the minimum value, the value of the input signal correction coefficient $K_{IS}$ is the maximum value. If Expression [i] is expressed based on an input signal correction coefficient $k_{IS\text{-}(p,\,q)}$ at the (p, q)'th pixel, Expression [i] becomes the following Expression [ii]. Note that $\alpha_0$ in the left-hand side in Expression [ii] has to be expressed as "$\alpha_{0\text{-}(p,\,q)}$" in a precise sense, but is expressed as "$\alpha_0$" for convenience of description. That is to say, the expression "$\alpha_0$" is equal to the expression "$\alpha_{0\text{-}(p,\,q)}$".

$$\alpha_0=\alpha_{0\text{-}std}\times(k_{IS\text{-}(p,q)}\times k_{OL}+1) \quad [ii]$$

Also, the external light intensity correction coefficient $k_{OL}$ is a constant depending on external light intensity. The value of the external light intensity correction coefficient $k_{OL}$ may be selected, for example, by the user of the image display device using a changeover switch or the like provided to the image display device, or by the image display device measuring external light intensity using an optical sensor provided to the image display device, and based on a result thereof, selecting the value of the external light intensity correction coefficient $k_{OL}$. Examples of the specific value of the external light intensity correction coefficient $k_{OL}$ include $k_{OL}=1$ under an environment where the sunlight in the summer is strong, and $k_{OL}=0$ under an environment where the sunlight is weak or under an indoor environment. Note that the value of $k_{OL}$ may be a negative value depending on cases.

In this way, a function of the input signal correction coefficient $k_{IS}$ is suitably selected, whereby, for example, increase in the luminance of a pixel at from intermediate gradation to low gradation can be realized, and on the other hand, gradation deterioration at high-gradation pixels can be suppressed, and also a signal exceeding the maximum luminance can be prevented from being output to a high-gradation pixel, and additionally, the value of the external light intensity correction coefficient $k_{OL}$ is suitably selected, whereby correction according to external light intensity can be performed, and visibility of an image displayed on the image display device can be prevented in a surer manner from deteriorating even when external light irradiates the image display device. Note that the input signal correction coefficient $k_{IS}$ and external light intensity correction coefficient $k_{OL}$ should be determined by performing various tests, such as an evaluation test relating to deterioration in the visibility of an image displayed on the image display device when external light irradiates the image display device, and so forth. Also, the input signal correction coefficient $k_{IS}$ and external light intensity correction coefficient $k_{OL}$ should be stored in the signal processing unit 20 as a kind of table, or a lookup table, for example.

With the first embodiment, the signal value $X_{4\text{-}(p,\,q)}$ can be obtained based on the product between $\mathrm{Min}_{(p,\,q)}$ and the extension coefficient $\alpha_0$ obtained from Expression [ii]. Specifically, the signal value $X_{4\text{-}(p,\,q)}$ can be obtained based on the above-described Expression (1-1), and more specifically, can be obtained based on the following expression.

$$X_{4\text{-}(p,q)}=\mathrm{Min}_{(p,q)}\cdot\alpha_0/\chi \quad (11)$$

Note that, in Expression (11), the product between $\mathrm{Min}_{(p,\,q)}$ and the extension coefficient $\alpha_0$ is divided by $\chi$, but a calculation method thereof is not restricted to this. Also, the reference extension coefficient $\alpha_{0\text{-}std}$ is determined for each image display frame.

Hereafter, these points will be described.

Figure 4A:
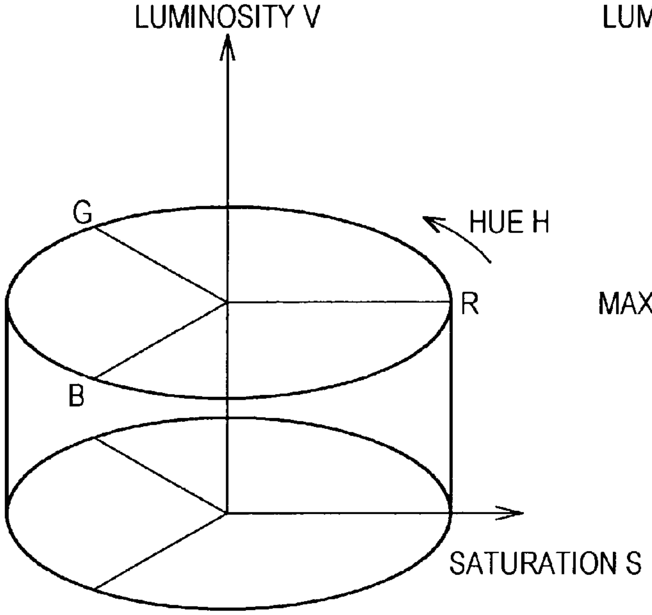
FIGS. 4A and 4B are a conceptual diagram of common columnar HSV color space, and a diagram schematically illustrating a relation between saturation and luminosity respectively.
Figure 4B:
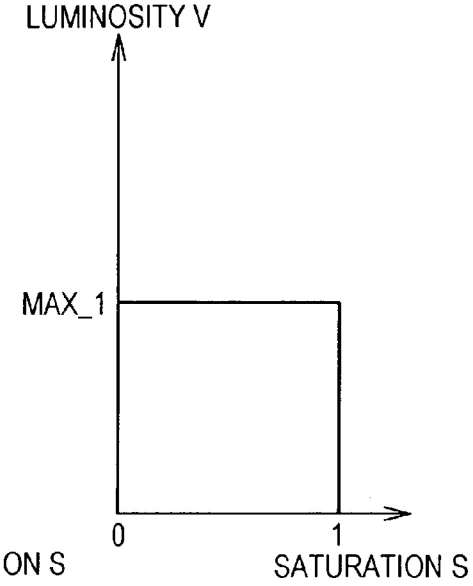

In general, with the (p, q)'th pixel, saturation (Saturation) $S_{(p,\,q)}$ and luminosity (Brightness) $V(S)_{(p,\,q)}$ in HSV color space of a cylinder can be obtained from the following Expression (12-1) and Expression (12-2) based on the first sub-pixel input signal (signal value $X_{1\text{-}(p,\,q)}$, the second sub-pixel input signal (signal value $X_{2\text{-}(p,\,q)}$), and the third sub-pixel input signal (signal value $X_{3\text{-}(p,\,q)}$). Note that a conceptual view of the HSV color space of a cylinder is shown in FIG. 4A, a relation between the saturation S and the luminosity V(S) is schematically shown in FIG. 4B. Note that, in later-descried FIG. 4D, FIG. 5A, and FIG. 5B, the value of the luminosity $(2^n-1)$ is indicated with "MAX_1", and the value of the luminosity $(2'-1)\times(\chi+1)$ is indicated with "MAX_2".

$$S_{(p,q)}=(\mathrm{Max}_{(p,q)}-\mathrm{Min}_{(p,q)})/\mathrm{Max}_{(p,q)} \quad (12\text{-}1)$$

$$V(S)_{(p,q)}=\mathrm{Max}_{(p,q)} \quad (12\text{-}2)$$

Here, $\mathrm{Max}_{(p,\,q)}$ is the maximum value of three sub-pixel input signal values of $(x_{1\text{-}(p,\,q)}, x_{2\text{-}(p,\,q)}, x_{3\text{-}(p,\,q)})$, and $\mathrm{Min}_{(p,\,q)}$ is the minimum value of three sub-pixel input signal values of $(x_{1\text{-}(p,\,q)}, x_{2\text{-}(p,\,q)}, x_{3\text{-}(p,\,q)})$. With the first embodiment, n is set to 8 (n=8). Specifically, the number of display gradation bits is set to 8 bits (the value of display gradation is specifically set to 0 through 255). This can also be applied to the following embodiments.

Figure 4C:
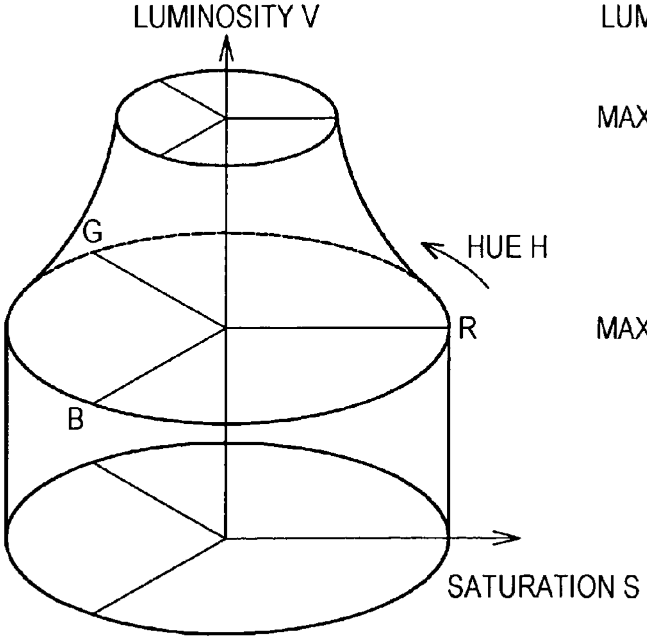
FIGS. 4C and 4D are a conceptual diagram of columnar HSV color space enlarged in the first embodiment, and a diagram schematically illustrating a relation between saturation and luminosity respectively.
Figure 4D:
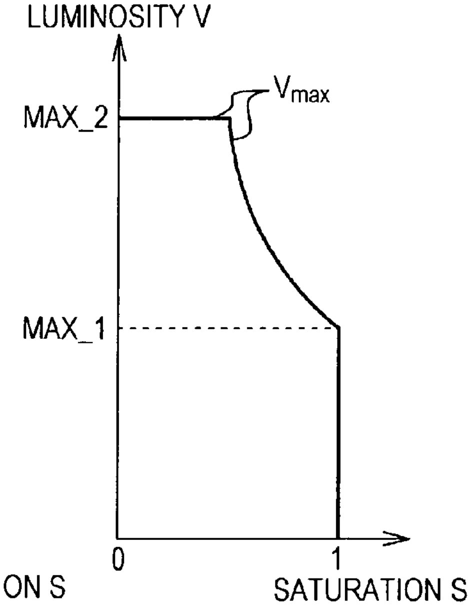

FIGS. 4C and 4D schematically illustrate a conceptual view of the HSV color space of a cylinder enlarge by adding the fourth color (white) according to the first embodiment, and a relation between the saturation S and the luminosity V(S). No color filter is disposed in the fourth sub-pixel W where white is displayed. Let us assume a case where when a signal having a value equivalent to the maximum signal value of first sub-pixel output signals is input to the first sub-pixel R, a signal having a value equivalent to the maximum signal value of second sub-pixel output signals is input to the second sub-pixel G, and a signal having a value equivalent to the maximum signal value of third sub-pixel output signals is input to the third sub-pixel B, the luminance of a group of the first sub-pixel R, the second sub-pixel G, and the third sub-pixel B making up a pixel (the first embodiment through the third embodiment, the ninth embodiment), or a pixel group (the fourth embodiment through the eighth embodiment, the tenth embodiment) is taken as $BN_{1\text{-}3}$, and when a signal having a value equivalent to the maximum signal value of fourth sub-pixel output signals is input to the fourth sub-pixel W making up a pixel (the first embodiment through the third embodiment, the ninth embodiment), or a pixel group (the fourth embodiment through the eighth embodiment, the tenth embodiment), the luminance of the fourth sub-pixel W is taken as $BN_4$. Specifically, white having the maximum luminance is displayed by the group of the first sub-pixel R, the second sub-pixel G, and the third sub-pixel B, and the luminance of such white is represented with $BN_{1-3}$. Thus, when $\chi$ is taken as a constant depending on the image display device, the constant $\chi$ is represented as follows.

$$\chi=BN_4/BN_{1-3}$$

Specifically, the luminance $BN_4$ when assuming that an input signal having a display gradation value 255 is input to the fourth sub-pixel W is 1.5 times as to the luminance $BN_{1-3}$ of white when input signals having the following display gradation values are input to the group of the first sub-pixel R, the second sub-pixel G, and the third sub-pixel B, $$x_{1-(p,q)}=255$$

$$x_{2-(p,q)}=255$$

$$x_{3-(p,q)}=255.$$

That is to say, with the first embodiment, $$\chi=1.5$$

In the event that the signal value $X_{4-(p, q)}$ is provided by the above-described Expression (11), $V_{max}$ can be represented by the following expressions.

Case of $S \geq S_0$:

$$V_{max}=(\chi+1)\cdot(2^n-1) \quad (13\text{-}1)$$

Case of $S_0 \leq S_0 \leq 1$:

$$V_{max}=(2^n-1)\cdot(1/S) \quad (13\text{-}2)$$

here, $$S_0=1/(\chi+1)$$

The thus obtained maximum value $V_{max}$ of the luminosity with the saturation S in the HSV color space enlarged by adding the fourth color as a variable is, for example, stored in the signal processing unit 20 as a kind of lookup table, or obtained at the signal processing unit 20 every time.

Hereafter, how to obtain output signal values $X_{1-(p, q)}$, $X_{2-(p, q)}$, $X_{3-(p, q)}$, and $X_{4-(p, q)}$ at the (p, q)'th pixel (extension processing) will be described. Note that the following processing will be performed so as to maintain a ratio of the luminance of the first primary color displayed by (the first sub-pixel R+the fourth sub-pixel W), the luminance of the second primary color displayed by (the second sub-pixel G+the fourth sub-pixel W), and the luminance of the third primary color displayed by (the third sub-pixel B+the fourth sub-pixel W). Moreover, the following processing will be performed so as to keep (maintain) color tone. Further, the following processing will be performed so as to keep (maintain) gradation-luminance property (gamma property, $\gamma$ property).

Also, in the event that, with one of pixels or pixel groups, all of the input signal values are "0" (or small), the reference extension coefficient $\alpha_{0-std}$ should be obtained without including such a pixel or pixel group. This can also be applied to the following embodiments.

Process 100

First, the signal processing unit 20 obtains, based on sub-pixel input signal values of multiple pixels, the saturation S and the luminosity V(S) of these multiple pixels. Specifically, the signal processing unit 20 obtains $S_{(p, q)}$ and $V(S)_{(p, q)}$ from Expression (12-1) and Expression (12-2) based on the first sub-pixel input signal value $x_{1-(p, q)}$, the second sub-pixel input signal value $x_{2-(p, q)}$, and the third sub-pixel input signal value $x_{3-(p, q)}$ as to the (p, q)'th pixel. The signal processing unit 20 performs this processing as to all of the pixels. Further, the signal processing unit 20 obtains the maximum value $V_{max}$ of luminosity.

Process 110

Next, the signal processing unit 20 obtains the reference extension coefficient $\alpha_{0-std}$ based on the maximum value V. Specifically, of the values of $V_{max}/V(S)_{(p, q)}$ [$\approx\alpha(S)_{(p, q)}$] obtained at multiple pixels, the smallest value ($\alpha_{min}$) is taken as the reference extension coefficient $\alpha_{0-std}$.

Process 120

Next, the signal processing unit 20 determines the extension coefficient $\alpha_0$ at each pixel from the reference extension coefficient $\alpha_{0-std}$, the input signal correction coefficient $k_{IS}$ based on the sub-pixel input signal values at each pixel, and external light intensity correction coefficient $k_{OL}$ based on external light intensity. Specifically, as described above, the signal processing unit 20 determines the extension coefficient $\alpha_0$ base on the following Expression (14) (above-described Expression [ii]).

$$\alpha_0=\alpha_{0-std}\times(k_{IS-(p,q)}\times k_{OL}+1) \quad (14)$$

Process 130

Next, the signal processing unit 20 obtains the signal value $X_{4-(p, q)}$ at the (p, q)'th pixel based on at least the signal value $X_{1-(p, q)}$, the signal value $X_{2-(p, q)}$, and the signal value $X_{3-(p, q)}$. Specifically, with the first embodiment, the signal value $X_{4-(p, q)}$ is determined based on $Min_{(p, q)}$, extension coefficient $\alpha_0$, and constant $\chi$. More specifically, with the first embodiment, as described above, the signal value $X_{4-(p, q)}$ is obtained based on $$X_{4-(p,q)}=Min_{(p,q)}\cdot\alpha_0/\chi \quad (11)$$

Note that the signal value $X_{4-(p, q)}$ is obtained at all of the $P_0\times Q_0$ pixels.

Process 140

Then, the signal processing unit 20 obtains the signal value $X_{1-(p, q)}$ at the (p, q)'th pixel based on the signal value $x_{1-(p, q)}$, extension coefficient $\alpha_0$, and signal value $X_{4-(p, q)}$, obtains the signal value $X_{2-(p, q)}$ at the (p, q)'th pixel based on the signal value $X_{2-(p, q)}$, extension coefficient $\alpha_0$, and signal value $X_{4-(p, q)}$, and the signal value $X_{3-(p, q)}$ at the (p, q)'th pixel based on the signal value $x_{3-(p, q)}$, extension coefficient $\alpha_0$, and signal value $X_{4-(p, q)}$. Specifically, the signal value $X_{1-(p, q)}$, signal value $X_{2-(p, q)}$, and signal value $X_{3-(p, q)}$ at the (p, q)'th pixel are, as described above, obtained based on the following expressions.

$$X_{1-(p,q)}=\alpha_0\cdot x_{1-(p,q)}-\chi\cdot X_{4-(p,q)} \quad (1\text{-A})$$

$$X_{2-(p,q)}=\alpha_0\cdot x_{2-(p,q)}-\chi\cdot X_{4-(p,q)} \quad (1\text{-B})$$

$$X_{3-(p,q)}=\alpha_0\cdot x_{3-(p,q)}-\chi\cdot X_{4-(p,q)} \quad (1\text{-C})$$

Figure 5A:
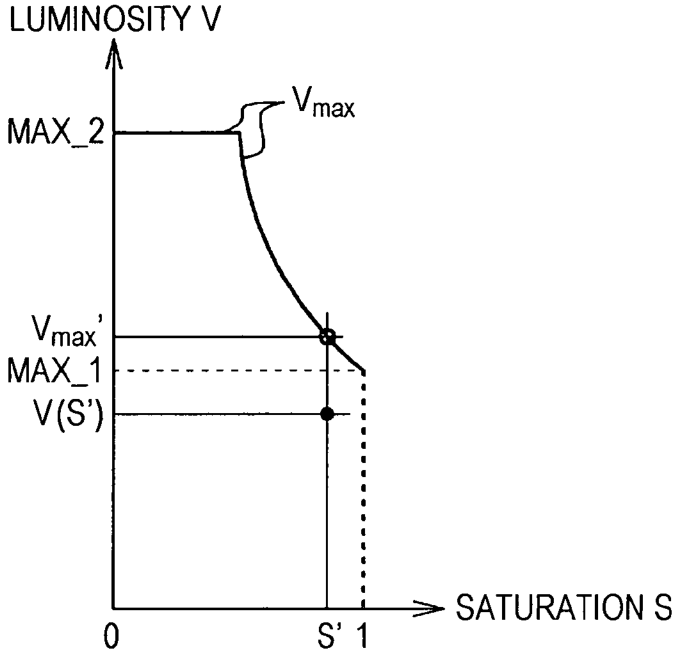
FIGS. 5A and 5B are each diagrams schematically illustrating a relation between saturation and luminosity in columnar HSV color space enlarged by adding a fourth color (white) in the first embodiment.
Figure 5B:
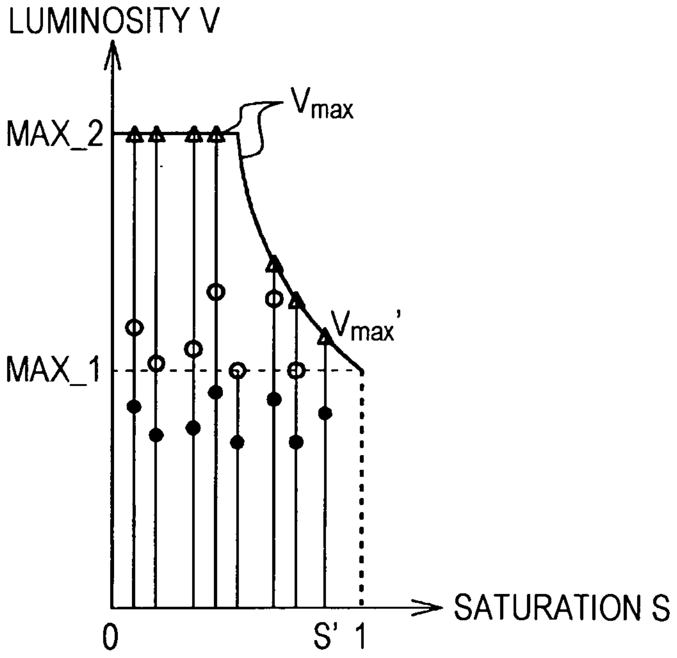

In FIGS. 5A and 5B schematically illustrating a relation between the saturation S and luminosity V(S) in the HSV color space of a cylinder enlarged by adding the fourth color (white) according to the first embodiment, the value of the saturation S providing $\alpha_0$ is indicated with "S'", the luminosity V(S) at the saturation S' is indicated with "V(S')", and $V_{max}$ is indicated with "$V_{max}$'". Also, in FIG. 5B, V(S) is indicated with a black round mark, and $V(S)\times\alpha_0$ is indicated with a white round mark, and $V_{max}$ at the saturation S is indicated with a white triangular mark.

Figure 6:
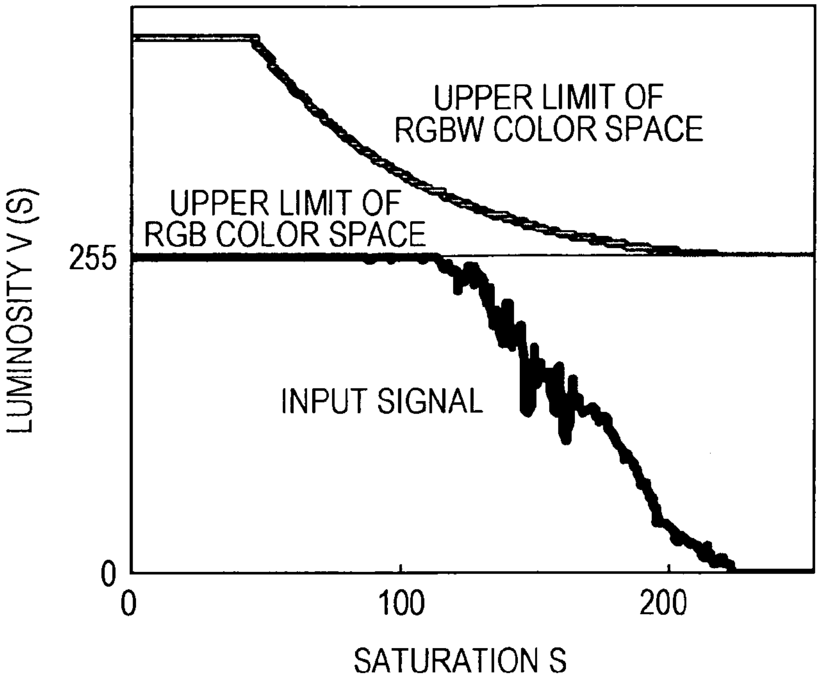
FIG. 6 is a diagram illustrating a relation between HSV color space according to the related art before adding the fourth color (white) in the first embodiment, HSV color space enlarged by adding a fourth color (white), and the saturation and luminosity of an input signal.
Figure 7:
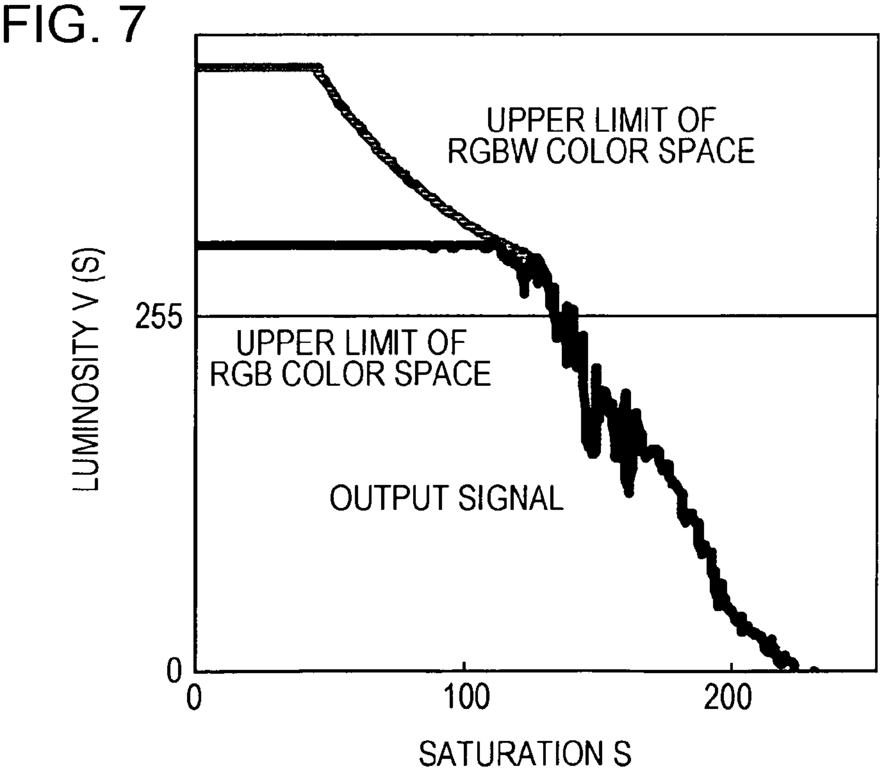
FIG. 7 is a diagram illustrating a relation between HSV color space according to the related art before adding the fourth color (white) in the first embodiment, HSV color space enlarged by adding a fourth color (white), and the saturation and luminosity of an output signal (subjected to extension processing)

FIG. 6 illustrates an example of the HSV color space in the past before adding the fourth color (white) according to the first embodiment, the HSV color space enlarged by adding the fourth color (white), and a relation between the saturation S and luminosity V(S) of an input signal. Also, FIG. 7 illustrates an example of the HSV color space in the past before adding the fourth color (white) according to the first embodiment, the HSV color space enlarged by adding the fourth color (white), and a relation between the saturation S and luminosity V(S) of an output signal (subjected extension processing). Note that the value of the saturation S of the lateral axis in FIGS. 6 and 7 is originally a value between 0 through 1, but the value is displayed by 255 times of the original value.

Here, the important point is, as shown in Expression (11), that the value of $\mathrm{Min}_{(p,q)}$ is extended by $\alpha_0$. In this way, the value of $\mathrm{Min}_{(p,q)}$ is extended by $\alpha_0$, and accordingly, not only the luminance of the white display sub-pixel (the fourth sub-pixel W) but also the luminance of the red display sub-pixel, green display sub-pixel, and blue display sub-pixel (first sub-pixel R, second sub-pixel G, and third sub-pixel B) are increased as shown in Expression (1-A), Expression (1-B), and Expression (1-C). Accordingly, change in color can be suppressed, and also occurrence of a problem wherein dullness of a color occurs can be prevented in a sure manner. Specifically, as compared to a case where the value of $\mathrm{Min}_{(p,q)}$ is not extended, the value of $\mathrm{Min}_{(p,q)}$ is extended by $\alpha_0$, and accordingly, the luminance of the pixel is extended $\alpha_0$ times. Accordingly, this is optimum, for example, in a case where image display of still images or the like can be performed with high luminance.

When assuming that $\chi$=1.5, and $(2^n-1)$=255, output signal values ($X_{1-(p,q)}$, $X_{2-(p,q)}$, $X_{3-(p,q)}$, $X_{4-(p,q)}$) to be output in the event that the values shown in the following Table 2 are input as input signal values ($x_{1-(p,q)}$, $x_{2-(p,q)}$, $x_{3-(p,q)}$) will be shown in the following Table 2. Note that $\alpha_0$ is set to 1.467 ($\alpha_0$=1.467).

TABLE 2

| No. | $x_1$ | $x_2$ | $x_3$ | Max | Min | S | V | $V_{max}$ | $\alpha = V_{max}/V$ |
|---|---|---|---|---|---|---|---|---|---|
| 1 | 240 | 255 | 160 | 255 | 160 | 0.373 | 255 | 638 | 2.502 |
| 2 | 240 | 160 | 160 | 240 | 160 | 0.333 | 240 | 638 | 2.658 |
| 3 | 240 | 80 | 160 | 240 | 80 | 0.667 | 240 | 382 | 1.592 |
| 4 | 240 | 100 | 200 | 240 | 100 | 0.583 | 240 | 437 | 1.821 |
| 5 | 255 | 81 | 160 | 255 | 81 | 0.682 | 255 | 374 | 1.467 |

| No. | $X_4$ | $X_1$ | $X_2$ | $X_3$ |
|---|---|---|---|---|
| 1 | 156 | 118 | 140 | 0 |
| 2 | 156 | 118 | 0 | 0 |
| 3 | 78 | 235 | 0 | 118 |
| 4 | 98 | 205 | 0 | 146 |
| 5 | 79 | 255 | 0 | 116 |

For example, with the input signal values in No. 1 shown in Table 2, upon taking the extension coefficient $\alpha_0$ into consideration, the luminance values to be displayed based on the input signal values ($X_{1-(p,q)}$, $X_{2-(p,q)}$, $X_{3-(p,q)}$)=(240, 255, 160) are as follows when conforming to 8-bit display.

Luminance value of first sub-pixel $$R=\alpha_0 \cdot x_{1-(p,q)}=1.467\times 240=352$$

Luminance value of second sub-pixel $$G=\alpha_0 \cdot x_{2-(p,q)}=1.467\times 255=374$$

Luminance value of third sub-pixel $$B=\alpha_0 \cdot x_{3-(p,q)}=1.467\times 160=234$$

On the other hand, the obtained value of the output signal value $X_{4-(p,q)}$ of the fourth sub-pixel is 156. Accordingly, the luminance value thereof is as follows.

Luminance value of fourth sub-pixel $$W=\chi \cdot X_{4-(p,q)}=1.5\times 156=234$$

Accordingly, the first sub-pixel output signal value $X_{1-(p,q)}$, second sub-pixel output signal value $X_{2-(p,q)}$, and third sub-pixel output signal value $X_{3-(p,q)}$ are as follows.

$$X_{1-(p,q)}=352-234=118$$

$$X_{2-(p,q)}=374-234=140$$

$$X_{3-(p,q)}=234-234=0$$

In this way, with a pixel to which the signal value in No. 1 shown in Table 2, an output signal value as to the sub-pixel of the smallest input signal value (third sub-pixel B in this case) is 0, and the display of the third sub-pixel is substituted with the fourth sub-pixel W. Also, the values of the output signal values $X_{1-(p,q)}$, $X_{2-(p,q)}$, $X_{3-(p,q)}$ of the first sub-pixel R, second sub-pixel G, and third sub-pixel B originally become values smaller than requested values.

With the image display device assembly according to the first embodiment and the driving method thereof, the signal value $X_{1-(p,q)}$, signal value $X_{2-(p,q)}$, signal value $X_{3-(p,q)}$ at the (p, q)'th pixel are extended based on the reference extension coefficient $\alpha_{0-std}$. Therefore, in order to have generally the same luminance as the luminance of an image in an unextended state, the luminance of the planar light source device 50 should be decreased based on the reference extension coefficient $\alpha_{0-std}$. Specifically, the luminance of the planar light source device 50 should be enlarged by $1(1/\alpha_{0-std})$ times. Thus, reduction in the power consumption of the planar light source device can be realized.

Figure 8A:
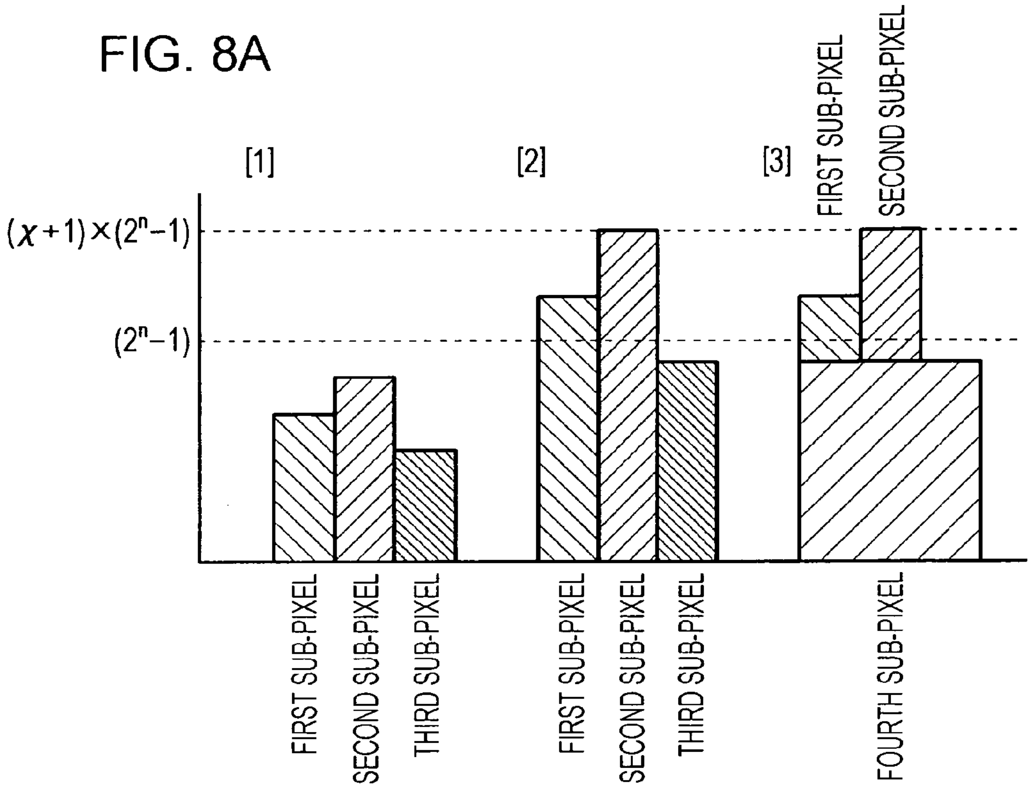
FIGS. 8A and 8B are diagrams schematically illustrating an input signal value and an output signal value for describing difference between an image display device driving method according to the first embodiment, extension processing of an image display device assembly driving method, and a processing method disclosed in Japanese Patent No. 3805150.
Figure 8B:
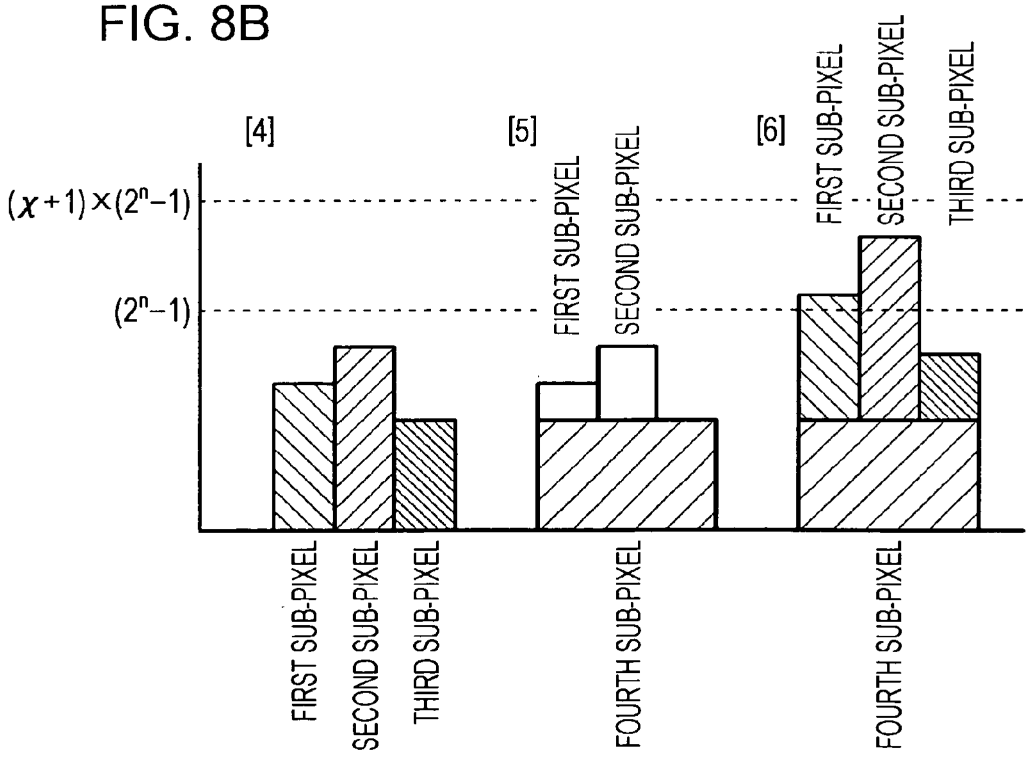

Now, difference between the extension processing according to the image display device driving method and the image display device assembly driving method according to the first embodiment, and the above-described processing method disclosed in Japanese Patent No. 3805150 will be described based on FIGS. 8A and 8B. FIGS. 8A and 8B are diagrams schematically illustrating the input signal values and output signal values according to the image display device driving method and the image display device assembly driving method according to the first embodiment, and the processing method disclosed in Japanese Patent No. 3805150. With the example shown in FIG. 8A, the input signal values of the first sub-pixel R, second sub-pixel G, and third sub-pixel B are shown in [1]. Also, a state in which the extension processing is being performed (an operation for obtaining product between an input signal value and the extension coefficient $\alpha_0$) is shown in [2]. Further, a state after the extension processing was performed (a state in which the output signal values $X_{1-(p,q)}$, $X_{2-(p,q)}$, $X_{3-(p,q)}$, and $X_{4-(p,q)}$ have been obtained) is shown in [3]. On the other hand, the input signal values of a set of the first sub-pixel R, second sub-pixel G, and third sub-pixel B according to the processing method disclosed in Japanese Patent No. 3805150 are shown in [4]. Note that these input signal values are the same as shown in [1] in FIG. 8A. Also, the digital values Ri, Gi, and Bi of a sub-pixel for red input, a sub-pixel for green input, and a sub-pixel for blue input, and a digital value W for driving a sub-pixel for luminance are shown in [5]. Further, the obtained result of each value of Ro, Go, Bo, and W is shown in [6]. According to FIGS. 8A and 8B, with the image display device driving method and the image display device assembly driving method according to the first embodiment, the maximum realizable luminance is obtained at the second sub-pixel G. On the other hand, with the processing method disclosed in Japanese Patent No. 3805150, it turns out that the luminance has not reached the maximum realizable luminance at the second sub-pixel G. As described above, as compared to the processing method disclosed in Japanese Patent No.

3805150, with the image display device driving method and the image display device assembly driving method according to the first embodiment, image display at higher luminance can be realized.

As described above, of the values of $V_{max}/V(S)_{(p,\ q)}$ [$\equiv\alpha(S)_{(p,\ q)}$] obtained at multiple pixels, instead of the minimum value ($\alpha_{min}$) being taken as the reference extension coefficient $\alpha_{0\text{-}std}$, the values of the reference extension coefficients $\alpha_{0\text{-}std}$ obtained at multiple pixels (in the first embodiment, all of the $P_0 \times Q_0$ pixels) are arrayed in an ascending order, and of the values of the $P_0 \times Q_0$ reference extension coefficients $\alpha_{0\text{-}std}$, the reference extension coefficient $\alpha_{0\text{-}std}$ equivalent to the $\beta_0 \times P_0 \times Q_0$'th from the minimum value may be taken as the reference extension coefficient $\alpha_{0\text{-}std}$. That is to say, the reference extension coefficient $\alpha_{0\text{-}std}$ may be determined such that a ratio of pixels where the value of the luminosity obtained from the product between the luminosity V(S) and the reference extension coefficient $\alpha_{0\text{-}std}$ and extended exceeds the maximum value $V_{max}$ as to all of the pixels becomes a predetermined value ($\beta_0$) or less.

Here, $\beta_0$ should be taken as 0.003 through 0.05 (0.3% through 5%), and specifically, $\beta_0$ has been set to 0.01 ($\beta_0$=0.01). This value of $\beta_0$ has been determined after various tests.

Then, Process 130 and Process 140 should be executed.

In the event that the minimum value of $V_{max}/V(S)$ [$\equiv\alpha(S)_{(p,\ q)}$] has been taken as the reference extension coefficient $\alpha_{0\text{-}std}$, the output signal value as to an input signal value does not exceed ($2^8-1$). However, upon determining the reference extension coefficient $\alpha_{0\text{-}std}$ as described above instead of the minimum value of $V_{max}/V(S)$, a case may occur where the value of extended luminosity exceeds the maximum value $V_{max}$, and as a result thereof, gradation reproduction may suffer. However, when the value of $\beta_0$ was set to, for example, 0.003 through 0.05 as described above, occurrence of a phenomenon where an unnatural image with conspicuous determination in gradation is generated was prevented. On the other hand, upon the value of $\beta_0$ exceeding 0.05, it was confirmed that in some cases gradation an unnatural image is generated with conspicuous determination in gradation. Note that in the event that an output signal value exceeds ($2^n-1$) that is the upper limit value by the extension processing, the output signal value should be set to ($2^n-1$) that is the upper limit value.

Incidentally, in general, the value of $\alpha(S)$ exceeds 1.0 and also concentrates on 1.0 neighborhood. Accordingly, in the event that the minimum value of $\alpha(S)$ is taken as the reference extension coefficient $\alpha_{0\text{-}std}$, the extension level of the output signal value is small, and there may often be caused a case where it becomes difficult to achieve low consumption power of the image display device assembly. Therefore, for example, the value of $\beta_0$ is set to 0.003 through 0.05, whereby the value of the reference extension coefficient $\alpha_{0\text{-}std}$ can be increased, and thus, the luminance of the planar light source device 50 should be set ($1/\alpha_{0\text{-}std}$) times, and accordingly, low consumption power of the image display device assembly can be achieved.

Note that it was proven that there may be a case where even in the event that the value of $\beta_0$ exceeds 0.05, when the value of the reference extension coefficient $\alpha_{0\text{-}std}$ is small, and an unnatural image with conspicuous gradation deterioration is not generated. Specifically, it was proven that there may be a case where even if the following value is alternatively employed as the value of the reference extension coefficient $\alpha_{0\text{-}std}$, $$\alpha_{0-std} = (BN_4/BN_{1-3}) + 1 \quad (15\text{-}1)$$
$$= \chi + 1 \quad (15\text{-}2)$$

and an unnatural image with conspicuous gradation deterioration is not generated, and moreover, low consumption power of the image display device assembly can be achieved.

However, when setting the value of the reference extension coefficient $\alpha_{0\text{-}std}$ as follows, $$\alpha_{0\text{-}std}=\chi+1 \quad (15\text{-}2)$$

in the event that a ratio ($\beta''$) of pixels wherein the value of extended luminosity obtained from the product between the luminosity V(S) and the reference extension coefficient $\alpha_{0\text{-}std}$ exceeds the maximum value $V_{max}$, as to all of the pixels is extremely greater than the predetermined value ($\beta_0$) (e.g., $\beta''$=0.07), it is desirable to employ an arrangement wherein the reference extension coefficient is restored to the $\alpha_{0\text{-}std}$ obtained in Process 110.

Then, Process 130 and Process 140 should be executed.

Also, it was proven that in the event that yellow is greatly mixed in the color of an image, upon the reference extension coefficient $\alpha_{0\text{-}std}$ exceeding 1.3, yellow dulls, and the image becomes an unnatural colored image. Accordingly, various tests were performed, and a result was obtained wherein when the hue H and saturation S in the HSV color space are defines in the following expressions $$40 \le H \le 65 \quad (16\text{-}1)$$

$$0.5 \le S \le 1.0 \quad (16\text{-}2)$$

and, a ratio of pixels satisfying the above-described ranges as to all of the pixels exceeds a predetermined value $\beta'_0$ (e.g., specifically, 2%) (i.e., when yellow is greatly mixed in the color of an image), the reference extension coefficient $\alpha_{0\text{-}std}$ is set to a predetermined value $\alpha'_{0\text{-}std}$ or less, and specifically set to 1.3 or less, yellow does not dull, and an unnatural-colored image is not generated. Further, reduction in consumption power of the entire image display device assembly into which the image display device has been built was realized.

Here, with (R, G, B), when the value of R is the maximum, the following expression holds.

$$H=60(G-B)/(\text{Max}-\text{Min}) \quad (16\text{-}3)$$

When the value of G is the maximum, the following expression holds.

$$H=60(B-R)/(\text{Max}-\text{Min})+120 \quad (16\text{-}4)$$

When the value of B is the maximum, the following expression holds.

$$H=60(R-G)/(\text{Max}-\text{Min})+240 \quad (16\text{-}5)$$

Then, Process 130 and Process 140 should be executed.

Note that as determination whether or not yellow is greatly mixed in the color of an image, instead of $$40 \le H \le 65 \quad (16\text{-}1)$$

$$0.5 \le S \le 1.0 \quad (16\text{-}2)$$

when a color defined in (R, G, B) is arranged to be displayed at pixels, and a ratio of pixels of which (R, G, B) satisfies the following Expression (17-1) through Expression (17-6), as to all of the pixels exceeds a predetermined value $\beta'_0$ (e.g., specifically, 2%), the reference extension coefficient $\alpha_{0\text{-}std}$ may be set to a predetermined value $\alpha'_{0\text{-}std}$ or less (e.g., specifically, 1.3 or less).

Here, with (R, G, B), in the event that the value of R is the highest value, and the value of B is the lowest value, the following conditions are satisfied.

$$R \geq 0.78 \times (2^n - 1) \tag{17-1}$$

$$G \geq (2R/3) + (B/3) \tag{17-2}$$

$$B \leq 0.50R \tag{17-3}$$

Alternatively, with (R, G, B), in the event that the value of G is the highest value, and the value of B is the lowest value, the following conditions are satisfied $$R \geq (4B/60) + (56G/60) \tag{17-4}$$

$$G \geq 0.78 \times (2^t - 1) \tag{17-5}$$

$$B \leq 0.50R \tag{17-6}$$

where n is the number of display gradation bits.

As described above, Expression (17-1) through Expression (17-6) are used, whereby whether or not yellow is greatly mixed in the color of an image can be determined with a little computing amount, the circuit scale of the signal processing unit 20 can be reduced, and reduction in computing time can be realized. However, the coefficients and numeric values in Expression (17-1) through Expression (17-6) are not restricted to these. Also, in the event that the number of data bits of (R, G, B) is great, determination can be made with smaller computing amount by using higher order bits alone, and further reduction in the circuit scale of the signal processing unit 20 can be realized. Specifically, in the event of 16-bit data and R=52621 for example, when using eight higher order bits, R is set to 205 (R=205).

Alternatively, in other words, when a ratio of pixels displaying yellow as to the all of the pixels exceeds a predetermined value $\beta'_0$ (e.g., specifically, 2%), the reference extension coefficient $\alpha_{0\text{-}std}$ is set to the predetermined value or less (e.g., specifically, 1.3 or less).

Note that Expression (14) and the value range of $\beta_0$ according to the image display device driving method according to the first mode of the present disclosure, which have been described in the first embodiment, Expression (15-1) and Expression (15-2) according to the image display device driving method according to the sixth mode of the present disclosure, Expression (16-1) through Expression (16-5) according to the image display device driving method according to the eleventh mode of the present disclosure, or alternatively, the stipulations of Expression (17-1) through Expression (17-6) according to the image display device driving method according to the sixteenth mode of the present disclosure, or alternatively, the stipulations according to the image display device driving method according to the twenty-first mode of the present disclosure can also be applied to the following embodiments. Accordingly, with the following embodiments, these descriptions will be omitted, and entirely, description relating to sub-pixels making a pixel will be made, and a relation between an input signal and an output signal as to a sub-pixel, and so forth will be described.

Second Embodiment

A second embodiment is a modification of the first embodiment. As the planar light source device, a direct-type planar light source device according to the related art may be employed, but with the second embodiment, a planar light source device 150 of a split driving method (partial driving method) which will be described below is employed. Note that extension processing itself should be the same as the extension processing described in the first embodiment.

Figure 9:
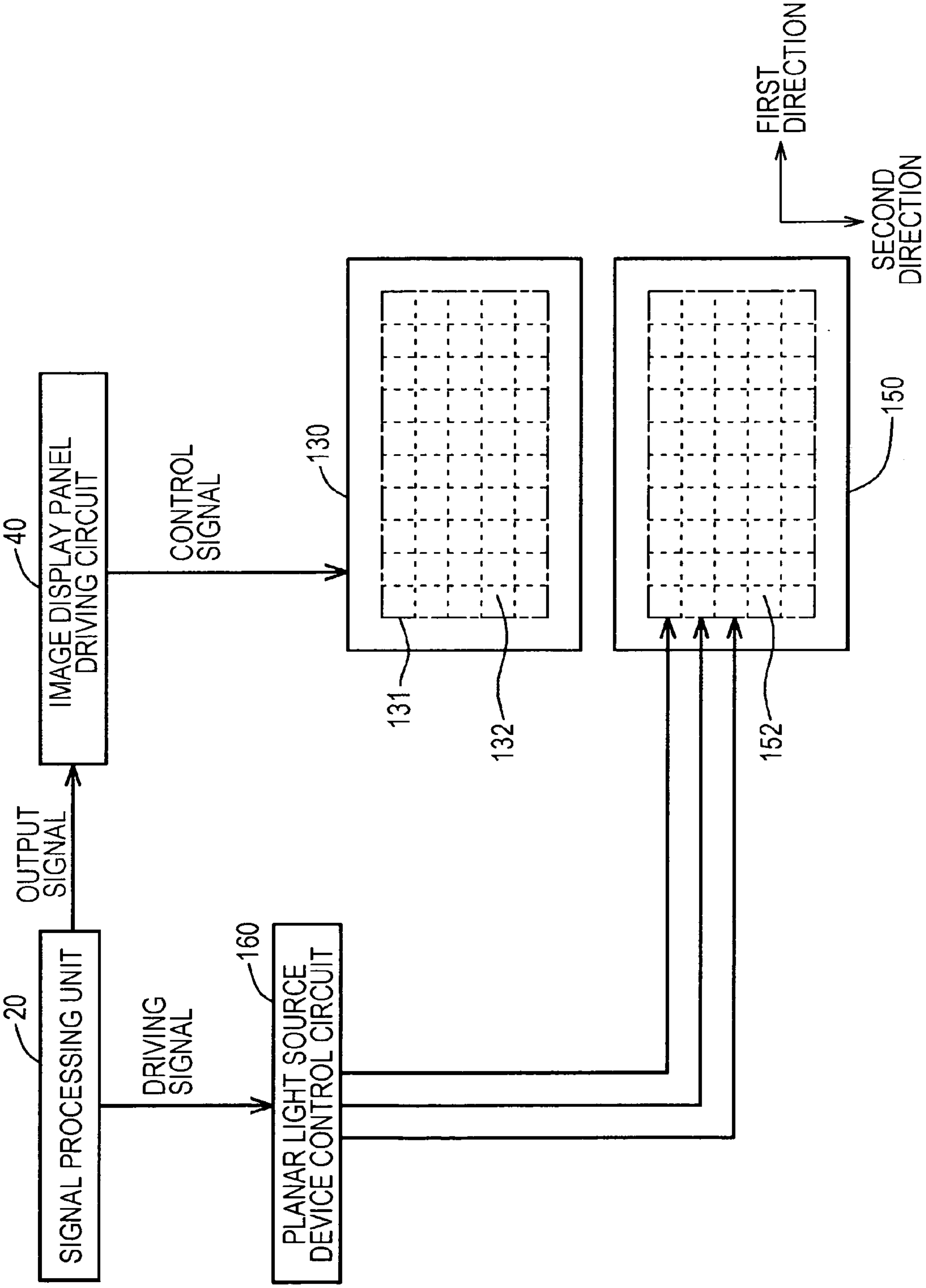
FIG. 9 is a conceptual diagram of an image display panel and a planar light source device making up an image display device assembly according to a second embodiment.
Figure 10:
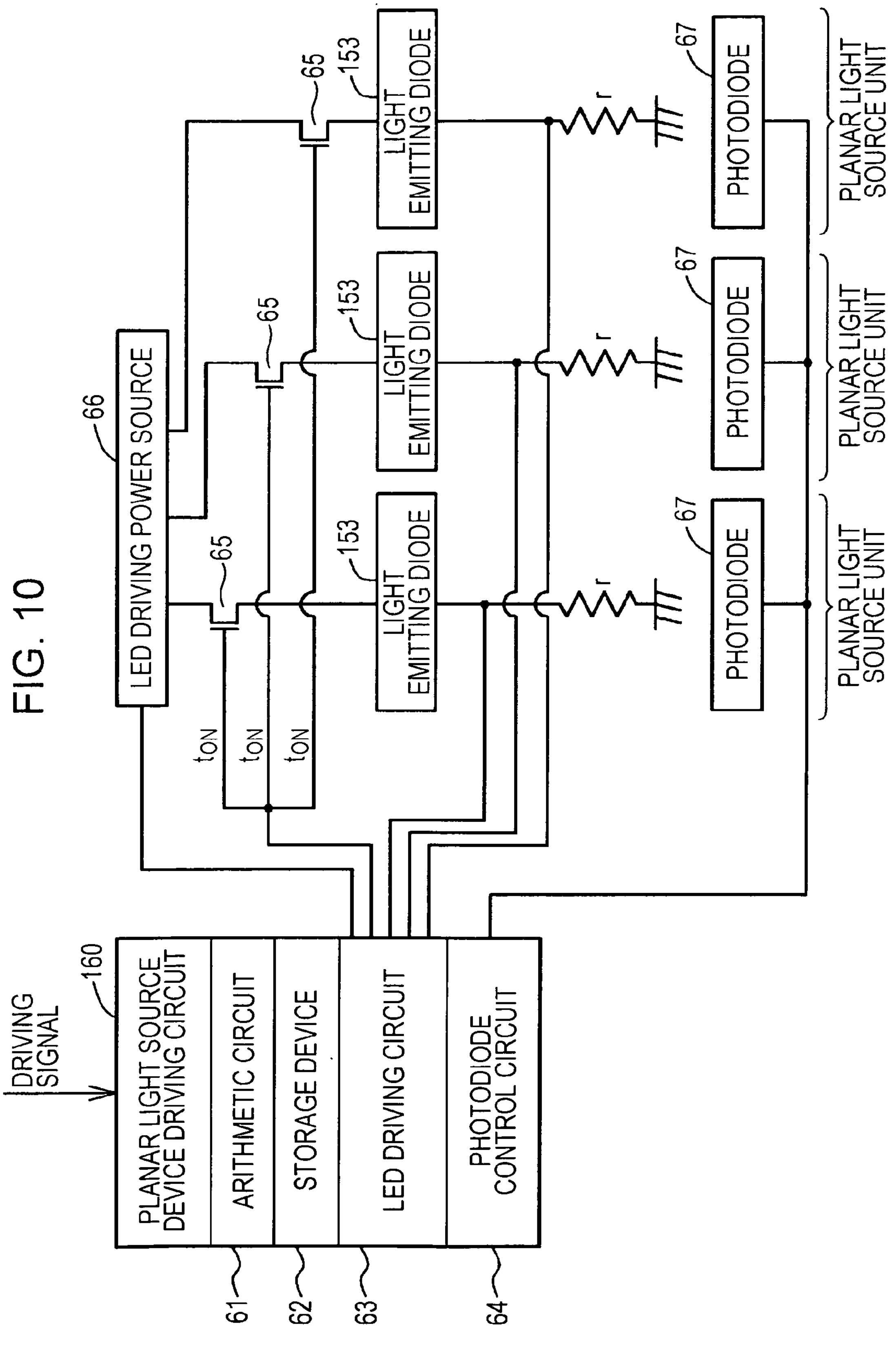
FIG. 10 is a circuit diagram of a planar light source device control circuit of a planar light source device making up the image display device assembly according to the second embodiment.
Figure 11:
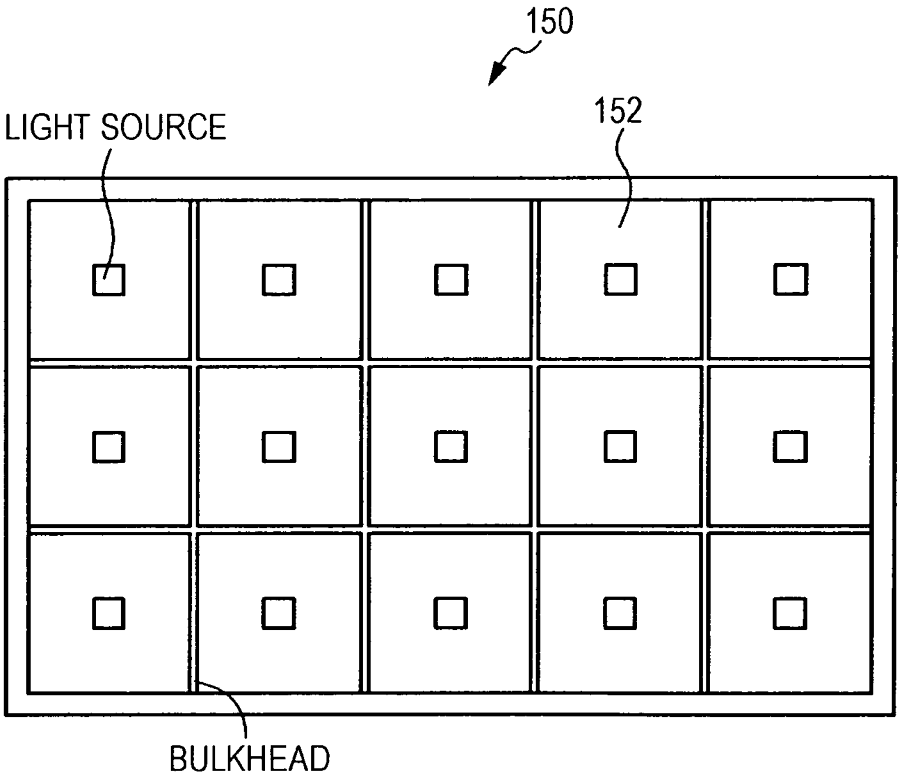
FIG. 11 is a diagram schematically illustrating layout and array states of a planar light source unit and so forth of the planar light source device making up the image display device assembly according to the second embodiment.

A conceptual view of an image display panel and a planar light source device making up an image display device assembly according to the second embodiment is shown in FIG. 9, a circuit diagram of a planar light source device control circuit according to the planar light source device making up the image display device assembly is shown in FIG. 10, and the layout and array state of a planar light source unit and so forth according to the planar light source device making up the image display device assembly are schematically shown in FIG. 11.

The planar light source device 150 of the split driving method is made up of, when assuming that a display region 131 of an image display panel 130 making up a color liquid crystal display device has been divided into S×T virtual display region units 132, S×T planar light source units 152 corresponding to these S×T display region units 132, and the emission states of the S×T planar light source units 152 are individually controlled.

As shown in a conceptual view in FIG. 9, the image display panel (color liquid crystal display panel) 130 includes a display region 131 of P×Q pixels in total of P pixels in a first direction, and Q pixels in a second direction being arrayed in a two-dimensional matrix shape. Now, let us assume that the display region 131 has been divided into S×T virtual display region units 132. Each display region unit 132 is configured of multiple pixels. Specifically, for example, the HD-TV stipulations are satisfied as resolution for image display, and when the number of pixels P×Q arrayed in a two-dimensional matrix shape is represented with (P, Q), the resolution for image display is (1920, 1080), for example. Also, the display region 131 made up of the pixels arrayed in a two-dimensional matrix shape (indicated with a dashed line in FIG. 9) is divided into S×T virtual display region units 132 (boundaries are indicated with dotted lines). The values of (S, T) are (19, 12), for example. However, in order to simplify the drawing, the number of the display region units 132 (and later-described planar light source units 152) in FIG. 9 differs from this value. Each display region unit 132 is made up of multiple pixels, and the number of pixels making up one display region unit 132 is around 10000, for example. In general, the image display panel 130 is line-sequentially driven. More specifically, the image display panel 130 includes scanning electrodes (extending in the first direction) and data electrodes (extending in the second direction) which intersect in a matrix shape, inputs a scanning signal from the scanning circuit to a scanning electrode to select and scan the scanning electrode, and displays an image based on the data signal (output signal) input to a data electrode from the signal output circuit, thereby making up one screen.

The direct-type planar light source device (backlight) 150 is configured of S×T planar light source units 152 corresponding to these S×T virtual display region units 132, and each planar light source unit 152 irradiates the display region unit 132 corresponding to thereto from the back face. The light source provided to the planar light source units 152 is individually controlled. Note that the planar light source device 150 is positioned below the image display panel 130, but in FIG. 9 the image display panel 130 and the planar light source device 150 are separately displayed.

Though the display region 131 made up of pixels arrayed in a two-dimensional matrix shape is divided into S×T display region units 132, if this state is expressed with “row”×“column”, it can be said that the display region 131 is divided into T-row×S-column display region units 132. Also, though a display region unit 132 is made up of multiple ($M_0 \times N_0$)

pixels, if this state is expressed with a display region unit 132 is made up of $M_0$-row×$N_0$-column pixels.

The layout and array state of the planar light source unit 152 of the planar light source device 150 are shown in FIG. 11. A light sources is made up of a light emitting diode 153 which is driven based on the pulse width modulation (PWM) control method. Increase/decrease in the luminance of a planar light source unit 152 is performed by increase/decrease control of a duty ratio according to the pulse width modulation control of the light emitting diode 153 making up the planar light source unit 152. The irradiation light emitted from the light emitting diode 153 is emitted from the planar light source unit 152 via a light diffusion plate, passed through an optical function sheet group such as an optical diffusion sheet, a prism sheet, or a polarization conversion sheet (not shown in the drawing), and irradiated on the image display panel 130 from the back face. One optical sensor (photodiode 67) is disposed in one planar light source unit 152. The luminance and chromaticity of a light emitting diode 153 are measured by a photodiode 67.

As shown in FIGS. 9 and 10, the planar light source device driving circuit 160 for driving the planar light source units 152 performs on/off control of a light emitting diode 153 making up a planar light source unit 152 based on the planar light source control signal (driving signal) from the signal processing unit 20 based on the pulse width modulation control method. The planar light source device driving circuit 160 is configured of an arithmetic circuit 61, a storage device (memory) 62, an LED driving circuit 63, a photodiode control circuit 64, a switching device 65 made up of an FET, and an LED driving power source (constant current source) 66. These circuits and so forth making up the planar light source device control circuit 160 may be familiar circuits and so forth.

A feedback mechanism is formed such that the emitting state of a light emitting diode 153 in a certain image display frame is measured by a photodiode 67, and the output from the photodiode 67 is input to the photodiode control circuit 64, and taken as data (signal) serving as luminance and chromaticity of the light emitting diode 153 at the photodiode control circuit 64, and arithmetic circuit 61 for example, and such data is transmitted to the LED driving circuit 63, and the emitting state of a light emitting diode 153 in the next image display frame is controlled.

A resistive element r for current detection is inserted downstream of the light emitting diode 153 in series with the light emitting diode 153, current flowing into the resistive element r is converted into voltage, the operation of the LED driving poser source 66 is controlled such that voltage drop at the resistive element r has a predetermined value, under the control of the LED driving circuit 63. Here, in FIG. 10, only the one LED driving power source (constant current source) 66 is drawn, but in reality, an LED driving power source 66 is disposed for driving each of the light emitting diodes 153. Note that FIG. 10 illustrates three sets of planar light source units 152. In FIG. 10, a configuration is shown wherein one light emitting diode 153 is provided to one planar light source unit 152, but the number of the light emitting diodes 153 making up one planar light source unit 152 is not restricted to one.

Each pixel is configured, as described above, with four types of sub-pixels of a first sub-pixel R, a second sub-pixel G, a third sub-pixel B, and a fourth sub-pixel W as one set. Here, control of the luminance (gradation control) of each sub-pixel is taken as 8-bit control, which will be performed by $2^8$ steps of 0 through 255. Also, the value PS of a pulse width modulation output signal for controlling the emitting time of each of the light emitting diodes 153 making up each planar light source unit 152 is also taken the value of $2^8$ steps of 0 through 255. However, these values are not restricted to these, and for example, the gradation control may be taken as 10-bit control, and performed by $2^{10}$ steps of 0 through 1023, and in this case, an expression with a 8-bit numeric value should be changed to four times thereof, for example.

Here, the light transmittance (also referred to as aperture ratio) Lt of a sub-pixel, the luminance (display luminance) y of the portion of a display region corresponding to the sub-pixel, and the luminance (light source luminance) Y of a planar light source unit 152 are defined as follows.

$Y_1$ is the highest luminance of light source luminance for example, and hereafter may also be referred to as a light source luminance first stipulated value.

$Lt_1$ is the maximum value of the light transmittance (numerical aperture) of a sub-pixel at a display region unit 132 for example, and hereafter may also be referred to as a light transmittance first stipulated value.

$Lt_2$ is the maximum value of the light transmittance (numerical aperture) of a sub-pixel when assuming that a control signal equivalent to an intra-display region unit signal maximum value $X_{max-(s, t)}$ that is the maximum value of the output signals from the signal processing unit 20 to be input to the image display panel driving circuit 40 for driving all of the sub-pixels making up a display region unit 132 has been supplied to a sub-pixel, and hereafter may also be referred to as a light transmittance second stipulated value. However, $0 \leq Lt_2 \leq Lt_1$ should be satisfied.

$y_2$ is display luminance to be obtained when assuming that light source luminance is a light source luminance first stipulated value $Y_1$, and the light transmittance (numerical aperture) of a sub pixel is the light transmittance second stipulated value, and hereafter may also be referred to as a display luminance second stipulated value.

$Y_2$ is the light source luminance of the planar light source unit 152 for setting the luminance of a sub-pixel to the display luminance second stipulated value ($y_2$) when assuming that a control signal equivalent to the intra-display region unit signal maximum value $X_{max-(s, t)}$, and moreover, when assuming that the light transmittance (numerical aperture) of a sub-pixel at this time has been corrected to the light transmittance first stipulated value $Lt_1$. However, the light source luminance $Y_2$ may be subjected to correction in which influence of the light source luminance of each planar light source unit 152 to be given to the light source luminance of another planar light source unit 152 is taken into consideration.

Figure 12A:
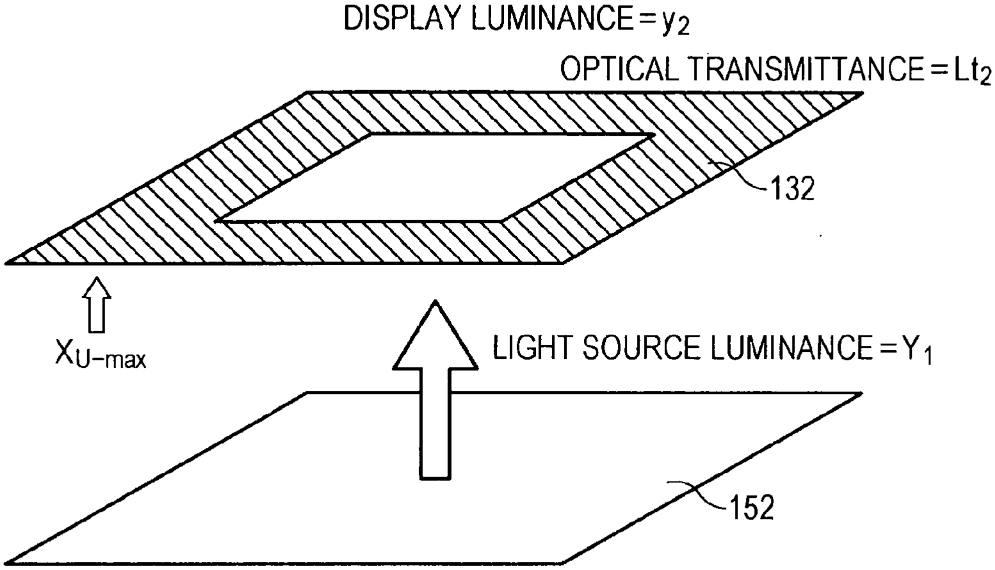
FIGS. 12A and 12B are conceptual diagrams for describing a state increasing/decreasing the light source luminance of the planar light source unit under the control of the planar light source device driving circuit so as to obtain display luminance second specified value by the planar light source unit at the time of assuming that a control signal equivalent to an intra-display region unit signal maximum value is supplied to a sub-pixel.
Figure 12B:
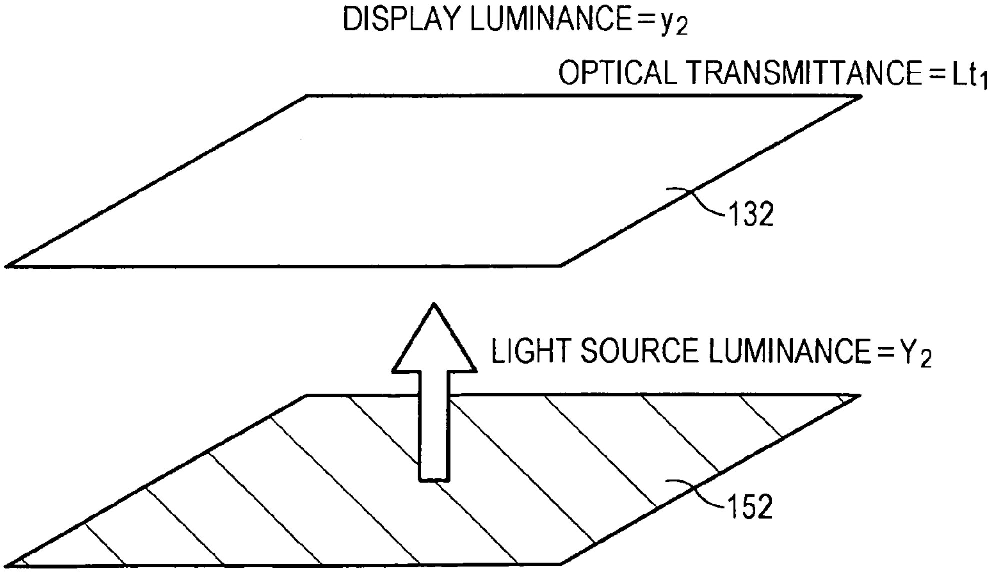

The luminance of a light emitting device making up a planar light source unit 152 corresponding to a display region unit 132 is controlled by the planar light source device control circuit 160 so as to obtain the luminance of a sub-pixel (the display luminance second stipulated $Y_2$ at the light transmittance first stipulated value $Lt_1$) when assuming that a control signal equivalent to the intra-display region unit signal maximum value $X_{max-(s, t)}$ has been supplied to a sub-pixel at the time of partial driving (split driving) of the planar light source device, but specifically, for example, the light source luminance $Y_2$ should be controlled (e.g., should be reduced) so as to obtain the display luminance $y_2$ at the time of the light transmittance (numerical aperture) being taken as the light transmittance first stipulated value $Lt_1$. Specifically, for example, the light source luminance $Y_2$ of a planar light source unit 152 should be controlled so as to satisfy the following Expression (A). Note that there is a relation of $Y_2 \geq Y_1$. A conceptual view of such control is shown in FIGS. 12A and 12B.

$$Y_2 \cdot Lt_1 = Y_1 \cdot Lt_2 \quad \text{(A)}$$

In order to control each of the sub-pixels, output signals $X_{1-(p,q)}$, $X_{2-(p,q)}$, $X_{3-(p,q)}$, and $X_{4-(p,q)}$ for controlling the light transmittance Lt of each of the sub-pixels are transmitted from the signal processing unit 20 to the image display panel driving circuit 40. With the image display panel driving circuit 40, control signals are generated from the output signals, and these control signals are supplied (output) to sub-pixels, respectively. Then, each of the control signals, a switching device making up each sub-pixel is driven, desired voltage is applied to a transparent first electrode and a transparent second electrode (not shown in the drawing) making up a liquid crystal cell, and accordingly, the light transmittance (numerical aperture) Lt of each sub-pixel is controlled. Here, the greater a control signal, the higher the light transmittance (numerical aperture) of a sub-pixel, and the higher the value of the luminance of the portion of a display region corresponding to the sub-pixel (display luminance y) is. That is to say, an image made up of light passing through a sub-pixel (usually, one kind of dotted shape) is bright.

Control of the display luminance y and light source luminance $Y_2$ is performed for each image display frame of image display of the image display panel 130, for each display region unit, and for each planar light source unit. Also, the operation of the image display panel 130, and the operation of the planar light source device 150 are synchronized. Note that the number of image information to be transmitted to the driving circuit for one second (image per second) as electrical signals is a frame frequency (frame rate), and the reciprocal number of the frame frequency is frame time (unit: seconds).

With the first embodiment, extension processing for extending an input signal to obtain an output signal has been performed as to all of the pixels based on one reference extension coefficient $\alpha_{0\text{-}std}$. On the other hand, with the second embodiment, a reference extension coefficient $\alpha_{0\text{-}std}$ is obtained at each of the S×T display region units 132, and extension processing based on the reference extension coefficient $\alpha_{0\text{-}std}$ is performed at each of the display region units 132.

With the (s, t)'th planar light source unit 152 corresponding to the (s, t)'th display region unit 132 that is the obtained reference extension coefficient is $\alpha_{0\text{-}std\text{-}(s,t)}$, the luminance of a light source is set to $(1/\alpha_{0\text{-}std\text{-}(s,t)})$.

Alternatively, so as to obtain the luminance of a sub-pixel (the display luminance second stipulated value $y_2$ at the light transmittance first stipulated value $Lt_1$) when assuming that a control signal equivalent to the intra-display region signal maximum value $X_{max\text{-}(s,t)}$ that is the maximum value of the output signal values $X_{1-(s,t)}$, $X_{2-(s,t)}$, $X_{3-(s,t)}$, and $X_{4-(s,t)}$ from the signal processing unit 20 to be input for driving all of the sub-pixels making up each of the display region units 132 has been supplied to a sub-pixel, the luminance of a light source making up the planar light source unit 152 corresponding to this display region unit 132 is controlled by the planar light source device control circuit 160. Specifically, so as to obtain the display luminance $y_2$ when assuming that the light transmittance (numerical aperture) of a sub-pixel is the light transmittance first stipulated value $Lt_1$, the light source luminance $Y_2$ should be controlled (e.g., should be reduced). That is to say, specifically, the light source luminance $Y_2$ of the planar light source unit 152 should be controlled for each image display frame so as to satisfy the above-described Expression (A).

Incidentally, with the planar light source device 150, for example, in the event of assuming the luminance control of the planar light source unit 152 of (s, t)=(1, 1), there may be a case where influence from another S×T planar light source units 152 has to be taken into consideration. Influence received at such a planar light source unit 152 from another planar light source unit 152 has been recognized beforehand by the light emitting profile of each planar light source unit 152, and accordingly, difference can be calculated by back calculation, and as a result thereof, correction can be performed. Arithmetic basic forms will be described.

The luminance (light source luminance $Y_2$) requested of the S×T planar light source units 152 based on the request from Expression (A) will be represented with a matrix $[L_{P\times Q}]$. Also, the luminance of a certain planar light source unit obtained when driving the certain planar light source alone without driving other planar light source units should be obtained as to the S×T planer light source units 152 beforehand. Such luminance will be represented with a matrix $[L'_{P\times Q}]$. Further, a correction coefficient will be represented with a matrix $[\alpha_{P\times Q}]$. Thus, a relation between these matrices can be represented by the following Expression (B-1). The correction coefficient matrix $[\alpha_{P\times Q}]$ may be obtained beforehand.

$$[L_{P\times Q}] = [L'_{P\times Q}] \cdot [\alpha_{P\times Q}] \quad \text{(B-1)}$$

Accordingly, the matrix $[L'_{P\times Q}]$ should be obtained from Expression (B-1). The matrix $[L'_{P\times Q}]$ can be obtained from the calculation of an inverse matrix. Specifically, $$[L'_{P\times Q}] = [L_{P\times Q}] \cdot [\alpha_{P\times Q}] \quad \text{(B-2)}$$

should be calculated. Then, the light source (light emitting diode 153) provided to each planar light sourced unit 152 should be controlled so as to obtain the luminance represented with the matrix $[L'_{P\times Q}]$, and specifically, such operation and processing should be performed using the information (data table) stored in the storage device (memory) provided to the planar light source control circuit 160. Note that with the control of the light emitting diode 153, the value of the matrix $[L'_{P\times Q}]$ does not have a negative value, and accordingly, it goes without saying that a calculation result has to be included in a positive region. Accordingly, the solution of Expression (B-2) is not an exact solution, and may be an approximate solution.

In this way, based on the matrix $[L_{P\times Q}]$ obtained based on the value of Expression (A) obtained at the planar light source device control circuit 160, and the correction coefficient matrix $[\alpha_{P\times Q}]$, as described above, the matrix $[L'_{P\times Q}]$ of the luminance when assuming that a planar light source unit has independently been driven is obtained, and further, based on the conversion table stored in the storage device 62, the obtained matrix $[L'_{P\times Q}]$ is converted into the corresponding integer (the value of a pulse width modulation output signal) in a range of 0 through 255. In this way, with the arithmetic circuit 61 making up the planar light source device control circuit 160, the value of a pulse width modulation output signal for controlling the emitting time of the light emitting diode 153 at a planar light source unit 152 can be obtained. Then, based on the value of this pulse width modulation output signal, on-time $t_{ON}$ and off-time $t_{OFF}$ of the light emitting diode 153 making up the planar light source unit 152 should be determined at the planar light source device control circuit 160. Note that $$t_{ON} + t_{OFF} = \text{constant value } t_{const}$$

holds. Also, a duty ratio in driving based on the pulse width modulation of a light emitting diode can be represented as follows.

$$t_{ON}/(t_{ON} + t_{OFF}) = t_{ON}/t_{Const}$$

A signal equivalent to the on-time $t_{ON}$ of the light emitting diode 153 making up the planar light source unit 152 is transmitted to the LED driving circuit 63, and based on the value of the signal equivalent to the on-time $t_{ON}$ from this LED driving circuit 63, the switching device 65 is in an on state by the on-time $t_{ON}$, and the LED driving current from the LED driving power source 66 flows into the light emitting diode 153. As a result thereof, each light emitting diode 153 emits light by the on-time $t_{ON}$ at one image display frame. In this way, each display region unit 132 is irradiated with predetermined illuminance.

Note that the planar light source device 150 of split driving method (partial driving method) described in the second embodiment may be employed with another embodiment.

Third Embodiment

Figure 13:
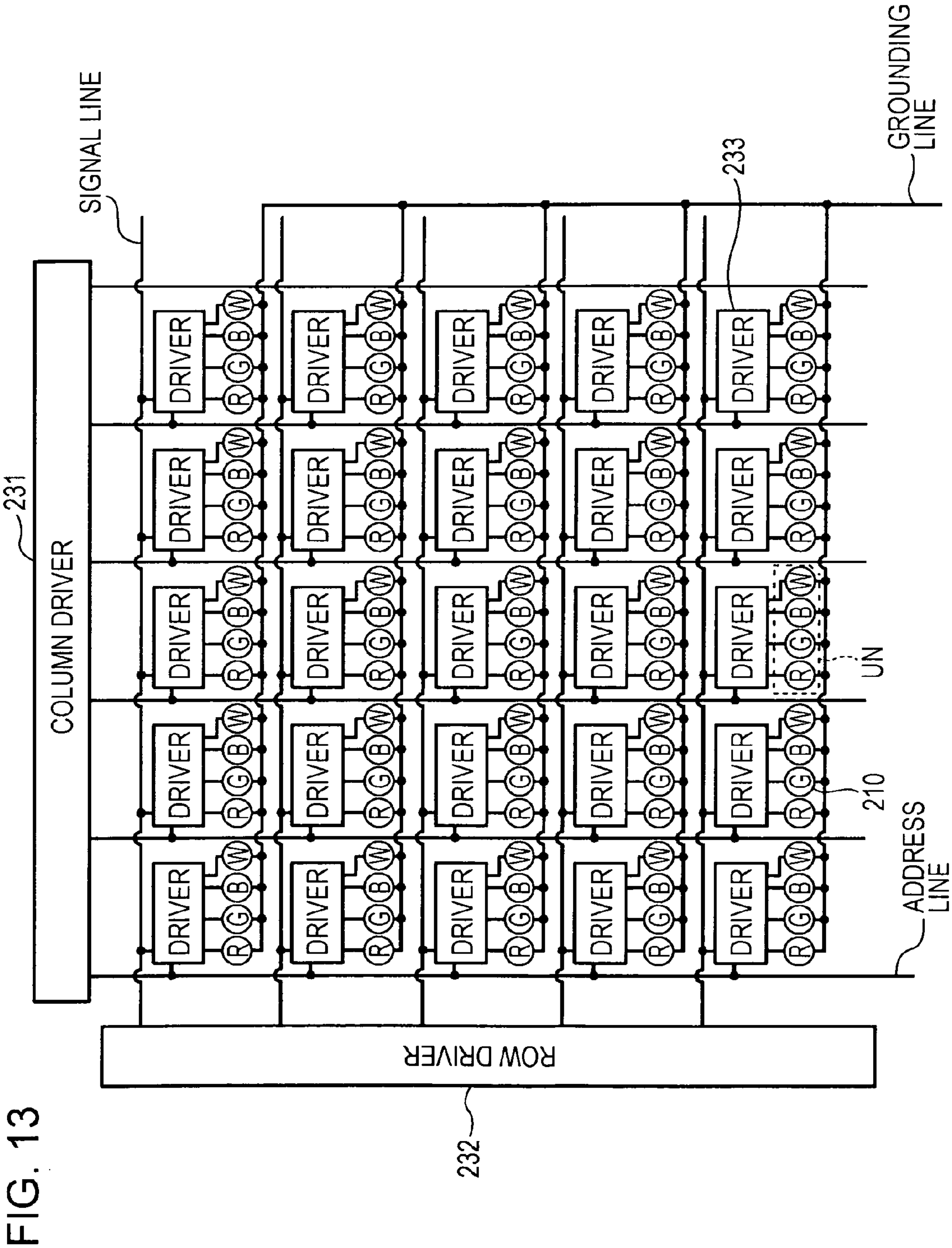
FIG. 13 is an equivalent circuit diagram of an image display device according to a third embodiment.
Figure 14:
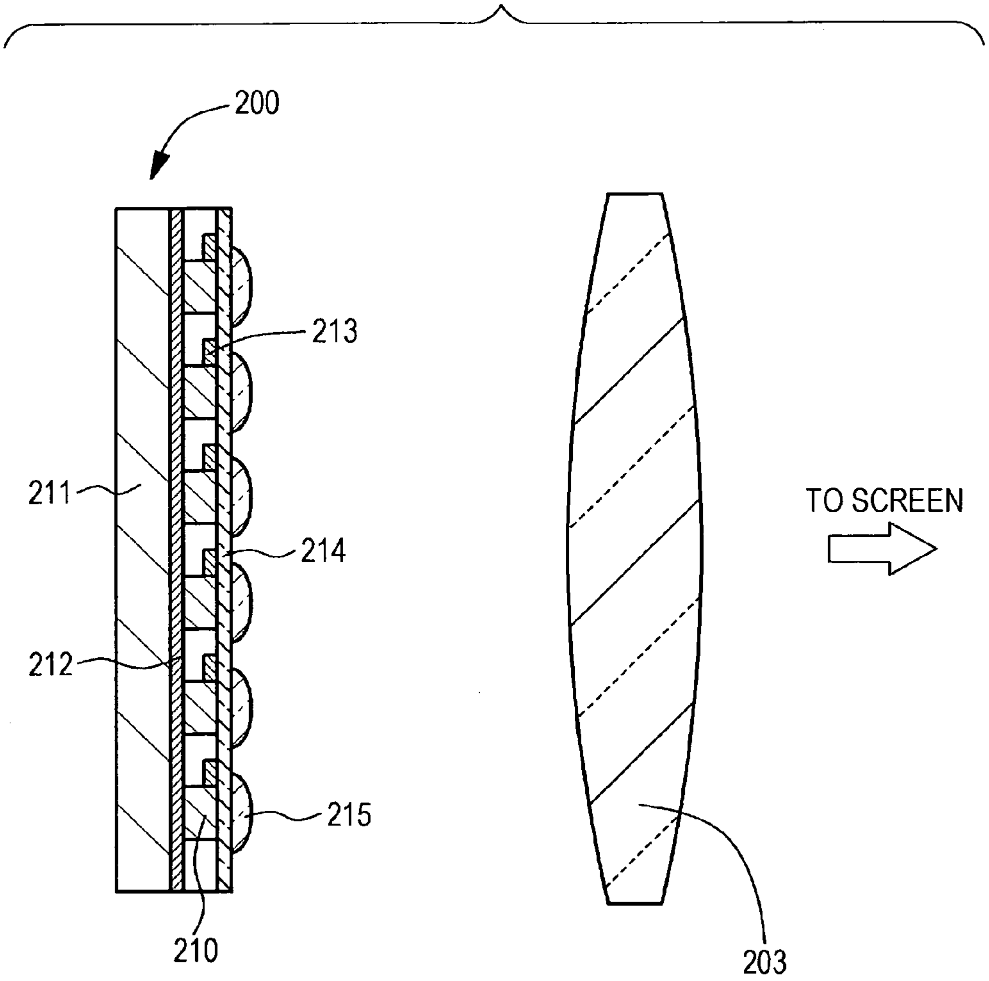
FIG. 14 is a conceptual diagram of an image display panel making up the image display device according to the third embodiment.

A third embodiment is also a modification of the first embodiment. An equivalent circuit diagram of an image display device according to the third embodiment is shown in FIG. 13, and a conceptual view of an image display panel making up the image display device is shown in FIG. 14. With the third embodiment, the image display device which will be described below is used. Specifically, the image display device according to the third embodiment includes an image display panel made up of light emitting units UN for displaying a color image being arrayed in a two-dimensional matrix shape, each of which is made up of a first light emitting device for emitting blue (equivalent to first sub-pixel R), a second light emitting device for emitting green (equivalent to second sub-pixel G), a third light emitting device for emitting red (equivalent to third sub-pixel B), and a fourth light emitting device for emitting white (equivalent to fourth sub-pixel W). Here, as the image display panel making up the image display device according to the third embodiment, an image display panel having an arrangement and a configuration which will be described below can be given, for example. Note that the number of the light emitting device units UN should be determined based on specifications requested of the image display device.

Specifically, the image display panel making up the image display device according to the third embodiment is an image display panel of direct-view color display of a passive matrix type or active matrix type direct-view color which controls the emitting/non-emitting state of each of a first light emitting device, a second light emitting device, a third light emitting device, and a fourth light emitting device to directly visually recognize each light emitting device, thereby displaying an image, or alternatively, an image display panel of projection-type color display of a passive matrix type or active matrix type which controls the emitting/non-emitting state of each of a first light emitting device, a second light emitting device, a third light emitting device, and a fourth light emitting device to project to the screen, thereby display an image.

For example, a circuit diagram including a light emitting panel making up the image display panel of direct-view color display of such an active matrix type is shown in FIG. 13, and one of electrodes (p-side electrode or n-side electrode) of each light emitting device 210 (in FIG. 13, a light emitting device for emitting red (first sub-pixel) is indicated with "R", a light emitting device for emitting green (second sub-pixel) is indicated with "G", a light emitting device for emitting blue (third sub-pixel) is indicated with "B", and a light emitting device for emitting white (fourth sub-pixel) is indicated with "W") is connected to a driver 233, and the driver 233 is connected to a column driver 231 and a row driver 232. Also, the other electrode (n-side electrode or p-side electrode) of each light emitting device 210 is connected to a grounding wire. The control of the emitting/non-emitting state of each light emitting device 210 is performed by selection of a driver 233 by the row driver 232, and a luminance signal for driving each light emitting device 210 is supplied from the column driver 231 to the driver 233. Selection of a light emitting device R for emitting red (first light emitting device, first sub-pixel R), a light emitting device G for emitting green (second light emitting device, second sub-pixel G), a light emitting device B for emitting blue (third light emitting device, third sub-pixel B), and a light emitting device W for emitting white (fourth light emitting device, fourth sub-pixel W) is performed by the driver 233, and the emitting/non-emitting state of each of these light emitting device R for emitting red, light emitting device G for emitting green, light emitting device B for emitting blue, and light emitting device W for emitting white may be controlled by time-sharing, or alternatively, these may be emitted at the same time. Note that the emitting/non-emitting state of each light emitting device is directly viewed at a direct-view image display device, and is projected on the screen via a projection lens at a projection-type image display device.

Note that a conceptual view of an image display panel making up such an image display device is shown in FIG. 14. The emitting/non-emitting state of each light emitting device is directly viewed at a direct-view image display device, and is projected on the screen via a projection lens at a projection-type image display device.

Alternatively, the image display panel making up the image display device according to the third embodiment may be a direct-view-type or projection-type image display panel for color display which includes a light passage control device (light valve, and specifically, for example, a liquid crystal display including a high-temperature polysilicon-type thin-film transistor. This can also be applied to the following embodiments.) for controlling passage/non-passage of light emitted from light emitting device units arrayed in a two-dimensional matrix shape, controls the emitting/non-emitting state of each of the first light emitting device, second light emitting device, third light emitting device, and fourth light emitting device at a light emitting device unit by time-sharing, and further controls passage/non-passage of light emitted from the first light emitting device, second light emitting device, third light emitting device, and fourth light emitting device by the light passage control device, thereby display an image.

With the third embodiment, an output signal for controlling the emitting state of each of the first light emitting device (first sub-pixel R), second light emitting device (second sub-pixel G), third light emitting device (first sub-pixel B), and fourth light emitting device (fourth sub-pixel W) should be obtained based on the extension processing described in the first embodiment.

Upon driving the image display device based on the values $X_{1-(p, q)}$, $X_{2-(p, q)}$, $X_{3-(p, q)}$, $X_{4-(p, q)}$ of output signals obtained by the extension processing, the luminance can be increased around $\alpha_{0-std}$ times (the luminance of each pixel can be increased $\alpha_0$ times) as the entire image display device. Alternatively, based on the values $X_{1-(p, q)}$, $X_{2-(p, q)}$, $X_{3-(p, q)}$, and $X_{4-(p, q)}$, if we say that the light emitting luminance of each of the first light emitting device (first sub-pixel R), second light emitting device (second sub-pixel G), third light emitting device (first sub-pixel B), and fourth light emitting device (fourth sub-pixel W) is $(1/\alpha_{0-std})$ times, reduction of consumption power serving as the entire image display device can be realized without being accompanied by deterioration in image quality.

Fourth Embodiment

A fourth embodiment relates to the image display device driving method according to the second mode, seventh mode, twelfth mode, seventeenth mode, and twenty-second mode of the present disclosure, and the image display device assembly driving method according to the second mode, seventh mode, twelfth mode, seventeenth mode, and twenty-second mode of the present disclosure.

Figure 15:
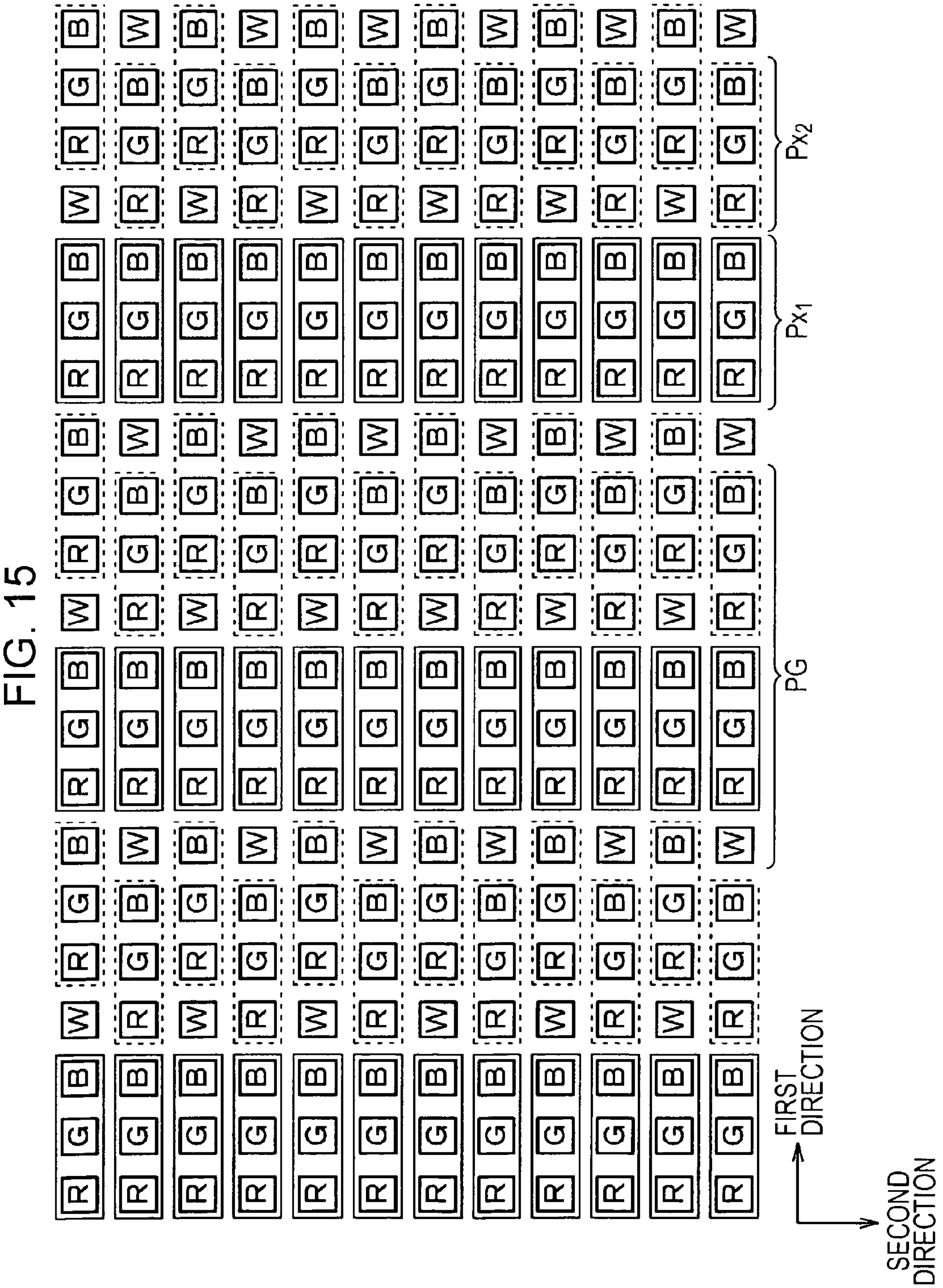
FIG. 15 is a diagram schematically illustrating the layout of each pixel and a pixel group of an image display panel according to a fourth embodiment.
Figure 16:
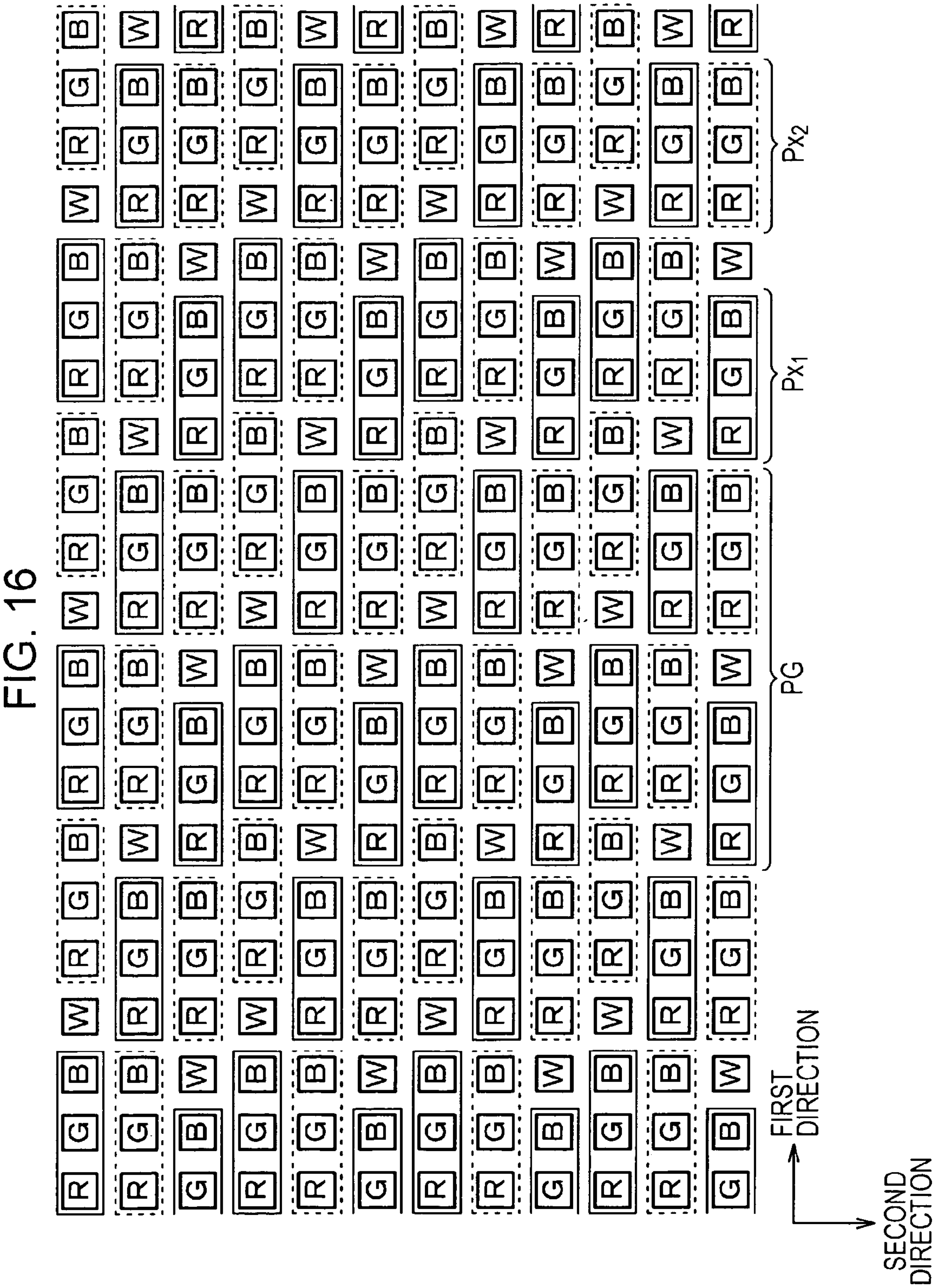
FIG. 16 is a diagram schematically illustrating the layout of each pixel and a pixel group of an image display panel according to a fifth embodiment.
Figure 17:
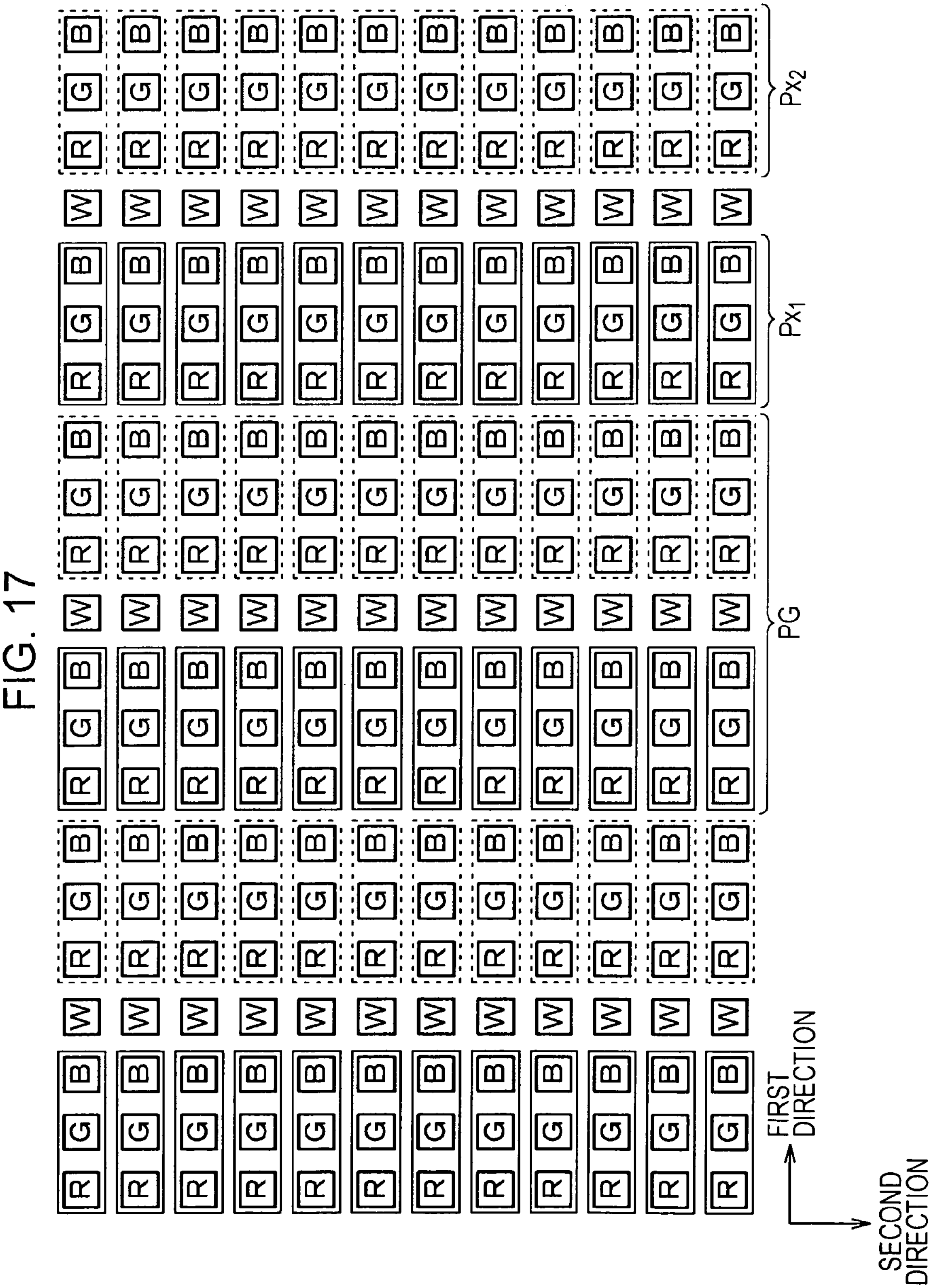
FIG. 17 is a diagram schematically illustrating the layout of each pixel and a pixel group of an image display panel according to a sixth embodiment.
Figure 18:
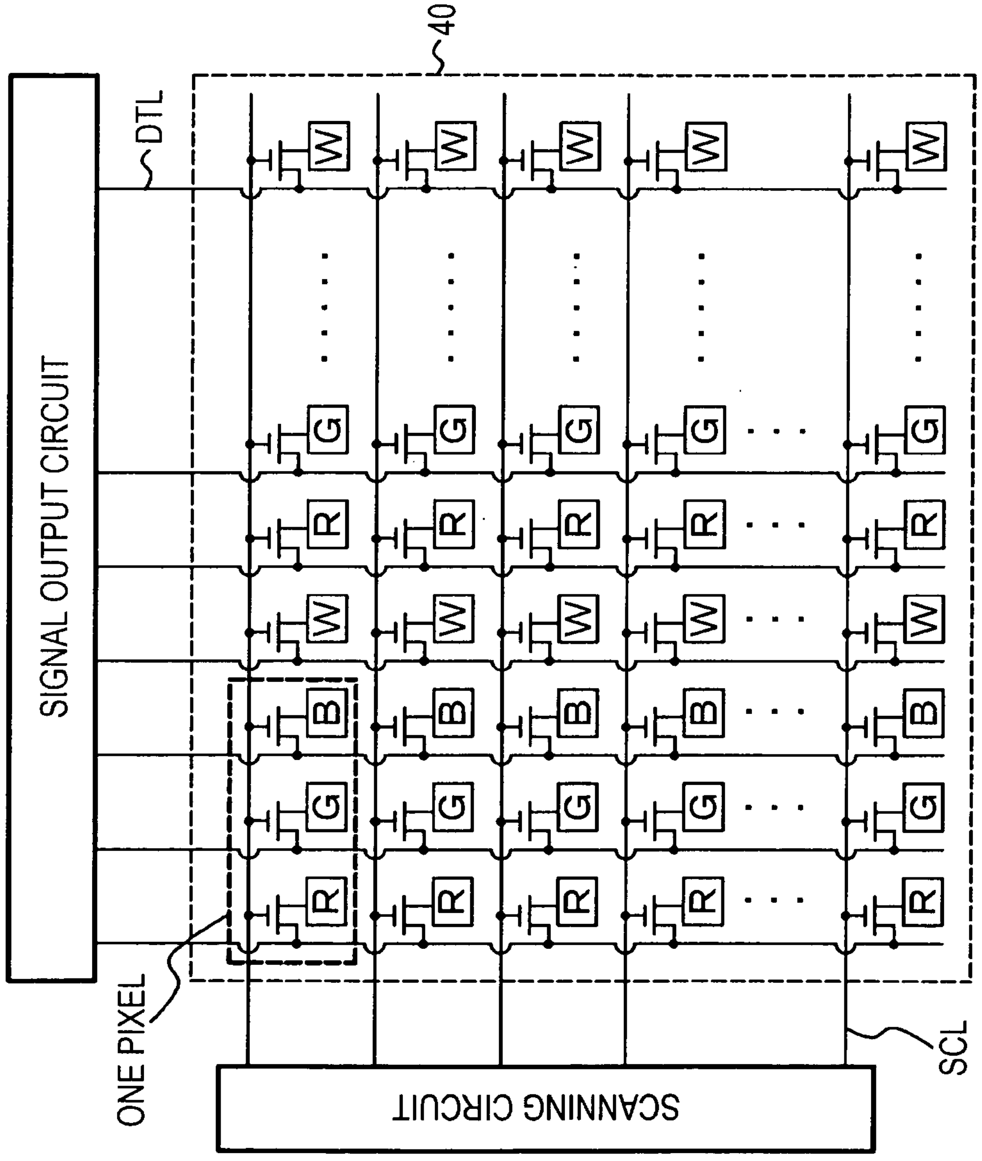
FIG. 18 is a conceptual diagram of an image display panel and an image display panel driving circuit of the image display device according to the fourth embodiment.

As schematically shown in the layout of pixels in FIG. 15, with the image display panel 30 according to the fourth embodiment, a pixel Px made up of a first sub-pixel R for displaying a first primary color (e.g., red), a second sub-pixel G for displaying a second primary color (e.g., green), and a third sub-pixel B for displaying a third primary color (e.g., blue) is arrayed in a two-dimensional matrix shape in the first direction and the second direction. A pixel group PG is made up of at least a first pixel $Px_1$ and a second pixel $Px_2$ arrayed in the first direction. Note that, with the fourth embodiment, specifically, a pixel group PG is made up of a first pixel $Px_1$ and a second pixel $Px_2$, and when assuming that the number of pixels making up the pixel group PG is $p_0$, $p_0$ is 2 ($p_0$=2). Further, with each pixel group PG, a fourth sub-pixel W for displaying a fourth color (in the fourth embodiment, specifically, white) is disposed between the first pixel $Px_1$ and second pixel $Px_2$. Note that a conceptual view of the layout of pixels is shown in FIG. 18 for convenience of description, but the layout shown in FIG. 18 is the layout of pixels according to later-described sixth embodiment.

Now, if we say that a positive number P is the number of the pixel groups PG in the first direction, and a positive number Q is the number of the pixel groups PG in the second direction, pixels Px, more specifically, P×Q pixels [($p_0$×P) pixels in the horizontal direction that it the first direction, Q pixels in the vertical direction that is the second direction] are arrayed in a two-dimensional matrix shape. Also, with the fourth embodiment, as described above, $p_0$ is 2 ($p_0$=2).

With the fourth embodiment, if we say that the first direction is the row direction, and the second direction is the column direction, a first pixel $Px_1$ in the q'th column (where 1≤q'≤Q−1), and a first pixel $Px_1$ in the (q'+1)'th column adjoin each other, and a fourth sub-pixel W in the q'th column and a fourth sub-pixel W in the (q'+1)'th column do not adjoin each other. That is to say, the second pixel $Px_2$ and the fourth sub-pixel W are alternately disposed in the second direction. Note that, in FIG. 15, a first sub-pixel R, a second sub-pixel G, and a third sub-pixel B making up the first pixel $Px_1$ are surrounded by a solid line, and a first sub-pixel R, a second sub-pixel G, and a third sub-pixel B making up the second pixel $Px_2$ are surrounded by a dotted line. This can also be applied to later-described FIGS. 16, 17, 20, 21, and 22. Since the second pixel $Px_2$ and the fourth sub-pixel W are alternately disposed in the second direction, a streaked pattern can be prevented in a sure manner from being included in an image due to existence of the fourth sub-pixel W though this depends on pixel pitches.

Here, with the fourth embodiment, regarding a first pixel $Px_{(p, q)-1}$ making up the (p, q)'th pixel group $PG_{(p, q)}$ (where 1≤p≤P, 1≤q≤Q), a first sub-pixel input signal of which the signal value is $x_{1-(p, q)-1}$, a second sub-pixel input signal of which the signal value is $x_{2-(p, q)-1}$, and a third sub-pixel input signal of which the signal value is $x_{3-(p, q)-1}$ are input to the signal processing unit 20, and regarding a second pixel $Px_{(p, q)-2}$ making up the (p, q)'th pixel group $PG_{(p, q)}$, a first sub-pixel input signal of which the signal value is $x_{1-(p, q)-2}$, a second sub-pixel input signal of which the signal value is $x_{2-(p, q)-2}$, and a third sub-pixel input signal of which the signal value is $x_{3-(p, q)-2}$ are input to the signal processing unit 20.

Also, with the fourth embodiment, the signal processing unit 20 outputs, regarding the first pixel $Px_{(p, q)-1}$ making up the (p, q)'th pixel group $PG_{(p, q)}$, a first sub-pixel output signal of which the signal value is $X_{1-(p, q)-1}$ for determining the display gradation of the first sub-pixel R, a second sub-pixel output signal of which the signal value is $X_{2-(p, q)-1}$ for determining the display gradation of the second sub-pixel G, and a third sub-pixel output signal of which the signal value is $X_{3-(p, q)-2}$ for determining the display gradation of the third sub-pixel B, and outputs, regarding the second pixel $Px_{(p, q)-2}$ making up the (p, q)'th pixel group $PG_{(p, q)}$, a first sub-pixel output signal of which the signal value is $X_{1-(p, q)-2}$ for determining the display gradation of the first sub-pixel R, a second sub-pixel output signal of which the signal value is $X_{2-(p, q)-2}$ for determining the display gradation of the second sub-pixel G, and a third sub-pixel output signal of which the signal value is $X_{3-(p, q)-2}$ for determining the display gradation of the third sub-pixel B, and further outputs, regarding the fourth sub-pixel W making up the (p, q)'th pixel group $PG_{(p, q)}$, a fourth sub-pixel output signal of which the signal value is $X_{4-(p, q)}$ for determining the display gradation of the fourth sub-pixel W.

With the fourth embodiment, regarding the first pixel $Px_{(p, q)-1}$, the signal processing unit 20 obtains the first sub-pixel output signal (signal value $X_{1-(p, q)-1)}$ based on at least the first sub-pixel input signal (signal value $x_{1-(p, q)-1)}$ and the extension coefficient $\alpha_0$ to output to the first sub-pixel R, the second sub-pixel output signal (signal value $X_{2-(p, q)-1)}$ based on at least the second sub-pixel input signal (signal value $X_{2-(p, q)-1}$) and the extension coefficient $\alpha_0$ to output to the second sub-pixel G, and the third sub-pixel output signal (signal value $X_{3-(p, q)-1}$) based on at least the third sub-pixel input signal (signal value $X_{3-(p, q)-1}$) and the extension coefficient $\alpha_0$ to output to the third sub-pixel B, and regarding the second pixel $Px_{(p, q)-2}$, obtains the first sub-pixel output signal (signal value $X_{1-(p, q)-2}$) based on at least the first sub-pixel input signal (signal value $x_{1-(p, q)-2}$) and the extension coefficient $\alpha_0$ to output to the first sub-pixel R, the second sub-pixel output signal (signal value $X_{2-(p, q)-2}$) based on at least the second sub-pixel input signal (signal value $x_{2-(p, q)-2}$) and the extension coefficient $\alpha_0$ to output to the second sub-pixel G, and the third sub-pixel output signal (signal value $X_{3-(p, q)-2}$) based on at least the third sub-pixel input signal (signal value $x_{3-(p, q)-2}$) and the extension coefficient $\alpha_0$ to output to the third sub-pixel B.

Further, the signal processing unit 20 obtains, regarding the fourth sub-pixel W, the fourth sub-pixel output signal (signal value $X_{4-(p, q)}$) based on the fourth sub-pixel control first signal (signal value $SG_{1-(p, q)}$) obtained from the first sub-pixel input signal (signal value $x_{1-(p, q)-1}$), second sub-pixel input signal (signal value $x_{2-(p, q)-1}$), and third sub-pixel input signal (signal value $x_{3-(p, q)-1}$) as to the first pixel $Px_{(p, q)-1}$, and the fourth sub-pixel control second signal (signal value $SG_{2-(p, q)}$) obtained from the first sub-pixel input signal (signal value $x_{1-(p, q)-2}$), second sub-pixel input signal (signal value $x_{2-(p, q)-2}$), and third sub-pixel input signal (signal value $x_{3-(p, q)-2}$) as to the second pixel $Px_{(p, q)-2}$, and outputs to the fourth sub-pixel W.

With the fourth embodiment, specifically, the fourth sub-pixel control first signal value $SG_{1-(p, q)}$ is determined based on $Min_{(p, q)-1}$ and the extension coefficient $\alpha_0$, and the fourth sub-pixel control second signal value $SG_{2-(p, q)}$ is determined based on $Min_{(p, q)-2}$ and the extension coefficient $\alpha_0$. More specifically, Expression (41-1) and Expression (41-2) based on Expression (2-1-1) and Expression (2-1-2) are employed as the fourth sub-pixel control first signal value $SG_{1-(p, q)}$ and fourth sub-pixel control second signal value $SG_{2-(p, q)}$.

$$SG_{1-(p,q)}=Min_{(p,q)-1}\cdot\alpha_0 \quad (41\text{-}1)$$

$$SG_{2-(p,q)}=Min_{(p,q)-2}\cdot\alpha_0 \quad (41\text{-}2)$$

Also, with regard to the first pixel $Px_{(p, q)-1}$, the first sub-pixel output signal is obtained based on at least the first sub-pixel input signal and the extension coefficient $\alpha_0$, but the first sub-pixel output signal value $X_{1-(p, q)-1}$ is obtained based on the first sub-pixel input signal value $x_{1-(p, q)-1}$, extension coefficient $\alpha_0$, fourth sub-pixel control first signal value $SG_{1-(p, q)}$ and constant $\chi$, i.e., $$[x_{1-(p,q)-1}, \alpha_0, SG_{1-(p,q)}, \chi],$$

the second sub-pixel output signal is obtained based on at least the second sub-pixel input signal and the extension coefficient $\alpha_0$, but the second sub-pixel output signal value $X_{2-(p, q)-1}$ is obtained based on the second sub-pixel input signal value $x_{2-(p, q)-1}$, extension coefficient $\alpha_0$, fourth sub-pixel control first signal value $SG_{1-(p, q)}$ and constant $\chi$, i.e., $$[x_{2-(p,q)-1}, \alpha_0, SG_{1-(p,q)}, \chi],$$

the third sub-pixel output signal is obtained based on at least the third sub-pixel input signal and the extension coefficient $\alpha_0$, but the third sub-pixel output signal value $X_{3-(p, q)-1}$ is obtained based on the third sub-pixel input signal value $x_{3-(p, q)-1}$, extension coefficient $\alpha_0$, fourth sub-pixel control first signal value $SG_{1-(p, q)}$ and constant $\chi$, i.e., $$[x_{3-(p,q)-1}, \alpha_0, SG_{1-(p,q)}, \chi],$$

and with regard to the second pixel $Px_{(p, q)-2}$, the first sub-pixel output signal is obtained based on at least the first sub-pixel input signal and the extension coefficient $\alpha_0$, but the first sub-pixel output signal value $X_{1-(p, q)-2}$ is obtained based on the first sub-pixel input signal value $x_{1-(p, q)-2}$, extension coefficient $\alpha_0$, fourth sub-pixel control second signal value $SG_{2-(p, q)}$ and constant $\chi$, i.e., $$[x_{1-(p,q)-2}, \alpha_0, SG_{2-(p,q)}, \chi],$$

the second sub-pixel output signal is obtained based on at least the second sub-pixel input signal and the extension coefficient $\alpha_0$, but the second sub-pixel output signal value $X_{2-(p, q)-2}$ is obtained based on the second sub-pixel input signal value $x_{2-(p, q)-2}$, extension coefficient $\alpha_0$, fourth sub-pixel control second signal value $SG_{2-(p, q)}$ and constant $\chi$, i.e., $$[x_{2-(p,q)-2}, \alpha_0, SG_{2-(p,q)}, \chi],$$

the third sub-pixel output signal is obtained based on at least the third sub-pixel input signal and the extension coefficient $\alpha_0$, but the third sub-pixel output signal value $X_{3-(p, q)-2}$ is obtained based on the third sub-pixel input signal value $x_{3-(p, q)-2}$, extension coefficient $\alpha_0$, fourth sub-pixel control second signal value $SG_{2-(p, q)}$ and constant $\chi$, i.e., $$[x_{3-(p,q)-2}, \alpha_0, SG_{1-(p,q)}, \chi],$$

With the signal processing unit 20, the output signal values $X_{1-(p, q)-1}$, $X_{2-(p, q)-1}$, $X_{3-(p, q)-1}$, $X_{1-(p, q)-2}$, $X_{2-(p, q)-2}$, and $X_{3-(p, q)-2}$ can be determined, as described above, based on the extension coefficient $\alpha_0$ and constant $\chi$, and more specifically can be obtained from the following expressions.

$$X_{1-(p,q)-1} = \alpha_0 \cdot x_{1-(p,q)-1} - \chi \cdot SG_{1-(p,q)} \quad \text{(2-A)}$$

$$X_{2-(p,q)-1} = \alpha_0 \cdot x_{2-(p,q)-1} - \chi \cdot SG_{1-(p,q)} \quad \text{(2-B)}$$

$$X_{3-(p,q)-1} = \alpha_0 \cdot x_{3-(p,q)-1} - \chi \cdot SG_{1-(p,q)} \quad \text{(2-C)}$$

$$X_{1-(p,q)-2} = \alpha_0 \cdot x_{1-(p,q)-2} - \chi \cdot SG_{2-(p,q)} \quad \text{(2-D)}$$

$$X_{2-(p,q)-2} = \alpha_0 \cdot x_{2-(p,q)-2} - \chi \cdot SG_{2-(p,q)} \quad \text{(2-E)}$$

$$X_{3-(p,q)-2} = \alpha_0 \cdot x_{3-(p,q)-2} - \chi \cdot SG_{2-(p,q)} \quad \text{(2-F)}$$

Also, the signal value $X_{4-(p, q)}$ is obtained by the following arithmetic average Expression (42-1) and Expression (42-2) based on Expression (2-11).

$$X_{4-(p,q)} = (SG_{1-(p,q)} + SG_{2-(p,q)})/(2\chi) \quad \text{(42-1)}$$

$$= (\mathrm{Min}_{(p,q)-1} \cdot \alpha_0 + \mathrm{Min}_{(p,q)-2} \cdot \alpha_0)/(2\chi) \quad \text{(42-2)}$$

Note that with the right-handed sides in Expression (42-1) and Expression (42-2), division by $\chi$ is performed, but the expressions are not restricted to this.

Here, the reference extension coefficient $\alpha_{0-std}$ is determined for each image display frame. Also, the luminance of the planar light source device 50 is decreased based on the reference extension coefficient $\alpha_{0-std}$. Specifically, the luminance of the planar light source device 50 should be enlarged by $(1/\alpha_{0-std})$ times.

With the fourth embodiment as well, in the same way as described in the first embodiment, the maximum value $V_{max}(S)$ of luminosity with the saturation S in the HSV color space enlarged by adding the fourth color (white) as a variable is stored in the signal processing unit 20. That is to say, the dynamic range of the luminosity in the HSV color space is widened by adding the fourth color (white).

Hereafter, description will be made regarding how to obtain the output signal values $X_{1-(p, q)-1}$, $X_{2-(p, q)-1}$, $X_{3-(p, q)-1}$, $X_{1-(p, q)-2}$, $X_{2-(p, q)-2}$, and $X_{3-(p, q)-2}$ in the (p, q)'th pixel group $PG_{(p, q)}$ (extension processing). Note that the following processing will be performed so as to maintain a ratio between the luminance of a first primary color displayed with (first sub-pixel R+fourth sub-pixel W), the luminance of a second primary color displayed with (second sub-pixel G+fourth sub-pixel W), and the luminance of a third primary color displayed with (third sub-pixel B+fourth sub-pixel W) as the entirety of the first pixel and second pixel, i.e., at each pixel group. Moreover, the following processing will be performed so as to keep (maintain) color tone, and further so as to keep (maintain) gradation-luminance property (gamma property, $\gamma$ property).

Process 400

First, the signal processing unit 20 obtains the saturation S and luminosity V(S) at multiple pixel groups $PG_{(p, q)}$ based on sub-pixel input signal values at multiple pixels. Specifically, the signal processing unit 20 obtains $S_{(p, q)-1}$, $S_{(p, q)-2}$, $V(S)_{(p, q)-1}$, and $V(S)_{(p, q)-2}$ from Expression (43-1) through Expression (43-4) based on first sub-pixel input signal values $x_{1-(p, q)-1}$ and $x_{1-(p, q)-2}$, second sub-pixel input signal values $x_{2-(p, q)-1}$ and $x_{2-(p, q)-2}$, and third sub-pixel input signal values $x_{3-(p, q)-1}$ and $x_{3-(p, q)-2}$ as to the (p, q)'th pixel group $PG_{(p, q)}$. The signal processing unit 20 performs this processing as to all of the pixel groups $PG_{(p, q)}$.

$$S_{(p,q)-1} = (\mathrm{Max}_{(p,q)-1} - \mathrm{Min}_{(p,q)-1})/\mathrm{Max}_{(p,q)-1} \quad \text{(43-1)}$$

$$V(S)_{(p,q)-1} = \mathrm{Max}_{(p,q)-1} \quad \text{(43-2)}$$

$$S_{(p,q)-2} = (\mathrm{Max}_{(p,q)-2} - \mathrm{Min}_{(p,q)-2})/\mathrm{Max}_{(p,q)-2} \quad \text{(43-3)}$$

$$V(S)_{(p,q)-2} = \mathrm{Max}_{(p,q)-2} \quad \text{(43-4)}$$

Process 410

Next, the signal processing unit 20 determines, in the same way as with the first embodiment, the reference extension coefficient $\alpha_{0-std}$ and extension coefficient $\alpha_0$ from $\alpha_{min}$ or a predetermined $\beta_0$, or alternatively, based on the stipulations of Expression (15-2), or Expressions (16-1) through (16-5), or Expressions (17-1) through (17-6), for example.

Process 420

The signal processing unit 20 then obtains a signal value $X_{4-(p,q)}$ at the (p, q)'th pixel group $PG_{(p,q)}$ based on at least input signal values $x_{1-(p,q)-1}$, $x_{2-(p,q)-1}$, $x_{3-(p,q)-1}$, $x_{1-(p,q)-2}$, $x_{2-(p,q)-2}$, and $x_{3-(p,q)-3}$. Specifically, with the fourth embodiment, the signal value $X_{4-(p,q)}$ is determined based on $Min_{(p,q)-1}$, $Min_{(p,q)-2}$, extension coefficient $\alpha_0$, and constant $\chi$. More specifically, with the fourth embodiment, the signal value $X_{4-(p,q)}$ is determined based on $$X_{4-(p,q)}=(Max_{(p,q)-1}\cdot\alpha_0+Min_{(p,q)-1}\cdot\alpha_0)/(2\chi) \quad (42\text{-}2)$$

Note that $X_{4-(p,q)}$ is obtained at all of the P×Q pixel groups $PG_{(p,q)}$.

Process 430

Next, the signal processing unit 20 obtains the signal value $X_{1-(p,q)-1}$ at the (p, q)'th pixel group $PG_{(p,q)}$ based on the signal value $x_{1-(p,q)-1}$, extension coefficient $\alpha_0$, and fourth sub-pixel control first signal $SG_{1-(p,q)}$, obtains the signal value $X_{2-(p,q)-1}$ based on the signal value $x_{2-(p,q)-1}$, extension coefficient $\alpha_0$, and fourth sub-pixel control first signal $SG_{1-(p,q)}$, and obtains the signal value $X_{3-(p,q)-1}$ based on the signal value $x_{3-(p,q)-1}$, extension coefficient $\alpha_0$, and fourth sub-pixel control first signal $SG_{1-(p,q)}$. Similarly, the signal processing unit 20 obtains the signal value $X_{1-(p,q)-2}$ based on the signal value $x_{1-(p,q)-2}$, extension coefficient $\alpha_0$, and fourth sub-pixel control second signal $SG_{2-(p,q)}$, obtains the signal value $X_{2-(p,q)-2}$ based on the signal value $x_{2-(p,q)-2}$, extension coefficient $\alpha_0$, and fourth sub-pixel control second signal $SG_{2-(p,q)}$, and obtains the signal value $X_{3-(p,q)-2}$ based on the signal value $x_{3-(p,q)-2}$, extension coefficient $\alpha_0$, and fourth sub-pixel control second signal $SG_{2-(p,q)}$. Note that Process 420 and Process 430 may be executed at the same time, or Process 420 may be executed after execution of Process 430.

Specifically, the signal processing unit 20 obtains the output signal values $X_{1-(p,q)-1}$, $X_{2-(p,q)-1}$, $X_{3-(p,q)-1}$, $X_{1-(p,q)-2}$, $X_{2-(p,q)-2}$, and $X_{3-(p,q)-2}$ at the (p, q)'th pixel group $PG_{(p,q)}$ based on Expression (2-A) through Expression (2-F).

Here, the important point is, as shown in Expressions (41-1), (41-2), and (42-3), that the values of $Min_{(p,q)-1}$ and $Min_{(p,q)-2}$ are extended by $\alpha_0$. In this way, the values of $Min_{(p,q)-1}$ and $Min_{(p,q)-2}$ are extended by $\alpha_0$, and accordingly, not only the luminance of the white display sub-pixel (the fourth sub-pixel W) but also the luminance of the red display sub-pixel, green display sub-pixel, and blue display sub-pixel (first sub-pixel R, second sub-pixel G, and third sub-pixel B) are increased as shown in Expression (2-A) through Expression (2-F). Accordingly, change in color can be suppressed, and also occurrence of a problem wherein dullness of a color occurs can be prevented in a sure manner. Specifically, as compared to a case where the values of $Min_{(p,q)-1}$ and $Min_{(p,q)-2}$ are not extended, the luminance of the pixel is extended $\alpha_0$ times by the values of $Min_{(p,q)-1}$ and $Min_{(p,q)-2}$ being extended by $\alpha_0$. Accordingly, this is optimum, for example, in a case where image display of still images or the like can be performed with high luminance.

Figure 19:
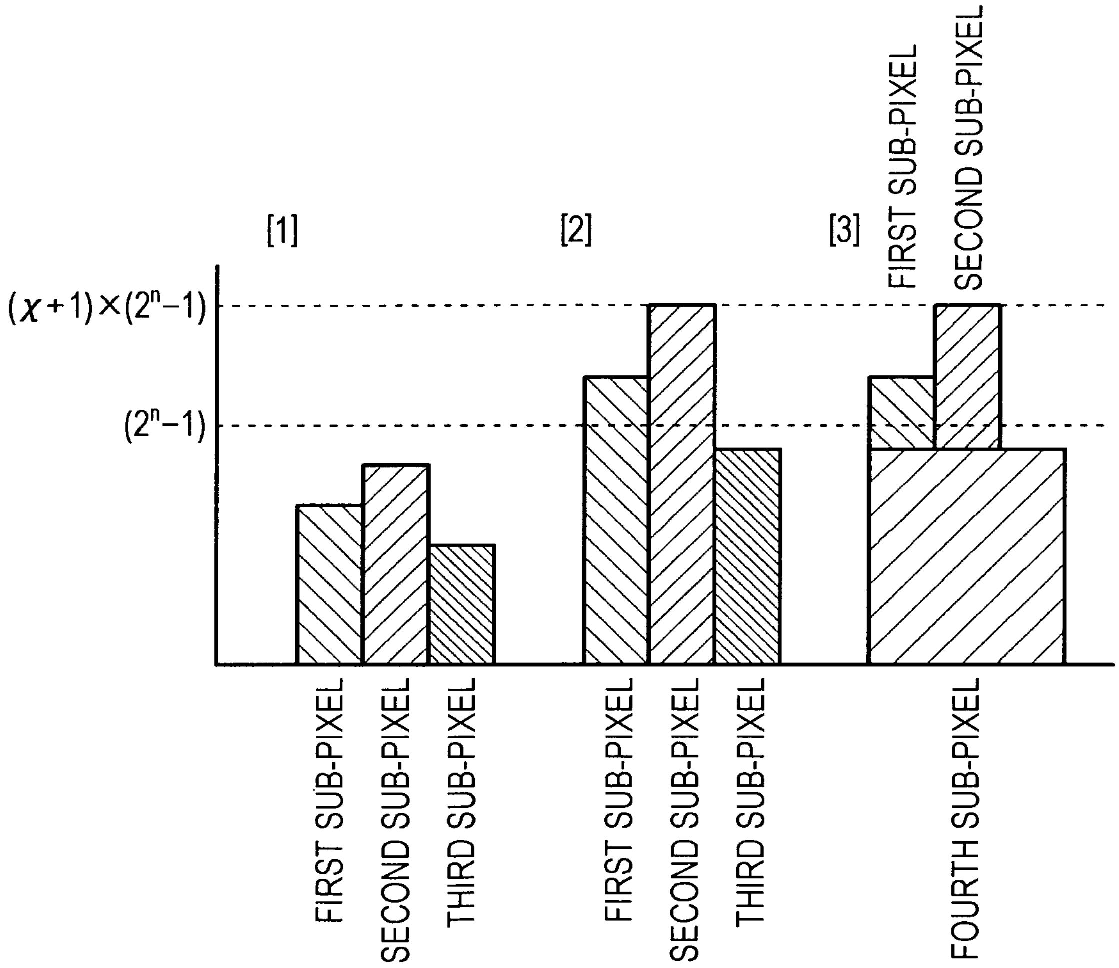
FIG. 19 is a diagram schematically illustrating an input signal value and an output signal value at extension processing of an image display device driving method and an image display device assembly driving method according the fourth embodiment.

The extension processing according to the image display device driving method and the image display device assembly driving method according to the fourth embodiment will be described with reference to FIG. 19. Here, FIG. 19 is a diagram schematically illustrating input signal values and output signal values. In FIG. 19, the input signal values of a set of a first sub-pixel R, a second sub-pixel G, and a third sub-pixel B are shown in [1]. Also, a state in which the extension processing is being performed (an operation for obtaining product between an input signal value and the extension coefficient $\alpha_0$) is shown in [2]. Further, a state after the extension processing was performed (a state in which the output signal values $X_{1-(p,q)}$, $X_{2-(p,q)}$, $X_{3-(p,q)}$, and $X_{4-(p,q)}$ have been obtained) is shown in [3]. With the example shown in FIG. 19, the maximum realizable luminance is obtained at the second sub-pixel G.

With the image display device driving method or image display device assembly driving method according to the fourth embodiment, at the signal processing unit 20, the fourth sub-pixel output signal is obtained based on the fourth sub-pixel control first signal value $SG_{1-(p,q)}$ and fourth sub-pixel control second signal value $SG_{2-(p,q)}$ obtained from the first pixel $Px_1$ of each pixel group PG, and the first sub-pixel input signal, second sub-pixel input signal, and third sub-pixel input signal as to the second pixel $Px_2$, and output. That is to say, the fourth sub-pixel output signal is obtained based on the input signals as to the adjacent first pixel $Px_1$ and second pixel $Px_2$, and accordingly, optimization of the output signal as to the fourth sub-pixel W is realized. Moreover, one fourth sub-pixel W is disposed as to a pixel group PG made up of at least the first pixel $Px_1$ and second pixel $Px_2$, whereby decrease in the area of an opening region in a sub-pixel can be suppressed. As a result thereof, increase in luminance can be realized in a sure manner, and also improvement in display quality can be realized.

For example, if we say that the length of a pixel in the first direction is taken as $L_1$, with techniques disclosed in Japanese Patent No. 3167026 and Japanese Patent No. 3805150, one pixel has to be divided into four sub-pixels, and accordingly, the length of one sub-pixel in the first direction is $(L_1/4=0.25L_1)$. On the other hand, with the fourth embodiment, the length of one sub-pixel in the first direction is $(2L_1/7=0.286L_1)$. Accordingly, the length of one sub-pixel in the first direction increases 14% as compared to the techniques disclosed in Japanese Patent No. 3167026 and Japanese Patent No. 3805150.

Note that, with the fourth embodiment, the signal values $X_{1-(p,q)}$, $X_{2-(p,q)-1}$, $X_{3-(p,q)-1}$, $X_{1-(p,q)-2}$, $X_{2-(p,q)-2}$, $X_{3-(p,q)-2}$ may also be obtained based on $$[x_{1-(p,q)-1}, x_{1-(p,q)-2}, \alpha_0, SG_{1-(p,q)}, \chi]$$

$$[x_{2-(p,q)-1}, x_{2-(p,q)-2}, \alpha_0, SG_{1-(p,q)}, \chi]$$

$$[x_{3-(p,q)-1}, x_{3-(p,q)-2}, \alpha_0, SG_{1-(p,q)}, \chi]$$

$$[x_{1-(p,q)-1}, x_{1-(p,q)-2}, \alpha_0, SG_{2-(p,q)}, \chi]$$

$$[x_{2-(p,q)-1}, x_{2-(p,q)-2}, \alpha_0, SG_{2-(p,q)}, \chi]$$

$$[x_{3-(p,q)-1}, x_{3-(p,q)-2}, \alpha_0, SG_{2-(p,q)}, \chi]$$

respectively.

Fifth Embodiment

A fifth embodiment is a modification of the fourth embodiment. With the fifth embodiment, the array state of a first pixel, a second pixel, and a fourth sub-pixel W is changed. Specifically, with the fifth embodiment, as schematically shown in the layout of pixels in FIG. 16, if we say that the first direction is taken as the row direction, and the second direction is taken as the column direction, a first pixel $Px_1$ in the q'th column (where 1≤q'≤Q−1), and a second pixel $Px_2$ in the $(q'+1)^1$th column adjoin each other, and a fourth sub-pixel W in the q'th column and a fourth sub-pixel W in the (q'+1)'th column do not adjoin each other.

Except for this point, the image display panel, image display device driving method, image display device assembly, and driving method thereof according to the fifth embodiment are the same as those according to the fourth embodiment, and accordingly, detailed description thereof will be omitted.

Sixth Embodiment

A sixth embodiment is also a modification of the fourth embodiment. With the sixth embodiment as well, the array state of a first pixel, a second pixel, and a fourth sub-pixel W is changed. Specifically, with the sixth embodiment, as schematically shown in the layout of pixels in FIG. 17, if we say that the first direction is taken as the row direction, and the second direction is taken as the column direction, a first pixel $Px_1$ in the q'th column (where 1≤q'≤Q−1), and a first pixel $Px_1$ in the (q'+1)'th column adjoin each other, and a fourth sub-pixel W in the q'th column and a fourth sub-pixel W in the (q'+1)'th column adjoin each other. With the example shown in FIGS. 15 and 17, the first sub-pixel R, the second sub-pixel G, the third sub-pixel G, and the fourth sub-pixel W are arrayed in an array similar to a stripe array.

Except for this point, the image display panel, image display device driving method, image display device assembly, and driving method thereof according to the sixth embodiment are the same as those according to the fourth embodiment, and accordingly, detailed description thereof will be omitted.

Seventh Embodiment

Figure 20:
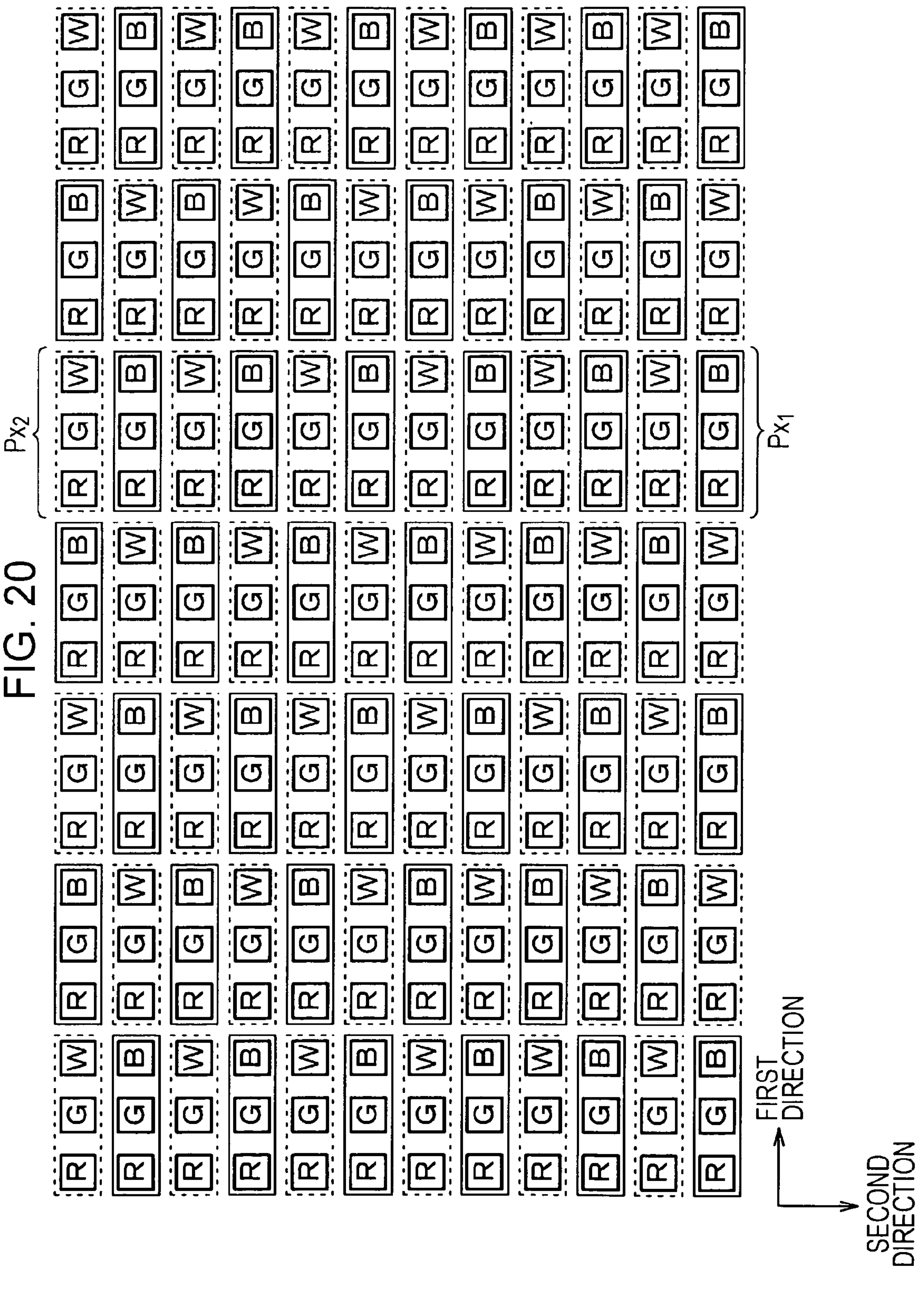
FIG. 20 is a diagram schematically illustrating the layout of each pixel and a pixel group of an image display panel according to a seventh embodiment, an eight embodiment, or a tenth embodiment.
Figure 21:
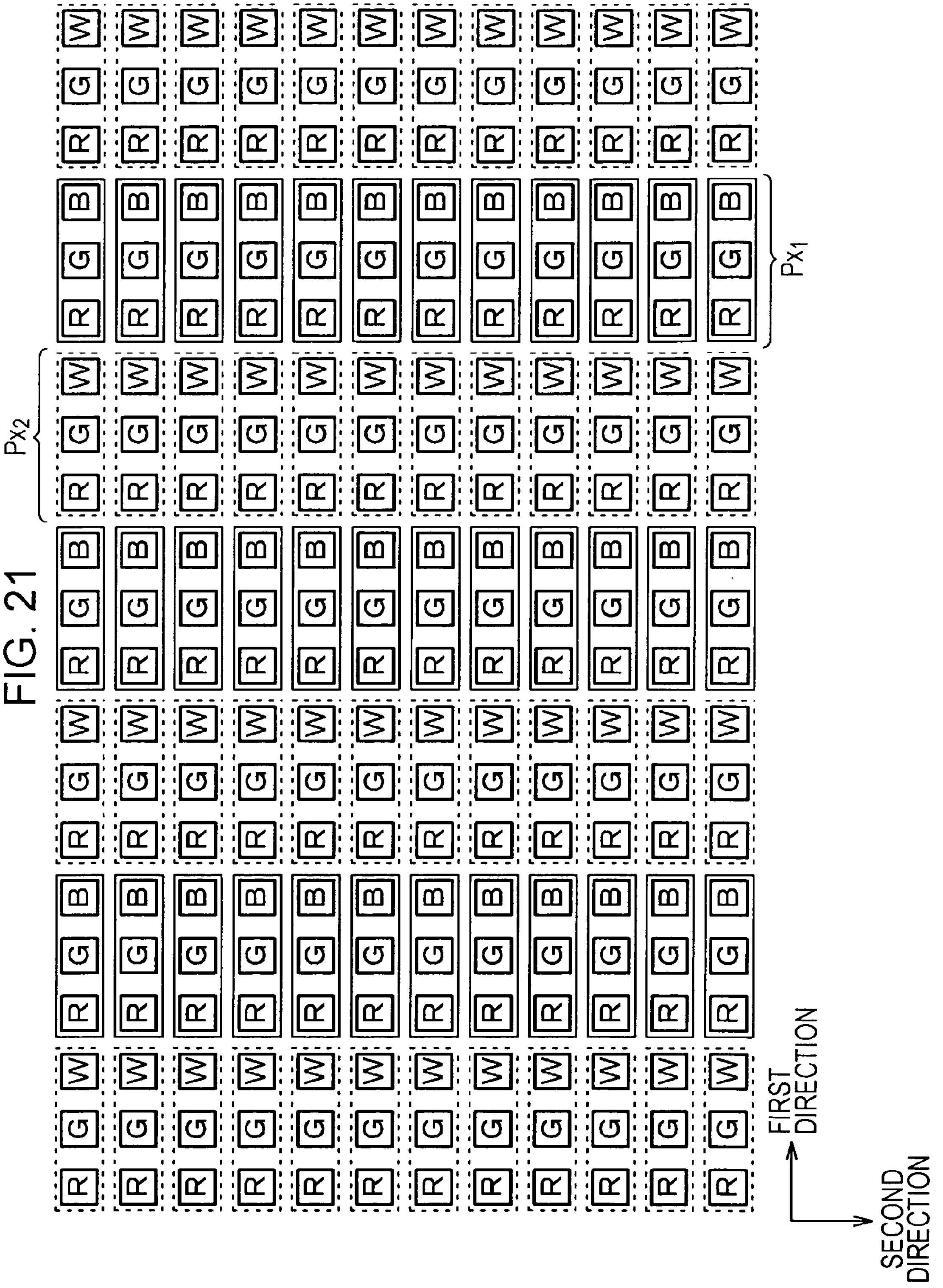
FIG. 21 is a diagram schematically illustrating another layout example of each pixel and a pixel group of an image display panel according to a seventh embodiment, an eight embodiment, or a tenth embodiment.

A seventh embodiment relates to an image display device driving method according to the third mode, eight mode, thirteenth mode, eighteenth mode, and twenty-third mode of the present disclosure, and an image display device assembly driving method according to the third mode, eight mode, thirteenth mode, eighteenth mode, and twenty-third mode of the present disclosure. The layout of each pixel and pixel group in an image display panel according to the seventh embodiment are schematically shown in FIGS. 20 and 21.

With the seventh embodiment, there is provided an image display panel configured of pixel groups PG being arrayed in a two-dimensional matrix shape in total of P×Q pixel groups of P pixel groups in the first direction, and Q pixel groups in the second direction. Each of the pixel groups PG is made up of a first pixel and a second pixel in the first direction. A first pixel $Px_1$ is made up of a first sub-pixel R for displaying a first primary color (e.g., red), a second sub-pixel G for displaying a second primary color (e.g., green), and a third sub-pixel B for displaying a third primary color (e.g., blue), and a second pixel $Px_2$ is made up of a first sub-pixel R for displaying a first primary color (e.g., red), a second sub-pixel G for displaying a second primary color (e.g., green), and a fourth sub-pixel W for displaying a fourth color (e.g., white). More specifically, a first pixel $Px_1$ is made up of a first sub-pixel R for displaying a first primary color, a second sub-pixel G for displaying a second primary color, and a third sub-pixel B for displaying a third primary color being sequentially arrayed, and a second pixel $Px_2$ is made up of a first sub-pixel R for displaying a first primary color, a second sub-pixel G for displaying a second primary color, and a fourth sub-pixel W for displaying a fourth color being sequentially arrayed. A third sub-pixel B making up a first pixel $Px_1$, and a first sub-pixel R making up a second pixel $Px_2$ adjoin each other. Also, a fourth sub-pixel W making up a second pixel $Px_2$, and a first sub-pixel R making up a first pixel $Px_1$ in a pixel group adjacent to this pixel group adjoin each other. Note that a sub-pixel has a rectangle shape, and is disposed such that the longer side of this rectangle is parallel to the second direction, and the shorter side is parallel to the first direction.

Note that, with the seventh embodiment, a third sub-pixel B is taken as a sub-pixel for displaying blue. This is because the visibility of blue is around 1/6 as compared to the visibility of green, and even if the number of sub-pixels for displaying blue is taken as a half of pixels groups, no great problem occurs. This can also be applied to later-described eight and tenth embodiments.

The image display device and image display device assembly according to the seventh embodiment may be taken as the same as one of the image display device and image display device assembly described in the first through third embodiments. Specifically, an image display device 10 according to the seventh embodiment also includes an image display panel and a signal processing unit 20, for example. Also, the image display device assembly according to the seventh embodiment includes the image display device 10, and a planer light source device 50 for irradiating the image display device (specifically, image display panel) from the back face. The signal processing unit 20 and planar light source device 50 according to the seventh embodiment may be taken as the same as the signal processing unit 20 and planar light source device 50 described in the first embodiment. This can also be applied to later-described various embodiments.

With the seventh embodiment, regarding a first pixel $Px_{(p, q)-1}$, a first sub-pixel input signal of which the signal value is $x_{1-(p, q)-1}$, a second sub-pixel input signal of which the signal value is $x_{2-(p, q)-1}$, and a third sub-pixel input signal of which the signal value is $x_{3-(p, q)-1}$ are input to the signal processing unit 20, and regarding a second pixel $Px_{(p, q)-2}$, a first sub-pixel input signal of which the signal value is $x_{1-(p, q)-2}$, a second sub-pixel input signal of which the signal value is $x_{2-(p, q)-2}$, and a third sub-pixel input signal of which the signal value is $x_{3-(p, q)-2}$ are input to the signal processing unit 20.

Also, the signal processing unit 20 outputs, regarding the first pixel $Px_{(p, q)-1}$, a first sub-pixel output signal of which the signal value is $X_{1-(p, q)-1}$ for determining the display gradation of the first sub-pixel R, a second sub-pixel output signal of which the signal value is $X_{2-(p, q)-1}$ for determining the display gradation of the second sub-pixel G, and a third sub-pixel output signal of which the signal value is $X_{3-(p, q)-1}$ for determining the display gradation of the third sub-pixel B, and outputs, regarding the second pixel $Px_{(p, q)-2}$, a first sub-pixel output signal of which the signal value is $X_{1-(p, q)-2}$ for determining the display gradation of the first sub-pixel R, a second sub-pixel output signal of which the signal value is $X_{2-(p, q)-2}$ for determining the display gradation of the second sub-pixel G, and outputs, regarding the fourth sub-pixel, a fourth sub-pixel output signal of which the signal value is $X_{4-(p, q)-2}$ for determining the display gradation of the fourth sub-pixel W.

Further, the signal processing unit 20 obtains a third sub-pixel output signal (signal value $X_{3-(p, q)-1}$) as to the (p, q)'th (where p=1, 2, . . . , P, q=1, 2, . . . , Q) first pixel at the time of counting in the first direction based on at least a third sub-pixel input signal (signal value $x_{3-(p, q)-2}$) as to the (p, q)'th first pixel, and a third sub-pixel input signal (signal value $x_{3-(p, q)-1}$) as to the (p, q)'th second pixel, and outputs the third sub-pixel B of the (p, q)'th first pixel. Also, the signal processing unit 20 obtains the fourth sub-pixel output signal (signal value $x_{4-(p, q)-2}$) as to the (p, q)'th second pixel based on the fourth sub-pixel control second signal (signal value $SG_{2-(p, q)}$) obtained from the first sub-pixel input signal (signal value $x_{1-(p, q)-2}$), second sub-pixel input signal (signal value $x_{2-(p, q)-2}$), and third sub-pixel input signal (signal value $x_{3-(p, q)-2}$) as to the (p, q)'th second pixel, and the fourth sub-pixel control first signal (signal value $SG_{1-(p, q)}$) obtained from the first sub-pixel input signal, second sub-pixel input signal, and third sub-pixel input signal as to an adjacent pixel adjacent to the (p, q)'th second pixel in the first direction, and outputs to the fourth sub-pixel W of the (p, q)'th second pixel.

Here, the adjacent pixel is adjacent to the (p, q)'th second pixel in the first direction, but with the seventh embodiment, specifically, the adjacent pixel is the (p, q)'th first pixel. Accordingly, the fourth sub-pixel control first signal (signal value $SG_{1-(p,q)}$) is obtained based on the first sub-pixel input signal (signal value $X_{1-(p,q)-1}$), second sub-pixel input signal (signal value $x_{3-(p,q)-1}$), and third sub-pixel input signal (signal value $x_{3-(p,q)-1}$).

Note that, with regard to the arrays of first pixels and second pixels, P×Q pixel groups PG in total of P pixel groups in the first direction, and Q pixel groups in the second direction are arrayed in a two-dimensional matrix shape, and as shown in FIG. 20, an arrangement may be employed wherein a first pixel $Px_1$ and a second pixel $Px_2$ are adjacently disposed in the second direction, or as shown in FIG. 21, an arrangement may be employed wherein a first pixel $Px_1$ and a first pixel $Px_1$ are adjacently disposed in the second direction, and also a second pixel $Px_2$ and a second pixel $Px_2$ are adjacently disposed in the second direction.

With the seventh embodiment, specifically, the fourth sub-pixel control first signal value $SG_{1-(p,q)}$ is determined based on $Min_{(p,q)-1}$ and the extension coefficient $\alpha_0$, and the fourth sub-pixel control second signal value $SG_{2-(p,q)}$ is determined based on $Min_{(p,q)-2}$ and the extension coefficient $\alpha_0$. More specifically, Expression (41-1) and Expression (41-2) are employed, in the same way as with the fourth embodiment, as the fourth sub-pixel control first signal value $SG_{1-(p,q)}$ and fourth sub-pixel control second signal value $SG_{2-(p,q)}$.

$$SG_{1-(p,q)}=Min_{(p,q)-1}\cdot\alpha_0 \quad (41\text{-}1)$$

$$SG_{2-(p,q)}=Min_{(p,q)-2}\cdot\alpha_0 \quad (41\text{-}2)$$

Also, with regard to the second pixel $Px_{(p,q)-2}$, the first sub-pixel output signal is obtained based on at least the first sub-pixel input signal and the extension coefficient $\alpha_0$, but the first sub-pixel output signal value $X_{1-(p,q)-2}$ is obtained based on the first sub-pixel input signal value $X_{1-(p,q)-2}$, extension coefficient $\alpha_0$, fourth sub-pixel control second signal value $SG_{2-(p,q)}$ and constant $\chi$, i.e., $$[x_{1-(p,q)-2},\alpha_0,SG_{2-(p,q)},\chi],$$

the second sub-pixel output signal is obtained based on at least the second sub-pixel input signal and the extension coefficient $\alpha_0$, but the second sub-pixel output signal value $X_{2-(p,q)-2}$ is obtained based on the second sub-pixel input signal value $x_{2-(p,q)-2}$, extension coefficient $\alpha_0$, fourth sub-pixel control second signal value $SG_{2-(p,q)}$ and constant $\chi$, i.e., $$[x_{2-(p,q)-2},\alpha_0,SG_{2-(p,q)},\chi],$$

Further, with regard to the first pixel $Px_{(p,q)-1}$, the first sub-pixel output signal is obtained based on at least the first sub-pixel input signal and the extension coefficient $\alpha_0$, but the first sub-pixel output signal value $X_{1-(p,q)-1}$ is obtained based on the first sub-pixel input signal value $X_{1-(p,q)-1}$, extension coefficient $\alpha_0$, fourth sub-pixel control second signal value $SG_{1-(p,q)}$ and constant $\chi$, i.e., $$[x_{1-(p,q)-1},\alpha_0,SG_{1-(p,q)},\chi],$$

the second sub-pixel output signal is obtained based on at least the second sub-pixel input signal and the extension coefficient $\alpha_0$, but the second sub-pixel output signal value $X_{2-(p,q)-1}$ is obtained based on the second sub-pixel input signal value $x_{2-(p,q)-1}$, extension coefficient $\alpha_0$, fourth sub-pixel control first signal value $SG_{1-(p,q)}$ and constant $\chi$, i.e., $$[x_{2-(p,q)-1},\alpha_0,SG_{1-(p,q)},\chi],$$

the third sub-pixel output signal is obtained based on at least the third sub-pixel input signal and the extension coefficient $\alpha_0$, but the third sub-pixel output signal value $X_{3-(p,q)-1}$ is obtained based on the third sub-pixel input signal values $x_{3-(p,q)-1}$ and $x_{3-(p,q)-2}$, extension coefficient $\alpha_0$, fourth sub-pixel control first signal value $SG_{1-(p,q)}$, fourth sub-pixel control second signal value $SG_{2-(p,q)}$, and constant $\chi$, i.e., $$[x_{3-(p,q)-1},x_{3-(p,q)-2},\alpha_0,SG_{1-(p,q)},SG_{2-(p,q)},X_{4-(p,q)-2},\chi].$$

Specifically, with the signal processing unit 20, the output signal values $X_{1-(p,q)-2}$, $X_{2-(p,q)-2}$, $X_{1-(p,q)-1}$, $X_{2-(p,q)-1}$, and $X_{3-(p,q)-1}$ can be determined based on the extension coefficient $\alpha_0$ and constant $\chi$, and more specifically can be obtained from Expressions (3-A) through (3-D), (3-a'), (3-d), and (3-e).

$$X_{1-(p,q)-2}=\alpha_0\cdot x_{1-(p,q)-2}-\chi\cdot SG_{2-(p,q)} \quad (3\text{-A})$$

$$X_{2-(p,q)-2}=\alpha_0\cdot x_{2-(p,q)-2}-\chi\cdot SG_{2-(p,q)} \quad (3\text{-B})$$

$$X_{1-(p,q)-1}=\alpha_0\cdot x_{1-(p,q)-1}-\chi\cdot SG_{1-(p,q)} \quad (3\text{-C})$$

$$X_{2-(p,q)-1}=\alpha_0\cdot x_{2-(p,q)-1}-\chi\cdot SG_{1-(p,q)} \quad (3\text{-D})$$

$$X_{3-(p,q)-1}=(X'_{3-(p,q)-1}+X'_{3-(p,q)-2})/2 \quad (3\text{-a'})$$

where $$X'_{3-(p,q)-1}=\alpha_0\cdot x_{3-(p,q)-1}-\chi\cdot SG_{1-(p,q)} \quad (3\text{-d})$$

$$X'_{3-(p,q)-2}=\alpha_0\cdot x_{3-(p,q)-2}-\chi\cdot SG_{2-(p,q)} \quad (3\text{-e})$$

Also, the signal value $X_{4-(p,q)-2}$ is obtained based on an arithmetic average expression, i.e., in the same way as with the fourth embodiment, Expressions (71-1) and (71-2) similar to Expressions (42-1) and (42-2).

$$X_{4-(p,q)-1} = (SG_{1-(p,q)} + SG_{2-(p,q)})/(2\chi) \quad (71\text{-}1)$$

$$= (Min_{(p,q)-1}\cdot\alpha_0 + Min_{(p,q)-2}\cdot\alpha_0)/(2\chi) \quad (71\text{-}2)$$

Here, the reference extension coefficient $\alpha_{0\text{-}std}$ is determined for each image display frame.

With the seventh embodiment as well, the maximum value $V_{max}(S)$ of luminosity with the saturation S in the HSV color space enlarged by adding the fourth color (white) as a variable is stored in the signal processing unit 20. That is to say, the dynamic range of the luminosity in the HSV color space is widened by adding the fourth color (white).

Hereafter, description will be made regarding how to obtain the output signal values $X_{1-(p,q)-2}$, $X_{2-(p,q)-2}$, $X_{4-(p,q)-2}$, $X_{1-(p,q)-1}$, $X_{2-(p,q)-1}$, and $X_{3-(p,q)-1}$ in the (p, q)'th pixel group $PG_{(p,q)}$ (extension processing). Note that the following processing will be performed so as to maintain a luminance ratio as much as possible as the entirety of first pixels and second pixels, i.e., in each pixel group. Moreover, the following processing will be performed so as to keep (maintain) color tone, and further so as to keep (maintain) gradation-luminance property (gamma property, γ property).

Process 700

First, in the same way as with Process 400 in the fourth embodiment, the signal processing unit 20 obtains the saturation S and luminosity V(S) at multiple pixel groups $PG_{(p,q)}$ based on sub-pixel input signal values at multiple pixels. Specifically, the signal processing unit 20 obtains $S_{(p,q)-1}$, $S_{(p,q)-2}$, $V(S)_{(p,q)-1}$, and $V(S)_{(p,q)-2}$ from Expressions (43-1) through (43-4) based on first sub-pixel input signal values $x_{1-(p,q)-1}$ and $x_{1-(p,q)-2}$, second sub-pixel input signal values $x_{2-(p,q)-1}$ and $x_{2-(p,q)-2}$, and third sub-pixel input signal values $x_{3-(p,q)-1}$ and $x_{3-(p,q)-2}$ as to the (p, q)'th pixel group $PG_{(p,q)}$. The signal processing unit 20 performs this processing as to all of the pixel groups $PG_{(p,q)}$.

Process 710

Next, the signal processing unit 20 determines, in the same way as with the first embodiment, the reference extension coefficient $\alpha_{0\text{-}std}$ and extension coefficient $\alpha_0$ from $\alpha_{min}$ or a predetermined $\beta_0$, or alternatively, based on the stipulations of Expression (15-2), or Expressions (16-1) through (16-5), or Expressions (17-1) through (17-6), for example.

Process 720

The signal processing unit 20 then obtains the fourth sub-pixel control first signal $SG_{1\text{-}(p,q)}$ and fourth sub-pixel control second signal $SG_{2\text{-}(p,q)}$ at each of the pixel groups $PG_{(p,q)}$ based on Expressions (41-1) and (41-2). The signal processing unit 20 performs this processing as to all of the pixel groups $PG_{(p,q)}$. Further, the signal processing unit 20 obtains the fourth sub-pixel output signal value $X_{4\text{-}(p,q)\text{-}2}$ based on Expression (71-2). Also, signal processing unit 20 obtains $X_{1\text{-}(p,q)\text{-}2}$, $X_{2\text{-}(p,q)\text{-}2}$, $X_{1\text{-}(p,q)\text{-}1}$, $X_{2\text{-}(p,q)\text{-}1}$, and $X_{3\text{-}(p,q)\text{-}1}$ based on Expressions (3-A) through (3-D) and Expressions (3-a'), (3-d), and (3-e). The signal processing unit 20 performs this operation as to all of the P×Q pixel groups $PG_{(p,q)}$. The signal processing unit 20 supplies an output signal having an output signal value thus obtained to each sub-pixel.

Note that ratios of output signal values in first pixels and second pixels $$X_{1\text{-}(p,q)\text{-}1}:X_{2\text{-}(p,q)\text{-}1}:X_{3\text{-}(p,q)\text{-}1}$$

$$X_{1\text{-}(p,q)\text{-}2}:X_{2\text{-}(p,q)\text{-}2}$$

somewhat differ from ratios of input signals $$x_{1\text{-}(p,q)\text{-}1}:x_{2\text{-}(p,q)\text{-}1}:x_{3\text{-}(p,q)\text{-}1}$$

$$x_{1\text{-}(p,q)\text{-}2}:x_{2\text{-}(p,q)\text{-}2}$$

and accordingly, in the event of independently viewing each pixel, some difference occurs regarding the color tone of each pixel as to an input signal, but in the event of viewing pixels as a pixel group, no problem occurs regarding the color tone of each pixel group. This can also be applied to the following description.

With the seventh embodiment as well, the important point is, as shown in Expressions (41-1), (41-2), and (71-2), that the values of $Min_{(p,q)\text{-}1}$ and $Min_{(p,q)\text{-}2}$ are extended by $\alpha_0$. In this way, the values of $Min_{(p,q)\text{-}1}$ and $Min_{(p,q)\text{-}2}$ are extended by $\alpha_0$, and accordingly, not only the luminance of the white display sub-pixel (the fourth sub-pixel W) but also the luminance of the red display sub-pixel, green display sub-pixel, and blue display sub-pixel (first sub-pixel R, second sub-pixel G, and third sub-pixel B) are increased as shown in Expressions (3-A) through (3-D) and (3-a'). Accordingly, occurrence of a problem wherein dullness of a color occurs can be prevented in a sure manner. Specifically, as compared to a case where the values of $Min_{(p,q)\text{-}1}$ and $Min_{(p,q)\text{-}2}$ are not extended, the luminance of the pixel is extended $\alpha_0$ times by the values of $Min_{(p,q)\text{-}1}$ and $Min_{(p,q)\text{-}2}$ being extended by $\alpha_0$. Accordingly, this is optimum, for example, in a case where image display of still images or the like can be performed with high luminance. This can also be applied to later-described eighth and tenth embodiments.

Also, with the image display device driving method or image display device assembly driving method according to the seventh embodiment, the signal processing unit 20 obtains the fourth sub-pixel output signal based on the fourth sub-pixel control first signal $SG_{1\text{-}(p,q)}$ and fourth sub-pixel control second signal $SG_{2\text{-}(p,q)}$ obtained from a first sub-pixel input signal, second sub-pixel input signal, and third sub-pixel input signal as to the first pixel $Px_1$ and second pixel $Px_2$ of each pixel group PG, and outputs. That is to say, the fourth sub-pixel output signal is obtained based on input signals as to adjacent first pixel $Px_1$ and second pixel $Px_2$, and accordingly, optimization of an output signal as to the fourth sub-pixel W is realized. Moreover, one third sub-pixel B and one fourth sub-pixel W are disposed as to an image group PG made up of at least a first pixel $Px_1$ and a second pixel $Px_2$, whereby decrease in the area of an opening region in a sub-pixel can further be suppressed. As a result thereof, increase in luminance can be realized in a sure manner. Also, improvement in display quality can be realized.

Incidentally, in the event that difference between the $Min_{(p,q)\text{-}1}$ of the first pixel $Px_{(p,q)\text{-}1}$ and the $Min_{(p,q)\text{-}2}$ of the second pixel $Px_{(p,q)\text{-}2}$ is great, if Expression (71-2) is employed, the luminance of the fourth sub-pixel may not increase up to a desired level. In such a case, it is desirable to obtain the signal value $X_{4\text{-}(p,q)\text{-}2}$ by employing Expression (2-12), (2-13) or (2-14) instead of Expression (71-2). It is desirable to determine what kind of expression is employed for obtaining the signal value $X_{4\text{-}(p,q)}$ as appropriate by experimentally manufacturing an image display device or image display device assembly, and performing image evaluation by an image observer for example.

A relation between input signals and output signals in a pixel group according to the above-described seventh embodiment and next-described eighth embodiment will be shown in the following Table 3.

TABLE 3

[Seventh Embodiment]

| | PIXEL GROUP (p, q) | | PIXEL GROUP (p + 1, q) | |
|---|---|---|---|---|
| | PIXEL: FIRST PIXEL | SECOND PIXEL | FIRST PIXEL | SECOND PIXEL |
| INPUT SIGNALS | $x_{1-(p,q)-1}$<br>$x_{2-(p,q)-1}$<br>$x_{3-(p,q)-1}$ | $x_{1-(p,q)-2}$<br>$x_{2-(p,q)-2}$<br>$x_{3-(p,q)-2}$ | $x_{1-(p+1,q)-1}$<br>$x_{2-(p+1,q)-1}$<br>$x_{3-(p+1,q)-1}$ | $x_{1-(p+1,q)-2}$<br>$x_{2-(p+1,q)-2}$<br>$x_{3-(p+1,q)-2}$ |
| OUTPUT SIGNALS | $X_{1-(p,q)-1}$<br>$X_{2-(p,q)-1}$<br>$X_{3-(p,q)-1}$<br>$:(x_{3-(p,q)-1}+x_{3-(p,q)-2})/2$ | $X_{1-(p,q)-2}$<br>$X_{2-(p,q)-2}$<br>$X_{4-(p,q)-2}$<br>$:(SG_{1-(p,q)}+SG_{2-(p,q)})/2$ | $X_{1-(p+1,q)-1}$<br>$X_{2-(p+1,q)-1}$<br>$X_{3-(p+1,q)-1}$<br>$:(x_{3-(p+1,q)-1}+x_{3-(p+1,q)-2})/2$ | $X_{1-(p+1,q)-2}$<br>$X_{2-(p+1,q)-2}$<br>$X_{4-(p+1,q)-2}$<br>$:(SG_{1-(p+1,q)}+SG_{2-(p+1,q)})/2$ |

| | PIXEL GROUP (p + 2, q) | | PIXEL GROUP (p + 3, q) | |
|---|---|---|---|---|
| | PIXEL: FIRST PIXEL | SECOND PIXEL | FIRST PIXEL | SECOND PIXEL |
| INPUT SIGNALS | $x_{1-(p+2,q)-1}$<br>$x_{2-(p+2,q)-1}$<br>$x_{3-(p+2,q)-1}$ | $x_{1-(p+2,q)-2}$<br>$x_{2-(p+2,q)-2}$<br>$x_{3-(p+2,q)-2}$ | $x_{1-(p+3,q)-1}$<br>$x_{2-(p+3,q)-1}$<br>$x_{3-(p+3,q)-1}$ | $x_{1-(p+3,q)-2}$<br>$x_{2-(p+3,q)-2}$<br>$x_{3-(p+3,q)-2}$ |
| OUTPUT SIGNALS | $X_{1-(p+2,q)-1}$<br>$X_{2-(p+2,q)-1}$<br>$X_{3-(p+2,q)-1}$<br>$:(x_{3-(p+2,q)-1}+x_{3-(p+2,q)-2})/2$ | $X_{1-(p+2,q)-2}$<br>$X_{2-(p+2,q)-2}$<br>$X_{4-(p+2,q)-2}$<br>$:(SG_{1-(p+2,q)}+SG_{2-(p+2,q)})/2$ | $X_{1-(p+3,q)-1}$<br>$X_{2-(p+3,q)-1}$<br>$X_{3-(p+3,q)-1}$<br>$:(x_{3-(p+3,q)-1}+x_{3-(p+3,q)-2})/2$ | $X_{1-(p+3,q)-2}$<br>$X_{2-(p+3,q)-2}$<br>$X_{4-(p+3,q)-2}$<br>$:(SG_{1-(p+3,q)}+SG_{2-(p+3,q)})/2$ |

[Eighth Embodiment]

| | PIXEL GROUP (p, q) | | PIXEL GROUP (p + 1, q) | |
|---|---|---|---|---|
| | PIXEL: FIRST PIXEL | SECOND PIXEL | FIRST PIXEL | SECOND PIXEL |
| INPUT SIGNALS | $x_{1-(p,q)-1}$<br>$x_{2-(p,q)-1}$<br>$x_{3-(p,q)-1}$ | $x_{1-(p,q)-2}$<br>$x_{2-(p,q)-2}$<br>$x_{3-(p,q)-2}$ | $x_{1-(p+1,q)-1}$<br>$x_{2-(p+1,q)-1}$<br>$x_{3-(p+1,q)-1}$ | $x_{1-(p+1,q)-2}$<br>$x_{2-(p+1,q)-2}$<br>$x_{3-(p+1,q)-2}$ |

TABLE 3-continued

| | | | | |
|---|---|---|---|---|
| OUTPUT SIGNALS | $X_{1-(p,q)-1}$<br>$X_{2-(p,q)-1}$<br>$X_{3-(p,q)-1}$<br>$:(x_{3-(p,q)-1}+x_{3-(p,q)-2})/2$ | $X_{1-(p,q)-2}$<br>$X_{2-(p,q)-2}$<br>$X_{4-(p,q)-2}$<br>$:(SG_{2-(p,q)}+SG_{1-(p,q)})/2$ | $X_{1-(p+1,q)-1}$<br>$X_{2-(p+1,q)-1}$<br>$X_{3-(p+1,q)-1}$<br>$:(x_{3-(p+1,q)-1}+x_{3-(p+1,q)-2})/2$ | $X_{1-(p+1,q)-2}$<br>$X_{2-(p+1,q)-2}$<br>$X_{4-(p+1,q)-2}$<br>$:(SG_{2-(p+1,q)}+SG_{1-(p+1,q)})/2$ |

| | PIXEL GROUP | | | |
|---|---|---|---|---|
| | (p + 2, q) | | (p + 3, q) | |
| | PIXEL | | | |
| | FIRST PIXEL | SECOND PIXEL | FIRST PIXEL | SECOND PIXEL |
| INPUT SIGNALS | $x_{1-(p+2,q)-1}$<br>$x_{2-(p+2,q)-1}$<br>$x_{3-(p+2,q)-1}$ | $x_{1-(p+2,q)-2}$<br>$x_{2-(p+2,q)-2}$<br>$x_{3-(p+2,q)-2}$ | $x_{1-(p+3,q)-1}$<br>$x_{2-(p+3,q)-1}$<br>$x_{3-(p+3,q)-1}$ | $x_{1-(p+3,q)-2}$<br>$x_{2-(p+3,q)-2}$<br>$x_{3-(p+3,q)-2}$ |
| OUTPUT SIGNALS | $X_{1-(p+2,q)-1}$<br>$X_{2-(p+2,q)-1}$<br>$X_{3-(p+2,q)-1}$<br>$:(x_{3-(p+2,q)-1}+x_{3-(p+2,q)-2})/2$ | $X_{1-(p+2,q)-2}$<br>$X_{2-(p+2,q)-2}$<br>$X_{4-(p+2,q)-2}$<br>$:(SG_{2-(p+2,q)}+SG_{1-(p+2,q)})/2$ | $X_{1-(p+3,q)-1}$<br>$X_{2-(p+3,q)-1}$<br>$X_{3-(p+3,q)-1}$<br>$:(x_{3-(p+3,q)-1}+x_{3-(p+3,q)-2})/2$ | $X_{1-(p+3,q)-2}$<br>$X_{2-(p+3,q)-2}$<br>$X_{4-(p+3,q)-2}$<br>$:(SG_{2-(p+3,q)}+SG_{1-(p+3,q)})/2$ |

Eighth Embodiment

An eighth embodiment is a modification of the seventh embodiment. With the seventh embodiment, an adjacent pixel has been adjacent to the (p, q)'th second pixel in the first direction. On the other hand, with the eighth embodiment, let us say that an adjacent pixel is adjacent to the (p+1, q)'th first pixel. The pixel layout according to the eight embodiment is the same as with the seventh embodiment, and is the same as schematically shown in FIG. 20 or FIG. 21.

Note that, with the example shown in FIG. 20, a first pixel and a second pixel adjoin each other in the second direction. In this case, in the second direction, a first sub-pixel R making up a first pixel, and a first sub-pixel R making up a second pixel may adjacently be disposed, or may not adjacently be disposed. Similarly, in the second direction, a second sub-pixel G making up a first pixel, and a second sub-pixel G making up a second pixel may adjacently be disposed, or may not adjacently be disposed. Similarly, in the second direction, a third sub-pixel B making up a first pixel, and a fourth sub-pixel W making up a second pixel may adjacently be disposed, or may not adjacently be disposed. On the other hand, with the example shown in FIG. 21, in the second direction, a first pixel and a first pixel are adjacently disposed, and a second pixel and a second pixel are adjacently disposed. In this case as well, in the second direction, a first sub-pixel R making up a first pixel, and a first sub-pixel R making up a second pixel may adjacently be disposed, or may not adjacently be disposed. Similarly, in the second direction, a second sub-pixel G making up a first pixel, and a second sub-pixel G making up a second pixel may adjacently be disposed, or may not adjacently be disposed. Similarly, in the second direction, a third sub-pixel B making up a first pixel, and a fourth sub-pixel W making up a second pixel may adjacently be disposed, or may not adjacently be disposed. These can also be applied to the seventh embodiment or later-described tenth embodiment.

With the signal processing unit 20, in the same way as with the seventh embodiment, a first sub-pixel output signal as to the first pixel $Px_1$ is obtained based on at least a first sub-pixel input signal as to the first pixel $Px_1$ and the extension coefficient $\alpha_0$ to output to the first sub-pixel R of the first pixel $Px_1$, a second sub-pixel output signal as to the first pixel $Px_1$ is obtained based on at least a second sub-pixel input signal as to the first pixel $Px_1$ and the extension coefficient $\alpha_0$ to output to the second sub-pixel G of the first pixel $Px_1$, a first sub-pixel output signal as to the second pixel $Px_2$ is obtained based on at least a first sub-pixel input signal as to the second pixel $Px_2$ and the extension coefficient $\alpha_0$ to output to the first sub-pixel R of the second pixel $Px_2$, and a second sub-pixel output signal as to the second pixel $Px_2$ is obtained based on at least a second sub-pixel input signal as to the second pixel $Px_2$ and the extension coefficient $\alpha_0$ to output to the second sub-pixel G of the second pixel $Px_2$.

Here, with the eighth embodiment, in the same way as with the seventh embodiment, regarding a first pixel $Px_{(p,q)-1}$ making up the (p, q)'th pixel group $PG_{(p,q)}$ (where $1 \le p \le P$, $1 \le q \le Q$), a first sub-pixel input signal of which the signal value is $x_{1-(p,q)-1}$, a second sub-pixel input signal of which the signal value is $x_{2-(p,q)-1}$, and a third sub-pixel input signal of which the signal value is $x_{3-(p,q)-1}$ are input to the signal processing unit 20, and regarding a second pixel $Px_{(p,q)-2}$ making up the (p, q)'th pixel group $PG_{(p,q)}$, a first sub-pixel input signal of which the signal value is $x_{1-(p,q)-2}$, a second sub-pixel input signal of which the signal value is $x_{2-(p,q)-2}$, and a third sub-pixel input signal of which the signal value is $x_{3-(p,q)-2}$ are input to the signal processing unit 20.

Also, in the same way as with the seventh embodiment, the signal processing unit 20 outputs, regarding the first pixel $Px_{(p,q)-1}$ making up the (p, q)'th pixel group $PG_{(p,q)}$, a first sub-pixel output signal of which the signal value is $X_{1-(p,q)-1}$ for determining the display gradation of the first sub-pixel R, a second sub-pixel output signal of which the signal value is $X_{2-(p,q)-1}$ for determining the display gradation of the second sub-pixel G, and a third sub-pixel output signal of which the signal value is $X_{3-(p,q)-1}$ for determining the display gradation of the third sub-pixel B, and outputs, regarding the second pixel $Px_{(p,q)-2}$ making up the (p, q)'th pixel group $PG_{(p,q)}$, a first sub-pixel output signal of which the signal value is $X_{1-(p,q)-2}$ for determining the display gradation of the first sub-pixel R, a second sub-pixel output signal of which the signal value is $X_{2-(p,q)-2}$ for determining the display gradation of the second sub-pixel G, and a fourth sub-pixel output signal of which the signal value is $X_{4-(p,q)-2}$ for determining the display gradation of the fourth sub-pixel W.

With the eighth embodiment, in the same way as with the seventh embodiment, the signal processing unit 20 obtains a third sub-pixel output signal value $X_{3-(p,q)-1}$ as to the (p, q)'th first pixel $Px_{(p,q)-1}$ based on at least a third sub-pixel input signal value $x_{3-(p,q)-1}$ as to the (p, q)'th first pixel $Px_{(p,q)-1}$, and a third sub-pixel input signal value $X_{3-(p,q)-2}$ as to the (p, q)'th second pixel $Px_{(p,q)-2}$ to output to the third sub-pixel B. On the other hand, unlike the seventh embodiment, the signal processing unit 20 obtains a fourth sub-pixel output signal value $X_{4-(p,q)-2}$ as to the (p, q)'th second pixel $Px_2$ based on the fourth sub-pixel control second signal $SG_{2-(p,q)}$ obtained from a first sub-pixel input signal $X_{1-(p,q)-2}$, a second sub-pixel input signal $X_{3-(p,q)-2}$, and a third sub-pixel input signal value $X_{3-(p,q)-2}$ as to the (p, q)'th second pixel $Px_{(p,q)-2}$, and the fourth sub-pixel control first signal $SG_{1-(p,q)}$ obtained from a first sub-pixel input signal $X_{1-(p,q)}$, a second sub-pixel input signal $X_{2-(p,q)}$, and a third sub-pixel input signal value $X_{3-(p,q)}$ as to the (p+1, q)'th first pixel $Px_{(p+1,q)-1}$ to output to the fourth sub-pixel W.

With the eighth embodiment, the output signal values $X_{4-(p,q)-2}$, $X_{1-(p,q)-2}$, $X_{2-(p,q)-2}$, $X_{1-(p,q)-1}$, $X_{2-(p,q)-1}$, and $X_{3-(p,q)-1}$ are obtained from Expressions (71-2), (3-A), (3-B), (3-E), (3-F), (3-a'), (3-f), (3-g), (41'-1), (41'-2), and (41'-3).

$$X_{4-(p,q)-1}=(\mathrm{Min}_{(p,q)-1}\cdot\alpha_0+\mathrm{Min}_{(p,q)-2}\cdot\alpha_0)/(2\chi) \quad (71\text{-}2)$$

$$X_{1-(p,q)-2}=\alpha_0\cdot x_{1-(p,q)-2}-\chi\cdot SG_{2-(p,q)} \quad (3\text{-A})$$

$$X_{2-(p,q)-2}=\alpha_0 \cdot x_{2-(p,q)-2}-\chi \cdot SG_{2-(p,q)} \quad (3\text{-B})$$

$$X_{1-(p,q)-1}=\alpha_0 \cdot x_{1-(p,q)-1}-\chi \cdot SG_{3-(p,q)} \quad (3\text{-E})$$

$$X_{2-(p,q)-1}=\alpha_0 \cdot x_{2-(p,q)-1}-\chi \cdot SG_{3-(p,q)} \quad (3\text{-F})$$

$$X_{3-(p,q)-1}=(X'_{3-(p,q)-1}+X'_{3-(p,q)-2})/2 \quad (3\text{-a'})$$

where $$X'_{3-(p,q)-1}=\alpha_0 \cdot x_{3-(p,q)-1}-\chi \cdot SG_{3-(p,q)} \quad (3\text{-f})$$

$$X'_{3-(p,q)-2}=\alpha_0 \cdot x_{3-(p,q)-2}-\chi \cdot SG_{2-(p,q)} \quad (3\text{-g})$$

$$SG_{2-(p,q)}=\text{Min}_{(p,q)-2} \cdot \alpha_0 \quad (41'\text{-2})$$

$$SG_{1-(p,q)}=\text{Min}_{(p',q)} \cdot \alpha_0 \quad (41'\text{-1})$$

$$SG_{3-(p,q)}=\text{Min}_{(p,q)-1} \cdot \alpha_0 \quad (41'\text{-3})$$

Hereafter, how to obtain output signal values $X_{1-(p,q)-2}$, $X_{2-(p,q)-2}$, $X_{4-(p,q)-2}$, $X_{1-(p,q)-1}$, $X_{2-(p,q)-1}$, and $X_{3-(p,q)-1}$ at the (p, q)'th pixel group $PG_{(p,q)}$ (extension processing) will be described. Note that the following processing will be performed so as to keep (maintain) gradation-luminance property (gamma property, γ property). Also, the following processing will be performed so as to maintain a luminance ratio as much as possible as the entirety of first pixels and second pixels, i.e., in each pixel group. Moreover, the following processing will be performed so as to keep (maintain) color tone as much as possible.

Process 800

First, the signal processing unit 20 obtains the saturation S and luminosity V(S) at multiple pixel groups based on sub-pixel input signal values at multiple pixels. Specifically, the signal processing unit 20 obtains $S_{(p,q)-1}$, $S_{(p,q)-2}$, $V(S)_{(p,q)-1}$, and $V(S)_{(p,q)-2}$ from Expressions (43-1), (43-2), (43-3), and (43-4) based on a first sub-pixel input signal (signal value $x_{1-(p,q)-1}$), a second sub-pixel input signal (signal value $x_{2-(p,q)-1}$), and a third sub-pixel input signal (signal value $x_{3-(p,q)-1}$) as to the (p, q)'th first pixel $Px_{(p,q)-2}$, and a first sub-pixel input signal (signal value $x_{1-(p,q)-2}$), a second sub-pixel input signal (signal value $x_{2-(p,q)-2}$), and a third sub-pixel input signal (signal value $x_{3-(p,q)-2}$) as to the second pixel $Px_{(p,q)-2}$. The signal processing unit 20 performs this processing as to all of the pixel groups.

Process 810

Next, the signal processing unit 20 determines, in the same way as with the first embodiment, the reference extension coefficient $\alpha_{0-std}$ and extension coefficient $\alpha_0$ from $\alpha_{min}$ or a predetermined $\beta_0$, or alternatively, based on the stipulations of Expression (15-2), or Expressions (16-1) through (16-5), or Expressions (17-1) through (17-6), for example.

Process 820

The signal processing unit 20 then obtains the fourth sub-pixel output signal value $x_{4-(p,q)-2}$ as to the (p, q)'th pixel group $PG_{(p,q)}$ based on Expression (71-1). Process 810 and Process 820 may be executed at the same time.

Process 830

Next, the signal processing unit 20 obtains the output signal values $X_{1-(p,q)-2}$, $X_{2-(p,q)-2}$, $X_{1-(p,q)-1}$, $X_{2-(p,q)-1}$, and $X_{3-(p,q)-1}$ as to the (p, q)'th pixel group based on Expressions (3-A), (3-B), (3-E), (3-F), (3-a'), (3-f), (3-g), (41'-1), (41'-2), and (41'-3). Note that Process 820 and Process 830 may be executed at the same time, or Process 820 may be executed after execution of Process 830.

An arrangement may be employed wherein in the event that a relation between the fourth sub-pixel control first signal $SG_{1-(p,q)}$ and the fourth sub-pixel control second signal $SG_{2-(p,q)}$ satisfies a certain condition, for example, the seventh embodiment is executed, and in the event of departing from this certain condition, for example, the eighth embodiment is executed. For example, in the event of performing processing based on $$X_{4-(p,q)-2}=(SG_{1-(p,q)}+SG_{2-(p,q)})/(2\chi),$$

when the value of $|SG_{1-(p,q)}-SG_{2-(p,q)}|$ is equal to or greater than (or equal to or smaller than) a predetermined value $\Delta X_1$, the seventh embodiment should be executed, or otherwise, the eighth embodiment should be executed. Alternatively, for example, when the value of $|SG_{1-(p,q)}-SG_{2-(p,q)}|$ is equal to or greater than (or equal to or smaller than) the predetermined value $\Delta X_1$, a value based on $SG_{1-(p,q)}$ alone is employed as the value of $X_{4-(p,q)-2}$, or a value based on $SG_{2-(p,q)}$ alone is employed, and the seventh embodiment or eighth embodiment can be applied. Alternatively, in each case of a case where the value of $|SG_{1-(p,q)}-SG_{2-(p,q)}|$ is equal to or greater than a predetermined value $\Delta X_2$, and a case where the value of $|SG_{1-(p,q)}-SG_{2-(p,q)}|$ is less than a predetermined value $\Delta X_3$, the seventh embodiment (or eighth embodiment) should be executed, or otherwise, the eighth embodiment (or seventh embodiment) should be executed.

With the seventh embodiment or eighth embodiment, when expressing the array sequence of each sub-pixel making up a first pixel and a second pixel as [(first pixel) (second pixel)], the sequence is [(first sub-pixel R, second sub-pixel G, third sub-pixel B) (first sub-pixel R, second sub-pixel G, fourth sub-pixel W)], or when expressing as [(second pixel) (first pixel)], the sequence is [(fourth sub-pixel Q, second sub-pixel G, first sub-pixel R) (third sub-pixel B, second sub-pixel G, first sub-pixel R)], but the array sequence is not restricted to such an array sequence. For example, as the array sequence of [(first pixel) (second pixel)], [(first sub-pixel R, third sub-pixel B, second sub-pixel G) (first sub-pixel R, fourth sub-pixel, second sub-pixel G)] may be employed.

Figure 22:
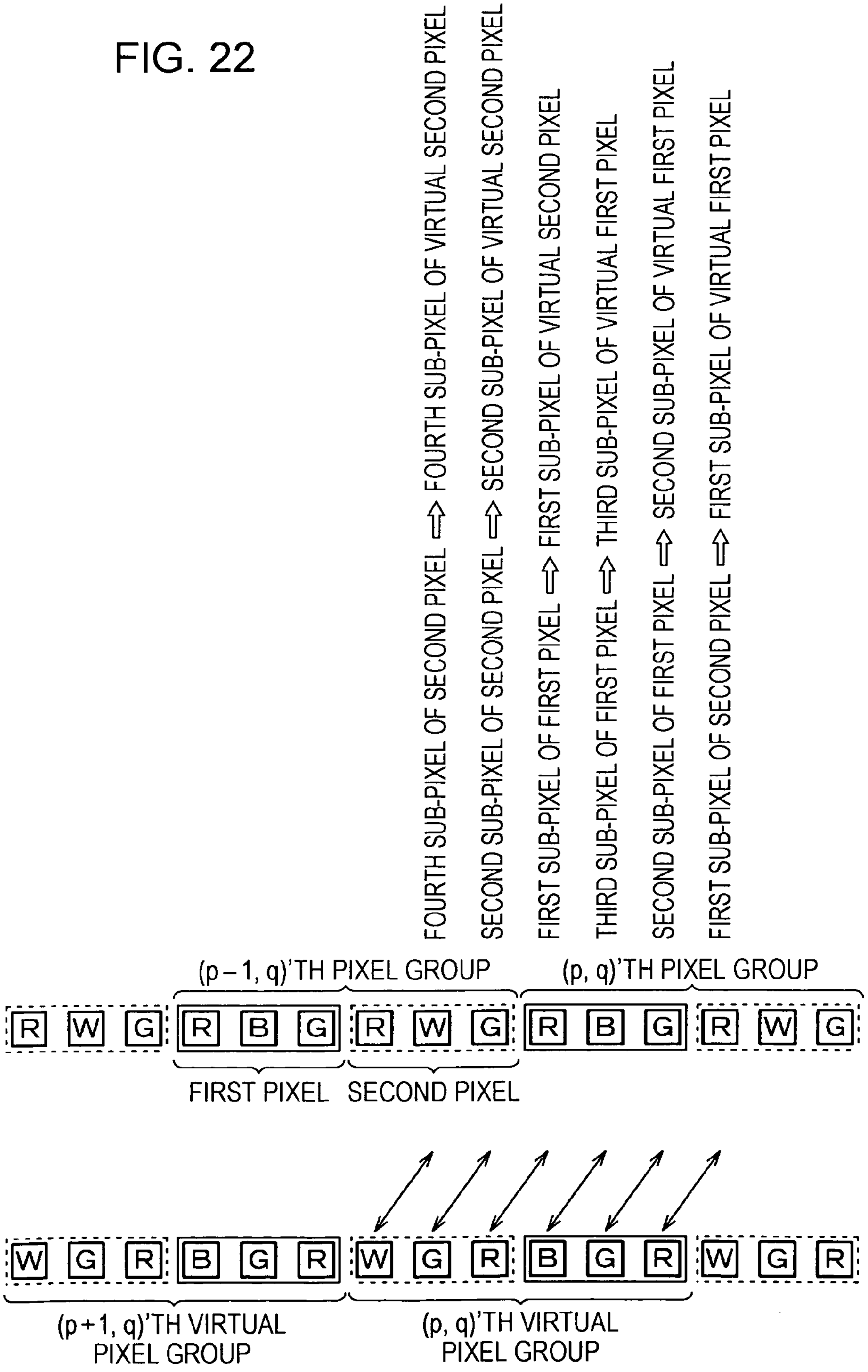
FIG. 22 is, with regard to an eighth embodiment, a conceptual diagram for describing a modification of an array of a first sub-pixel, a second sub-pixel, a third sub-pixel, and a fourth sub-pixel of a first pixel and a second pixel making up a pixel group.

Though such a state according to the eighth embodiment is shown in the upper stage in FIG. 22, if we see this array sequence through new eyes, as shown in a virtual pixel section in the lower stage in FIG. 22, this array sequence is equivalent to a sequence where three pixels of a first sub-pixel R in a first pixel of the (p, q)'th pixel group, a second sub-pixel G and a fourth sub-pixel W in a second pixel of the (p−1, q)'th pixel group are regarded as (first sub-pixel R, second sub-pixel G, fourth sub-pixel W) in a second pixel of the (p, q)'th pixel group in an imaginary manner. Further, this sequence is equivalent to a sequence where three pixels of a first sub-pixel R in a second pixel of the (p, q)'th pixel group, and a second sub-pixel G and a third sub-pixel B in a first pixel are regarded as a first pixel of the (p, q)'th pixel group. Therefore, the eighth embodiment should be applied to a first pixel and a second pixel making these imaginary pixel groups. Also, with the seventh embodiment or the eighth embodiment, though the first direction has been described as a direction from the left hand toward the right hand, the first direction may be taken as a direction from the right hand toward the left hand like the above-described [(second pixel) (first pixel)].

Ninth Embodiment

A ninth embodiment relates to an image display device driving method according to the fourth mode, ninth mode, fourteenth mode, nineteenth mode, and twenty-fourth mode of the present disclosure, and an image display device assembly driving method according to the fourth mode, ninth mode, fourteenth mode, nineteenth mode, and twenty-fourth mode of the present disclosure.

Figure 23:
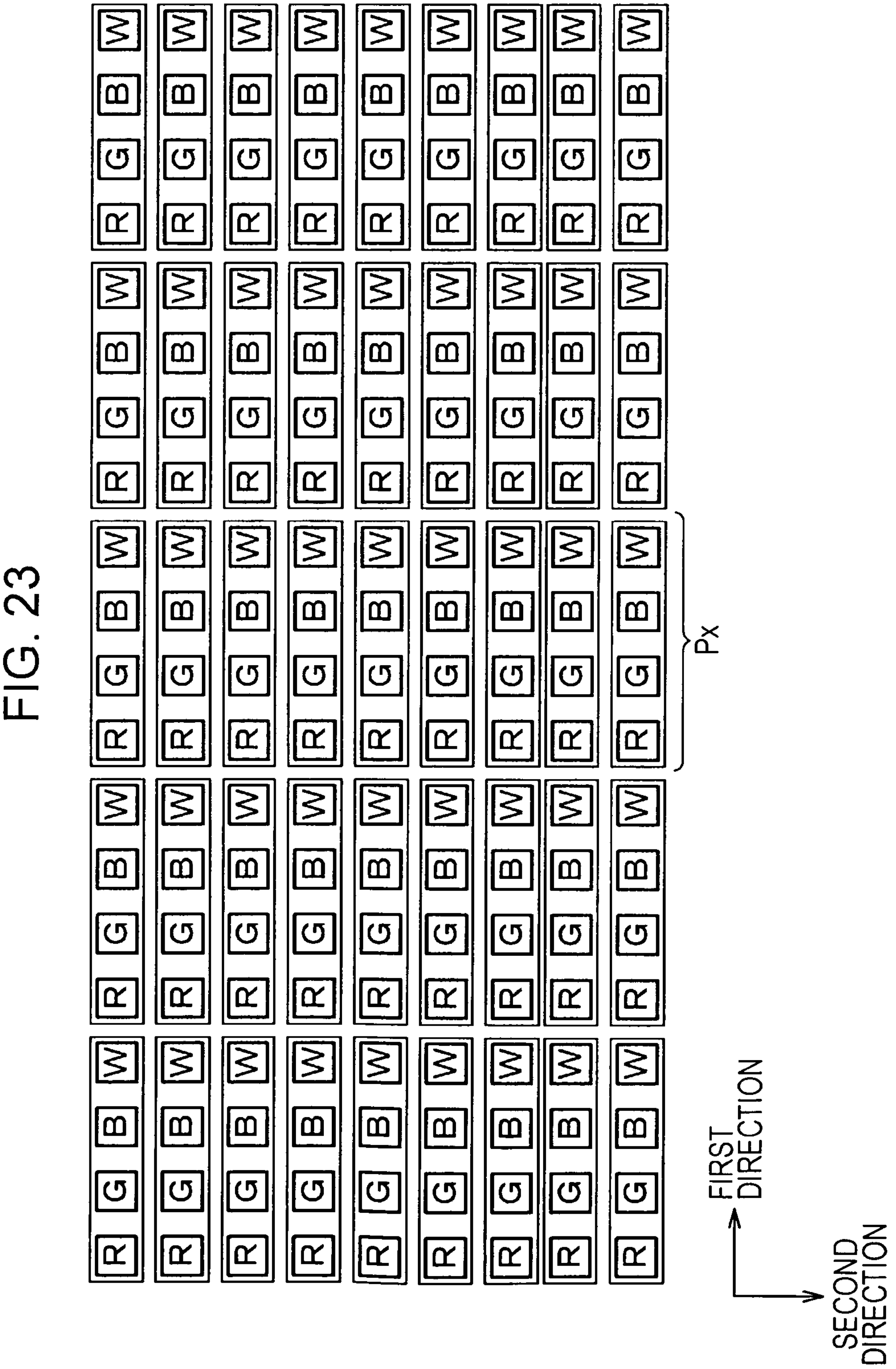
FIG. 23 is a diagram schematically illustrating a layout example of each pixel of an image display device according to a ninth embodiment.

As schematically shown in the layout of pixels in FIG. 23, the image display panel 30 is configured of $P_0 \times Q_0$ pixels Px in total of $P_0$ pixels in the first direction and $Q_0$ pixels in the second direction being arrayed in a two-dimensional shape. Note that, in FIG. 23, a first sub-pixel R, a second sub-pixel G, a third sub-pixel B, and a fourth sub-pixel W are surrounded with a solid line. Each pixel Px is made up of a first sub-pixel R for displaying a first primary color (e.g., red), a second sub-pixel G for displaying a second primary color (e.g., green), a third sub-pixel B for displaying a first primary color (e.g., blue), and a fourth sub-pixel W for displaying a fourth color (e.g., white), and these sub-pixels are arrayed in the first direction. Such a sub-pixel has a rectangle shape, and is disposed such that the longer side of this rectangle is parallel to the second direction, and the shorter side is parallel to the first direction.

The signal processing unit 20 obtains a first sub-pixel output signal (signal value $X_{1-(p, q)}$) as to a pixel $Px_{(p, q)}$ based on at least a first sub-pixel input signal (signal value $x_{1-(p, q)}$) and the extension coefficient $\alpha_0$ to output to the first sub-pixel R, obtains a second sub-pixel output signal (signal value $X_{2-(p, q)}$) based on at least a second sub-pixel input signal (signal value $x_{2-(p, q)}$) and the extension coefficient $\alpha_0$ to output to the second sub-pixel G, and obtains a third sub-pixel output signal (signal value $X_{3-(p, q)}$) based on at least a third sub-pixel input signal (signal value $x_{3-(p, q)}$) and the extension coefficient $\alpha_0$ to output to the third sub-pixel B.

Here, with the ninth embodiment, regarding a pixel $PX_{(p, q)}$ making up the (p, q)'th pixel $Px_{(p, q)}$ (where $1 \le p \le P_0$, $1 \le q \le Q_0$), a first sub-pixel input signal of which the signal value is $x_{1-(p, q)}$, a second sub-pixel input signal of which the signal value is $x_{2-(p, q)}$, and a third sub-pixel input signal of which the signal value is $x_{3-(p, q)}$ are input to the signal processing unit 20. Also, the signal processing unit 20 outputs, regarding the pixel $Px_{(p, q)}$, a first sub-pixel output signal of which the signal value is $X_{1-(p, q)}$ for determining the display gradation of the first sub-pixel R, a second sub-pixel output signal of which the signal value is $X_{2-(p, q)}$ for determining the display gradation of the second sub-pixel G, a third sub-pixel output signal of which the signal value is $X_{3-(p, q)}$ for determining the display gradation of the third sub-pixel B, and a fourth sub-pixel output signal of which the signal value is $X_{4-(p, q)}$ for determining the display gradation of the fourth sub-pixel W.

Further, regarding an adjacent pixel adjacent to the (p, q)'th pixel, a first sub-pixel input signal of which the signal value is $x_{1-(p, q')}$, a second sub-pixel input signal of which the signal value is $x_{2-(p, q')}$, and a third sub-pixel input signal of which the signal value is $x_{3-(p, q')}$ are input to the signal processing unit 20.

Note that, with the ninth embodiment, the adjacent pixel adjacent to the (p, q)'th pixel is taken as the (p, q−1)'th pixel. However, the adjacent pixel is not restricted to this, and may be taken as the (p, q+1)'th pixel, or may be taken as the (p, q−1)'th pixel and the (p, q+1)'th pixel.

Further, the signal processing unit 20 obtains the fourth sub-pixel output signal (signal value $x_{4-(p, q)-2}$) based on the fourth sub-pixel control second signal obtained from the first sub-pixel input signal, second sub-pixel input signal, and third sub-pixel input signal as to the (p, q)'th (where p=1, 2, . . . , $P_0$, q=1, 2, . . . , $Q_0$) pixel at the time of counting in the second direction, and the fourth sub-pixel control first signal obtained from the first sub-pixel input signal, second sub-pixel input signal, and third sub-pixel input signal as to an adjacent pixel adjacent to the (p, q)'th pixel in the second direction, and outputs the obtained fourth sub-pixel output signal to the (p, q)'th pixel.

Specifically, the signal processing unit 20 obtains the fourth sub-pixel control second signal value $SG_{2-(p, q)}$ from the first sub-pixel input signal value $x_{1-(p, q)}$, second sub-pixel input signal value $x_{2-(p, q)}$, and third sub-pixel input signal value $x_{3-(p, q)}$ as to the (p, q)'th pixel $Px_{(p, q)}$. On the other hand, the signal processing unit 20 obtains the fourth sub-pixel control first signal value $SG_{1-(p, q)}$ from the first sub-pixel input signal value $x_{1-(p, q')}$, second sub-pixel input signal value $x_{2-(p, q')}$, and third sub-pixel input signal value $x_{3-(p, q')}$ as to an adjacent pixel adjacent to the (p, q)'th pixel in the second direction. The signal processing unit 20 obtains the fourth sub-pixel output signal based on the fourth sub-pixel control first signal value $SG_{1-(p, q)}$ and fourth sub-pixel control second signal value $SG_{2-(p, q)}$, and outputs the obtained fourth sub-pixel output signal value $X_{4-(p, q)}$ to the (p, q)'th pixel.

With the ninth embodiment as well, the signal processing unit 20 obtains the fourth sub-pixel output signal value $X_{4-(p, q)}$ from Expressions (42-1) and (91). Specifically, the signal processing unit 20 obtains the fourth sub-pixel output signal value $X_{4-(p, q)}$ by arithmetic average.

$$X_{4-(p,q)-1} = (SG_{1-(p,q)} + SG_{2-(p,q)})/(2\chi) \quad (42\text{-}1)$$

$$= (\mathrm{Min}_{(p,q)} \cdot \alpha_0 + \mathrm{Min}_{(p,q')} \cdot \alpha_0)/(2\chi) \quad (91)$$

Note that the signal processing unit 20 obtains the fourth sub-pixel control first signal value $SG_{1-(p, q)}$ based on $\mathrm{Min}_{(p, q')}$ and the extension coefficient $\alpha_0$, and obtains the fourth sub-pixel control second signal value $SG_{2-(p, q)}$ based on $\mathrm{Min}_{(p, q)}$ and the extension coefficient $\alpha_0$. Specifically, the signal processing unit 20 obtains the fourth sub-pixel control first signal value $SG_{1-(p, q)}$ and fourth sub-pixel control second signal value $SG_{2-(p, q)}$ from Expressions (92-1) and (92-2).

$$SG_{1-(p,q)} = \mathrm{Min}_{(p,q')} \cdot \alpha_0 \quad (92\text{-}1)$$

$$SG_{2-(p,q)} = \mathrm{Min}_{(p,q)} \cdot \alpha_0 \quad (92\text{-}2)$$

Also, the signal processing unit 20 can obtain the output signal values $X_{1-(p, q)}$, $X_{2-(p, q)}$, and $X_{3-(p, q)}$ in the first sub-pixel R, second sub-pixel G, and third sub-pixel B based on the extension coefficient $\alpha_0$ and constant $\chi$, and more specifically can obtain from Expressions (1-D) through (1-F).

$$X_{1-(p,q)} = \alpha_0 \cdot x_{1-(p,q)} - \chi \cdot SG_{2-(p,q)} \quad (1\text{-D})$$

$$X_{2-(p,q)} = \alpha_0 \cdot x_{2-(p,q)} - \chi \cdot SG_{2-(p,q)} \quad (1\text{-E})$$

$$X_{3-(p,q)} = \alpha_0 \cdot x_{3-(p,q)} - \chi \cdot SG_{2-(p,q)} \quad (1\text{-F})$$

Hereafter, how to obtain output signal values $X_{1-(p, q)}$, $X_{2-(p, q)}$, $X_{3-(p, q)}$, and $X_{4-(p, q)}$ at the (p, q)'th pixel group $PG_{(p, q)}$ (extension processing) will be described. Note that the following processing will be performed at the entirety of a first pixel and a second pixel, i.e., at each pixel group so as to maintain a ratio of the luminance of the first primary color displayed by (the first sub-pixel R+the fourth sub-pixel W), the luminance of the second primary color displayed by (the second sub-pixel G+the fourth sub-pixel W), and the luminance of the third primary color displayed by (the third sub-pixel B+the fourth sub-pixel W). Moreover, the following processing will be performed so as to keep (maintain) color tone. Further, the following processing will be performed so as to keep (maintain) gradation-luminance property (gamma property, γ property).

Process 900

First, the signal processing unit 20 obtains the saturation S and luminosity V(S) at multiple pixels based on sub-pixel input signal values at multiple pixels. Specifically, the signal processing unit 20 obtains $S_{(p, q)}$, $S_{(p, q')}$, $V(S)_{(p, q)}$, and $V(S)_{(p, q')}$ from expressions similar to Expressions (43-1), (43-2), (43-3), and (43-4) based on a first sub-pixel input signal value $x_{1-(p, q)}$, a second sub-pixel input signal value $x_{2-(p, q)}$, and a third sub-pixel input signal value $x_{3-(p, q)}$ as to the (p, q)'th pixel $PG_{(p, q)}$, and a first sub-pixel input signal value $x_{1-(p, q')}$, a second sub-pixel input signal value $x_{2-(p, q')}$, and a third sub-pixel input signal value $x_{3-(p, q')}$ as to the (p, q−1)'th pixel (adjacent pixel). The signal processing unit 20 performs this processing as to all of the pixels.

Process 910

Next, the signal processing unit 20 determines, in the same way as with the first embodiment, the reference extension coefficient $\alpha_{0\text{-}std}$ and extension coefficient $\alpha_0$ from $\alpha_{min}$ or a predetermined $\beta_0$, or alternatively, based on the stipulations of Expression (15-2), or Expressions (16-1) through (16-5), or Expressions (17-1) through (17-6), for example.

Process 920

The signal processing unit 20 then obtains the fourth sub-pixel output signal value $x_{4-(p, q)}$ as to the (p, q)'th pixel $Px_{(p, q)}$ based on Expressions (92-1), (92-2), and (91). Process 910 and Process 920 may be executed at the same time.

Process 930

Next, the signal processing unit 20 obtains a first sub-pixel output value $X_{1-(p, q)}$ as to the (p, q)'th pixel $Px_{(p, q)}$ based on the input signal value $x_{1-(p, q)}$, extension coefficient $\alpha_0$, and constant $\chi$, obtains a second sub-pixel output value $X_{2-(p, q)}$ based on the input signal value $x_{2-(p, q)}$, extension coefficient $\alpha_0$, and constant $\chi$, and obtains a third sub-pixel output value $X_{3-(p, q)}$ based on the input signal value $x_{3-(p, q)}$, extension coefficient $\alpha_0$, and constant $\chi$. Note that Process 920 and Process 930 may be executed at the same time, or Process 920 may be executed after execution of Process 930.

Specifically, the signal processing unit 20 obtains the output signal values $X_{1-(p, q)}$, $X_{2-(p, q)}$, and $X_{3-(p, q)}$ at the (p, q)'th pixel $Px_{(p, q)}$ based on the above-described Expressions (1-D) through (1-F).

With the image display device assembly driving method according to the ninth embodiment, the output signal values $X_{1-(p, q)}$, $X_{2-(p, q)}$, $X_{3-(p, q)}$ and $X_{4-(p, q)}$ at the (p, q)'th pixel group $PG_{(p, q)}$ are extended $\alpha_0$ times. Therefore, in order to match the luminance of an image generally the same as the luminance of an image in an unextended state, the luminance of the planar light source device 50 should be decreased based on the extension $\alpha_0$. Specifically, the luminance of the planar light source device 50 should be multiplied by $(1/\alpha_{0\text{-}std})$ times. Thus, reduction of power consumption of the planar light source device can be realized.

Tenth Embodiment

A tenth embodiment relates to an image display device driving method according to the fifth mode, tenth mode, fifteenth mode, twentieth mode, and twenty-fifth mode, and an image display device assembly driving method according to the fifth mode, tenth mode, fifteenth mode, twentieth mode, and twenty-fifth mode. The layout of each pixel and pixel group in an image display panel according to the tenth embodiment are the same as with the seventh embodiment, and are the same as schematically shown in FIGS. 20 and 21.

With the tenth embodiment, the image display panel 30 is configured of P×Q pixel groups in total of P pixel groups in the first direction (e.g., horizontal direction), and Q pixel groups in the second direction (e.g., vertical direction) being arrayed in a two-dimensional matrix shape. Note that if we say that the number of pixels making up a pixel group is $p_0$, $p_0$ is 2 ($P_0$=2). Specifically, as shown in FIG. 20 or FIG. 21, with the image display panel 30 according to the tenth embodiment, each pixel group is made up of a first pixel $Px_1$ and a second pixel $Px_2$ in the first direction. The first pixel $Px_1$ is made up of a first sub-pixel R for displaying a first primary color (e.g., red), a second sub-pixel G for displaying a second primary color (e.g., green), and a third sub-pixel B for displaying a third primary color (e.g., blue). On the other hand, the second pixel $Px_2$ is made up of a first sub-pixel R for displaying a first primary color, a second sub-pixel G for displaying a second primary color, and a fourth sub-pixel W for displaying a fourth color (e.g., white). More specifically, the first pixel $Px_1$ is configured of a first sub-pixel R for displaying a first primary color, a second sub-pixel G for displaying a second primary color, and a third sub-pixel B for displaying a third primary color being sequentially arrayed in the first direction, and the second pixel $Px_2$ is configured of a first sub-pixel R for displaying a first primary color, a second sub-pixel G for displaying a second primary color, and a fourth sub-pixel W for displaying a fourth color being sequentially arrayed in the first direction. A third sub-pixel B making up a first pixel $Px_1$, and a first sub-pixel R making up a second pixel $Px_2$ adjoin each other. Also, a fourth sub-pixel W making up a second pixel $Px_2$, and a first sub-pixel R making up a first pixel $Px_1$ in a pixel group adjacent to this pixel group adjoin each other. Note that a sub-pixel has a rectangle shape, and is disposed such that the longer side of this rectangle is parallel to the second direction, and the shorter side is parallel to the first direction. Note that, with the example shown in FIG. 20, a first pixel and a second pixel are adjacently disposed in the second direction. ON the other hand, with the example shown in FIG. 21, in the second direction, a first pixel and a first pixel are adjacently disposed, and a second pixel and a second pixel are adjacently disposed.

The signal processing unit 20 obtains a first sub-pixel output signal as to the first pixel $Px_1$ based on at least a first sub-pixel input signal as to the first pixel $Px_1$ and the extension coefficient $\alpha_0$ to output to the first sub-pixel R of the first pixel $Px_1$, obtains a second sub-pixel output signal as to the first pixel $Px_1$ based on at least a second sub-pixel input signal as to the first pixel $Px_1$ and the extension coefficient $\alpha_0$ to output to the second sub-pixel G of the first pixel $Px_1$, obtains a first sub-pixel output signal as to the second pixel $Px_2$ based on at least a first sub-pixel input signal as to the second pixel $Px_2$ and the extension coefficient $\alpha_0$ to output to the first sub-pixel R of the second pixel $Px_2$, and obtains a second sub-pixel output signal as to the second pixel $Px_2$ based on at least a second sub-pixel input signal as to the second pixel $Px_2$ and the extension coefficient $\alpha_0$ to output to the second sub-pixel G of the second pixel $Px_2$.

Here, with the tenth embodiment, regarding a first pixel $Px_{(p, q)-1}$ making up the (p, q)'th pixel group $PG_{(p, q)}$ (where 1≤p≤P, 1≤q≤Q), a first sub-pixel input signal of which the signal value is $x_{1-(p, q)-1}$, a second sub-pixel input signal of which the signal value is $x_{2-(p, q)-1}$, and a third sub-pixel input signal of which the signal value is $x_{3-(p, q)-1}$ are input to the signal processing unit 20, and regarding a second pixel $Px_{(p, q)-2}$ making up the (p, q)'th pixel group $PG_{(p, q)}$, a first sub-pixel input signal of which the signal value is $x_{1-(p, q)-2}$, a second sub-pixel input signal of which the signal value is $x_{2-(p, q)-2}$, and a third sub-pixel input signal of which the signal value is $x_{3-(p, q)-2}$ are input to the signal processing unit 20.

Also, with the tenth embodiment, the signal processing unit 20 outputs, regarding the first pixel $Px_{(p, q)-1}$ making up the (p, q)'th pixel group $PG_{(p, q)}$, a first sub-pixel output signal of which the signal value is $X_{1-(p, q)-1}$ for determining the display gradation of the first sub-pixel R, a second sub-pixel output signal of which the signal value is $X_{2-(p, q)-1}$ for determining the display gradation of the second sub-pixel G, and a third sub-pixel output signal of which the signal value is $X_{3-(p, q)-1}$ for determining the display gradation of the third sub-pixel B, and outputs, regarding the second pixel $Px_{(p, q)-2}$ making up the (p, q)'th pixel group $PG_{(p, q)}$, a first sub-pixel output signal of which the signal value is $X_{1-(p, q)-2}$ for determining the display gradation of the first sub-pixel R, a second sub-pixel output signal of which the signal value is $X_{2-(p, q)-2}$ for determining the display gradation of the second sub-pixel G, and a fourth sub-pixel output signal of which the signal value is $X_{4-(p, q)-2}$ for determining the display gradation of the fourth sub-pixel W.

Also, regarding an adjacent pixel adjacent to the (p, q)'th second pixel, a first sub-pixel input signal of which the signal value is $x_{1-(p, q')}$, a second sub-pixel input signal of which the signal value is $x_{2-(p, q')}$, and a third sub-pixel input signal of which the signal value is $x_{3-(p, q')}$ are input to the signal processing unit 20.

With the tenth embodiment, the signal processing unit 20 obtains the fourth sub-pixel output signal (signal value $X_{4-(p, q)-2}$) based on the fourth sub-pixel control second signal (signal value $SG_{2-(p, q)}$) at the (p, q)'th (where p=1, 2, . . . , P, q=1, 2, . . . , Q) second pixel $Px_{(p, q)-2}$ at the time of counting in the second direction, and the fourth sub-pixel control first signal (signal value $SG_{1-(p, q)}$) at an adjacent pixel adjacent to the (p, q)'th second pixel $Px_{(p, q)-2}$, and outputs to the fourth sub-pixel W of the (p, q)'th second pixel $Px_{(p, q)-2}$. Here, the fourth sub-pixel control second signal (signal value $SG_{2-(p, q)}$) is obtained from the first sub-pixel input signal (signal value $x_{1-(p, q)-2}$), second sub-pixel input signal (signal value $x_{2-(p, q)-2}$), and third sub-pixel input signal (signal value $x_{3-(p, q)-3}$) as to the (p, q)'th second pixel $Px_{(p, q)-2}$. Also, the fourth sub-pixel control first signal (signal value $SG_{1-(p, q)}$) is obtained from the first sub-pixel input signal (signal value $x_{1-(p, q')}$), second sub-pixel input signal (signal value $x_{2-(p, q')}$), and third sub-pixel input signal (signal value $x_{3-(p, q')}$) as to an adjacent pixel adjacent to the (p, q)'th second pixel in the second direction.

Further, the signal processing unit 20 obtains the third sub-pixel output signal (signal value $X_{3-(p, q)-1}$) based on the third sub-pixel input signal (signal value $x_{3-(p, q)-2}$) as to the (p, q)'th second pixel $Px_{(p, q)-2}$, and the third sub-pixel input signal (signal value $x_{3-(p, q)-1}$) as to the (p, q)'th first pixel, and outputs to the (p, q)'th first pixel $PX_{(p, q)-1}$.

Note that, with the tenth embodiment, the adjacent pixel adjacent to the (p, q)'th pixel is taken as the (p, q−1)'th pixel. However, the adjacent pixel is not restricted to this, and may be taken as the (p, q+1)'th pixel, or may be taken as the (p, q−1)'th pixel and the (p, q+1)'th pixel.

With the tenth embodiment, the reference extension coefficient $\alpha_{0-std}$ is determined for each image display frame. Also, the signal processing unit 20 obtains the fourth sub-pixel control first signal value $SG_{1-(p, q)}$ and fourth sub-pixel control second signal value $SG_{2-(p, q)}$ based on Expressions (101-1) and (101-2) equivalent to Expressions (2-1-1) and (2-1-2). Further, the signal processing unit 20 obtains the control signal value (third sub-pixel control signal value) $SG_{3-(p, q)}$ from the following Expression (101-3).

$$SG_{1-(p,q)}=\mathrm{Min}_{(p,q')}\cdot\alpha_0 \quad (101\text{-}1)$$

$$SG_{2-(p,q)}=\mathrm{Min}_{(p,q)-2}\cdot\alpha_0 \quad (101\text{-}2)$$

$$SG_{1-(p,q)}=\mathrm{Min}_{(p,q)-1}\cdot\alpha_0 \quad (101\text{-}3)$$

With the tenth embodiment as well, the signal processing unit 20 obtains the fourth sub-pixel output signal value $X_{4-(p, q)-2}$ from the following arithmetic average Expression (102). Also, the signal processing unit 20 obtains the output signal values $X_{1-(p, q)-2}$, $X_{2-(p, q)-2}$, $X_{1-(p, q)-1}$, $X_{2-(p, q)-1}$, and $X_{3-(p, q)-1}$ from Expressions (3-A), (3-B), (3-E), (3-F), (3-a'), (3-f), (3-g), and (101-3).

$$\begin{aligned} X_{4-(p,q)-2} &= (SG_{1-(p,q)} + SG_{2-(p,q)})/(2\chi) \\ &= (\mathrm{Min}_{(p,q')}\cdot\alpha_0 + \mathrm{Min}_{(p,q)-2}\cdot\alpha_0)/(2\chi) \end{aligned} \quad (102)$$

$$X_{1-(p,q)-2}=\alpha_0\cdot x_{1-(p,q)-2}-\chi\cdot SG_{2-(p,q)} \quad (3\text{-A})$$

$$X_{2-(p,q)-2}=\alpha_0\cdot x_{2-(p,q)-2}-\chi\cdot SG_{2-(p,q)} \quad (3\text{-B})$$

$$X_{1-(p,q)-1}=\alpha_0\cdot x_{1-(p,q)-1}-\chi\cdot SG_{3-(p,q)} \quad (3\text{-E})$$

$$X_{2-(p,q)-1}=\alpha_0\cdot x_{2-(p,q)-1}-\chi\cdot SG_{3-(p,q)} \quad (3\text{-F})$$

$$X_{3-(p,q)-1}=(X'_{3-(p,q)-1}+X'_{3-(p,q)-2})/2 \quad (3\text{-a'})$$

where $$X'_{3-(p,q)-1}=\alpha_0\cdot x_{3-(p,q)-1}-\chi\cdot SG_{3-(p,q)} \quad (3\text{-f})$$

$$X'_{3-(p,q)-2}=\alpha_0\cdot x_{3-(p,q)-2}-\chi\cdot SG_{2-(p,q)} \quad (3\text{-g})$$

Hereafter, how to obtain output signal values $X_{1-(p, q)-2}$, $X_{2-(p, q)-2}$, $X_{4-(p, q)-2}$, $X_{1-(p, q)-1}$, $X_{2-(p, q)-1}$, and $X_{3-(p, q)-1}$ at the (ID, q)'th pixel group $PG_{(p, q)}$ (extension processing) will be described. Note that the following processing will be performed so as to keep (maintain) gradation-luminance property (gamma property, γ property). Also, the following processing will be performed so as to maintain a luminance ratio as much as possible as the entirety of first pixels and second pixels, i.e., in each pixel group. Moreover, the following processing will be performed so as to keep (maintain) color tone as much as possible.

Process 1000

First, in the same way as with the fourth embodiment [Process 400] the signal processing unit 20 obtains the saturation S and luminosity V(S) at multiple pixel groups based on sub-pixel input signal values at multiple pixels. Specifically, the signal processing unit 20 obtains $S_{(p, q)-1}$, $S_{(p, q)-2}$, $V(S)_{(p, q)-1}$, and $V(S)_{(p, q)-2}$ from Expressions (43-1), (43-2), (43-3), and (43-4) based on a first sub-pixel input signal (signal value $x_{1-(p, q)-1}$), a second sub-pixel input signal (signal value $x_{2-(p, q)-1}$), and a third sub-pixel input signal (signal value $x_{3-(p, q)-1}$) as to the (p, q)'th first pixel $Px_{(p, q)-1}$, and a first sub-pixel input signal (signal value $x_{1-(p, q)-2}$), a second sub-pixel input signal (signal value $x_{2-(p, q)-2}$), and a third sub-pixel input signal (signal value $x_{3-(p, q)-2}$) as to the second pixel $Px_{(p, q)-2}$. The signal processing unit 20 performs this processing as to all of the pixel groups.

Process 1010

Next, the signal processing unit 20 determines, in the same way as with the first embodiment, the reference extension coefficient $\alpha_{0-std}$ and extension coefficient $\alpha_0$ from $\alpha_{min}$ or a predetermined $\beta_0$, or alternatively, based on the stipulations of Expression (15-2), or Expressions (16-1) through (16-5), or Expressions (17-1) through (17-6), for example.

Process 1020

The signal processing unit 20 then obtains the fourth sub-pixel output signal value $X_{4-(p, q)-2}$ as to the (p, q)'th pixel group $PG_{(p, q)}$ based on the above-described Expressions (101-1), (101-2), and (102). Process 1010 and Process 1020 may be executed at the same time.

Process 1030

Next, based on Expressions (3-A), (3-B), (3-E), (3-F), (3-a'), (3-f), and (3-g), the signal processing unit 20 obtains a first sub-pixel output value $X_{1-(p, q)-2}$ as to the (p, q)'th second pixel $Px_{(p, q)-2}$ based on the input signal value $x_{1-(p, q)-2}$, extension coefficient $\alpha_0$, and constant $\chi$, obtains a second sub-pixel output value $X_{2-(p, q)-2}$ based on the input signal value $x_{2-(p, q)-2}$, extension coefficient $\alpha_0$, and constant $\chi$, obtains a first sub-pixel output value $X_{1-(p, q)-1}$ as to the (p, q)'th first pixel $Px_{(p, q)-1}$ based on the input signal value $x_{1-(p, q)-1}$, extension coefficient $\alpha_0$, and constant $\chi$, obtains a second sub-pixel output value $x_{2-(p, q)-1}$ based on the input signal value $x_{1-(p, q)-1}$, extension coefficient $\alpha_0$, and constant $\chi$, and obtains a third sub-pixel output value $X_{3-(p, q)-1}$ based on the input signal values $x_{3-(p, q)-1}$ and $x_{3-(p, q)-2}$, extension coefficient $\alpha_0$, and constant $\chi$. Note that Process 1020 and Process 1030 may be executed at the same time, or Process 1020 may be executed after execution of Process 1030.

With the image display device assembly driving method according to the tenth embodiment as well, the output signal values $X_{1-(p, q)-2}$, $X_{2-(p, q)-2}$, $X_{4-(p, q)-2}$, $X_{1-(p, q)-1}$, $X_{2-(p, q)-1}$, and $X_{3-(p, q)-1}$ at the (p, q)'th pixel group $PG_{(p, q)}$ are extended $\alpha_0$ times. Therefore, in order to match the luminance of an image generally the same as the luminance of an image in an unextended state, the luminance of the planar light source device 50 should be decreased based on the extension $\alpha_0$. Specifically, the luminance of the planar light source device 50 should be multiplied by $(1/\alpha_{0\text{-}std})$ times. Thus, reduction of power consumption of the planar light source device can be realized.

Note that ratios of output signal values in first pixels and second pixels $$X_{1-(p,q)-2}:X_{2-(p,q)-2}$$

$$X_{1-(p,q)-1}:X_{2-(p,q)-1}:X_{3-(p,q)-1}$$

somewhat differ from ratios of input signals $$x_{1-(p,q)-2}:x_{2-(p,q)-2}$$

$$x_{1-(p,q)-1}:x_{2-(p,q)-1}:x_{3-(p,q)-1}$$

and accordingly, in the event of independently viewing each pixel, some difference occurs regarding the color tone of each pixel as to an input signal, but in the event of viewing pixels as a pixel group, no problem occurs regarding the color tone of each pixel group.

In the event that a relation between the fourth sub-pixel control first signal $SG_{1-(p, q)}$ and the fourth sub-pixel control second signal $SG_{2-(p, q)}$ departs from a certain condition, the adjacent pixel may be changed. Specifically, in the event that the adjacent pixel is the (p, q−1)'th pixel, the adjacent pixel may be changed to the (p, q+1)'th pixel, or may be changed to the (p, q−1)'th pixel and (p, q+1)'th pixel.

Alternatively, in the event that a relation between the fourth sub-pixel control first signal $SG_{1-(p, q)}$ and the fourth sub-pixel control second signal $SG_{2-(p, q)}$ departs from a certain condition, i.e., when the value of $|SG_{1-(p, q)}-SG_{2-(p, q)}|$ is equal to or greater than (or equal to or smaller than) a predetermined value $\Delta X_1$, a value based on $SG_{1-(p, q)}$ alone is employed as the value of $X_{4-(p, q)-2}$, or a value based on $SG_{2-(p, q)}$ alone is employed, and each embodiment can be applied. Alternatively, in each case of a case where the value of $|SG_{1-(p, q)}-SG_{2-(p, q)}|$ is equal to or greater than a predetermined value $\Delta X_2$, and a case where the value of $|SG_{1-(p, q)}-SG_{2-(p, q)}|$ is less than a predetermined value $\Delta X_3$, an operation for performing processing different from the processing in the tenth embodiment may be executed.

Figure 24:
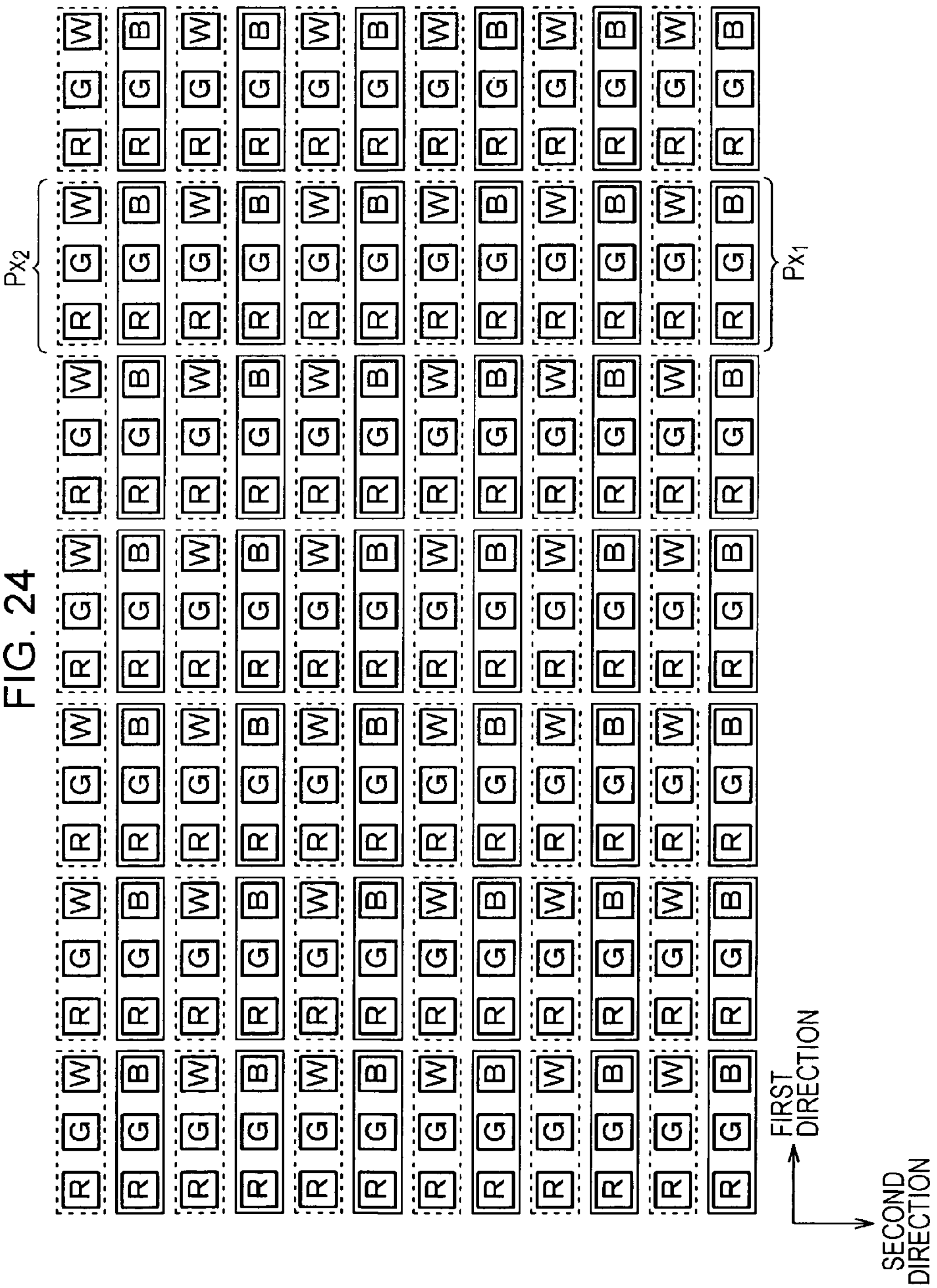
FIG. 24 is a diagram schematically illustrating another layout example of each pixel and a pixel group of an image display device according to a tenth embodiment.

In some instances, after the array of pixel groups described in the tenth embodiment is changed as follows, and substantially, the image display device driving method, and image display device assembly driving method described in the tenth embodiment may be executed. Specifically, as shown in FIG. 24, there may be employed a driving method of an image display device including an image display panel made up of P×Q pixels in total of P pixels in a first direction and Q pixels in a second direction being arrayed in a two-dimensional matrix shape, and a signal processing unit, wherein the image display panel is made up of a first pixel array where a first pixel is arrayed in the first direction, and a second pixel array where a second pixel is arrayed adjacent to and alternately with a first pixel array in the first direction, the first pixel is made up of a first sub-pixel R for displaying a first primary color, a second sub-pixel G for displaying a second primary color, and a third sub-pixel B for displaying a third primary color, the second pixel is made up of a first sub-pixel R for displaying a first primary color, a second sub-pixel G for displaying a second primary color, and a fourth sub-pixel W for displaying a fourth color, the signal processing unit obtains a first sub-pixel output signal as to a first pixel based on at least a first sub-pixel input signal as to the first pixel, and an extension coefficient $\alpha_0$ to output to the first sub-pixel R of the first pixel, obtains a second sub-pixel output signal as to a first pixel based on at least a second sub-pixel input signal as to the first pixel, and the extension coefficient $\alpha_0$ to output to the second sub-pixel G of the first pixel, obtains a first sub-pixel output signal as to a second pixel based on at least a first sub-pixel input signal as to a second pixel, and the extension coefficient $\alpha_0$ to output to the first sub-pixel R of the second pixel, and obtains a second sub-pixel output signal as to a second pixel based on at least a second sub-pixel input signal as to the second pixel, and the extension coefficient $\alpha_0$ to output to the second sub-pixel G of the second pixel, the signal processing unit further obtains a fourth sub-pixel output signal based on a fourth sub-pixel control second signal obtained from a first sub-pixel input signal, a second sub-pixel input signal, and a third sub-pixel input signal as to the (p, q)'th [where p=1, 2, . . . , P, q=1, 2, . . . , Q] second pixel at the time of counting in the second direction, and a fourth sub-pixel control first signal obtained from a first sub-pixel input signal, a second sub-pixel input signal, and a third sub-pixel input signal as to a first pixel adjacent to the (p, q)'th second pixel in the second direction, outputs the obtained fourth sub-pixel output signal to the (p, q)'th second pixel, obtains a third sub-pixel output signal based on at least a third sub-pixel input signal as to the (p, q)'th second pixel, and a third sub-pixel input signal as to a first pixel adjacent to the (p, q)'th second pixel, and outputs the obtained third sub-pixel output signal to the (p, q)'th first pixel.

Though the present disclosure has been described based on the preferred embodiments, the present disclosure is not restricted to these embodiments. An arrangement and configuration of a color liquid crystal display device assembly, a color liquid crystal display device, a planar light source device, a planar light source unit, and a driving circuit described in each of the embodiments is an example, and a member, a material, and so forth making these are also an example, which may be changed as appropriate.

Any two driving methods of a driving method according to the first mode and so forth of the present disclosure, a driving method according to the sixth mode and so forth of the present disclosure, a driving method according to the eleventh mode and so forth of the present disclosure, and a driving method according to the sixteenth mode and so forth of the present disclosure may be combined, any three driving methods may be combined, and all of the four driving methods may be combined. Also, any two driving methods of a driving method according to the second mode and so forth of the present disclosure, a driving method according to the seventh mode and so forth of the present disclosure, a driving method according to the twelfth mode and so forth of the present disclosure, and a driving method according to the seventeenth mode and so forth of the present disclosure may be combined, any three driving methods may be combined, and all of the four driving methods may be combined. Also, any two driving methods of a driving method according to the third mode and so forth of the present disclosure, a driving method according to the eighth mode and so forth of the present disclosure, a driving method according to the thirteenth mode and so forth of the present disclosure, and a driving method according to the eighteenth mode and so forth of the present disclosure may be combined, any three driving methods may be combined, and all of the four driving methods may be combined. Also, any two driving methods of a driving method according to the fourth mode and so forth of the present disclosure, a driving method according to the ninth mode and so forth of the present disclosure, a driving method according to the fourteenth mode and so forth of the present disclosure, and a driving method according to the nineteenth mode and so forth of the present disclosure may be combined, any three driving methods may be combined, and all of the four driving methods may be combined. Also, any two driving methods of a driving method according to the fifth mode and so forth of the present disclosure, a driving method according to the tenth mode and so forth of the present disclosure, a driving method according to the fifteenth mode and so forth of the present disclosure, and a driving method according to the twentieth mode and so forth of the present disclosure may be combined, any three driving methods may be combined, and all of the four driving methods may be combined.

With the embodiments, though multiple pixels (or a set of a first sub-pixel R, a second sub-pixel G, and a third sub-pixel B) of which the saturation S and luminosity V(S) should be obtained are taken as all of P×Q pixels (or a set of a first sub-pixel R, a second sub-pixel G, and a third sub-pixel B), or alternatively taken as all of $P_0 \times Q_0$ pixel groups, the present disclosure is not restricted to this. Specifically, multiple pixels (or a set of a first sub-pixel R, a second sub-pixel G, and a third sub-pixel B) of which the saturation S and luminosity V(S) should be obtained, or pixel groups may be taken as one per four, or one per eight, for example.

With the first embodiment, the reference extension coefficient $\alpha_{0\text{-}std}$ has been obtained based on a first sub-pixel input signal, a second sub-pixel input signal, and a third sub-pixel input signal, but instead of this, the reference extension coefficient $\alpha_{0\text{-}std}$ may be obtained based on one kind of input signal of a first sub-pixel input signal, a second sub-pixel input signal, and a third sub-pixel input signal (or any one kind of input signal of sub-pixel input signals in a set of a first sub-pixel R, a second sub-pixel G, and a third sub-pixel B, or alternatively one kind of input signal of a first input signal, a second input signal, and a third input signal). Specifically, for example, an input signal value $x_{2\text{-}(p,q)}$ as to green can be given as an input signal value of such any one kind of input signal. In the same way as with the embodiments, a signal value $X_{4\text{-}(p,q)}$, and further, signal values $X_{1\text{-}(p,q)}$, $X_{2\text{-}(p,q)}$, and $X_{3\text{-}(p,q)}$ should be obtained from the reference extension coefficient $\alpha_{0\text{-}std}$. Note that, in this case, instead of the $S_{(p,q)}$ and $V(S)_{(p,q)}$ in Expressions (12-1) and (12-2), "1" as the value of $S_{(p,q)}$ and $x_{2\text{-}(p,q)}$ as the value of $V(S)_{(p\text{-}q)}$ (i.e., $x_{2\text{-}(p,q)}$ is used as the value of $Max_{(p,q)}$ in Expression (12-1), and $Max_{(p,q)}$ is set to 0 ($Max_{(p,q)}=0$)) should be used. Similarly, the reference extension coefficient $\alpha_{0\text{-}std}$ may be obtained from the input signal values of any two kinds of input signals of a first sub-pixel R, a second sub-pixel G, and a third sub-pixel B (or any two kinds of input signals of sub-pixel input signals in a set of a first sub-pixel R, a second sub-pixel G, and a third sub-pixel B, or alternatively any two kinds of input signals of a first input signal, a second input signal, and a third input signal). Specifically, for example, an input signal value $x_{1\text{-}(p,q)}$ as to red, and an input signal value $x_{2\text{-}(p,q)}$ as to green can be given. In the same way as with the embodiments, a signal value $X_{4\text{-}(p,q)}$, and further, signal values $X_{1\text{-}(p,q)}$, $X_{2\text{-}(p,q)}$, and $X_{3\text{-}(p,q)}$ should be obtained from the obtained reference extension coefficient $\alpha_{0\text{-}std}$. Note that, in this case, without using the $S_{(p,q)}$ and $V(S)_{(p,q)}$ in Expressions (12-1) and (12-2), as the value of $S_{(p,q)}$, when $x_{1\text{-}(p,q)} \geq x_{2\text{-}(p,q)}$, $$S_{(p,q)}=(x_{1\text{-}(p,q)}-x_{2\text{-}(p,q)})/x_{1\text{-}(p,q)}$$

$$V(S)_{(p,q)}=x_{1\text{-}(p,q)}$$

should be used, and when $x_{1\text{-}(p,q)} < x_{2\text{-}(p,q)}$, $$S_{(p,q)}=(x_{2\text{-}(p,q)}-x_{1\text{-}(p,q)})/x_{2\text{-}(p,q)}$$

$$V(S)_{(p,q)}=x_{2\text{-}(p,q)}$$

should be used. For example, in the event of displaying a one-colored image at the color image display device, it is sufficient to perform such extension processing. This can also be applied to other embodiments. Also, in some instances, the value of the reference extension coefficient $\alpha_{0\text{-}std}$ may be fixed to a predetermined valued, or alternatively, the value of the reference extension coefficient $\alpha_{0\text{-}std}$ may variably be set to a predetermined value depending on the environment where the image display device is disposed, and in these cases, the extension coefficient $\alpha_0$ at each pixel should be determined from a predetermined extension coefficient $\alpha_{0\text{-}std}$, an input signal correction coefficient based on the sub-pixel input signal values at each pixel, and an external light intensity correction coefficient based on external light intensity.

Figure 25:
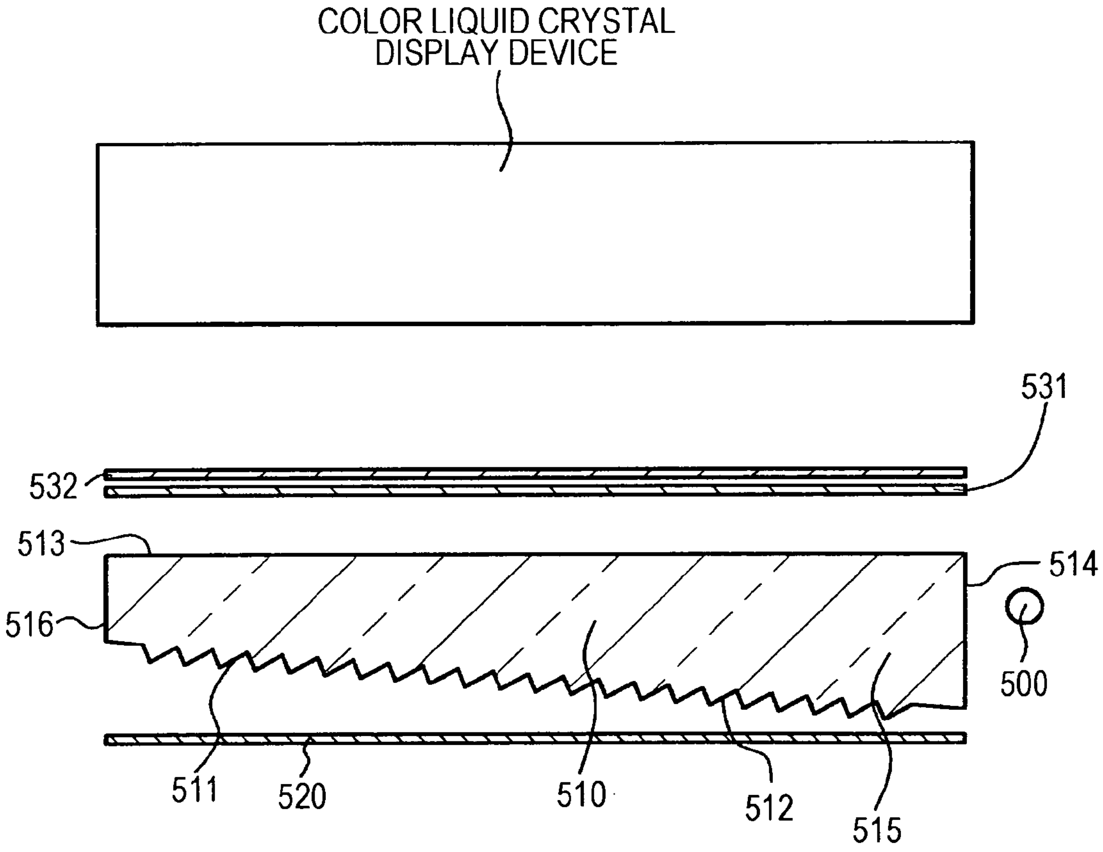
FIG. 25 is a conceptual diagram of an edge light type (side light type) planar light source device.
Figure 26A:
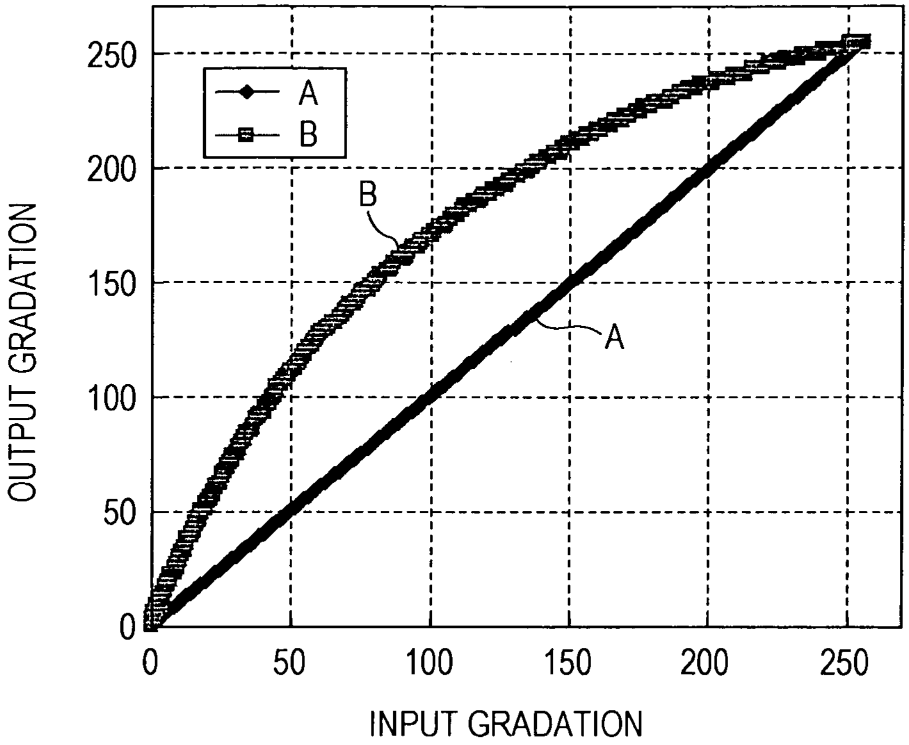
FIGS. 26A and 26B are a graph schematically illustrating output gradation as to input gradation depending on whether or not there is influence of external light, and a graph schematically illustrating output luminance as to input gradation depending on whether or not there is influence of external light, respectively.
Figure 26B:
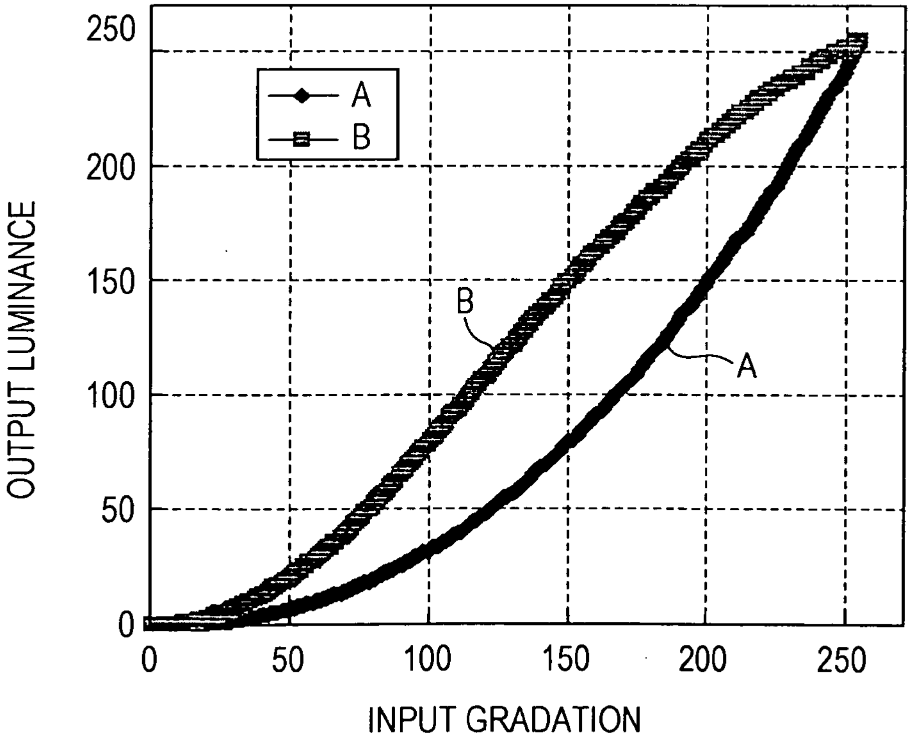

An edge-light-type (side-light-type) planar light source device may be employed. In this case, as shown in a conceptual view in FIG. 25, for example, a light guide plate 510 made up of a polycarbonate resin is has a first face (bottom face) 511, a second face (top face) 513 facing the first face 511, a first side face 514, a second side face 515, a third side face 516 facing the first side face 514, and a fourth side face facing the second side face 515. As a more specific shape of the light guide plate is a wedge-shaped truncated pyramid shape wherein two opposite side faces of the truncated pyramid are equivalent to the first face 511 and the second face 513, and the bottom face of the truncated pyramid is equivalent to the first side face 514. A serrated portion 512 is provided to the surface portion of the first face 511. The cross-sectional shape of a continuous protruding and recessed portion at the time of cutting away the light guide plate 510 at a virtual plane perpendicular to the first face 511 in the first primary color light input direction as to the light guide plate 510 is a triangle. That is to say, the serrated portion 512 provided to the surface portion of the first face 511 has a prism shape. The second face 513 of the light guide plate 510 may be smooth (i.e., may have a mirrored surface), or blasted texturing having optical diffusion effects may be provided thereto (i.e., may have a fine serrated portion 512). A light reflection member 520 is disposed facing the first face 511 of the light guide plate 510. Also, the image display panel (e.g., color liquid crystal display panel) is disposed facing the second face 513 of the light guide plate 510. Further, a light diffusion sheet 531 and a prism sheet 532 are disposed between the image display panel and the second face 513 of the light guide plate 510. The first primary color light emitted from the light source 500 is input from the first side face 514 (e.g., face equivalent to the bottom face of the truncated pyramid) of the light guide plate 510 to the light guide plate

510, collides with the serrated portion 512 of the first face 511, scattered, and emitted from the first face 511, reflected at the light reflection member 520, input to the first face 511 again, emitted from the second face 513, passed through the light diffusion sheet 531 and prism sheet 532, and irradiates on the image display panels according to various embodiments.

A fluorescent lamp or semiconductor laser which emits blue light as first primary color light may be employed instead of a light emitting diode as a light source. In this case, as the wavelength $\lambda_1$ of the first primary color light equivalent to the first primary color (blue) which the fluorescent lamp or semiconductor laser emits, 450 nm can be taken as an example. Also, green emitting florescent substance particles made up of $SrGa_2S_4$:Eu for example may be employed as green emitting particles equivalent to the second primary color emitting particles excited by the fluorescent lamp or semiconductor laser, and red emitting florescent substance particles made up of CaS:Eu for example may be employed as red emitting particles equivalent to the third primary color emitting particles. Alternatively, in the event of employing a semiconductor laser, the wavelength $\lambda_1$ of the first primary color light equivalent to the first primary color (blue) which the semiconductor laser emits, 457 nm can be taken as an example, and in this case, green emitting florescent substance particles made up of $SrGa_2S_4$:Eu for example may be employed as green emitting particles equivalent to the second primary color emitting particles excited by the semiconductor laser, and red emitting florescent substance particles made up of CaS:Eu for example may be employed as red emitting particles equivalent to the third primary color emitting particles. Alternatively, as the light source of the planar light source device, a cold cathode fluorescent lamp (CCFL), a hot cathode fluorescent lamp (HCFL), or an external electrode fluorescent lamp (EEFL) may be employed.

The present disclosure contains subject matter related to that disclosed in Japanese Priority Patent Application JP 2010-161209 filed in the Japan Patent Office on Jul. 16, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A driving method of an image display device including an image display panel configured of pixels being arrayed in a two-dimensional matrix shape, each of which is made up of a first sub-pixel for displaying a first primary color, a second sub-pixel for displaying a second primary color, a third sub-pixel for displaying a third primary color, and a fourth sub-pixel for displaying a fourth color, and a signal processing unit, the method causing the signal processing unit to obtain a first sub-pixel output signal based on at least a first sub-pixel input signal and an extension coefficient $\alpha_0$ to output to the first sub-pixel, to obtain a second sub-pixel output signal based on at least a second sub-pixel input signal and the extension coefficient $\alpha_0$ to output to the second sub-pixel, to obtain a third sub-pixel output signal based on at least a third sub-pixel input signal and the extension coefficient $\alpha_0$ to output to the third sub-pixel, and to obtain a fourth sub-pixel output signal based on the first sub-pixel input signal, the second sub-pixel input signal, and the third sub-pixel input signal to output to the fourth sub-pixel, the method comprising:

obtaining the maximum value $V_{max}$ of luminosity at the signal processing unit with saturation S in the HSV color space enlarged by adding a fourth color, as a variable;

obtaining a reference extension coefficient $\alpha_{0\text{-}std}$ at the signal processing unit based on the maximum value $V_{max}$; and determining an extension coefficient $\alpha_0$ at each pixel according to the following expression (i) using the reference extension coefficient $\alpha_{0\text{-}std}$, an input signal correction coefficient $k_{IS}$ based on the sub-pixel input signal values at each pixel, and an external light intensity correction coefficient $k_{OL}$ based on external light intensity;

$$\alpha_0=\alpha_{0\text{-}std}\times(k_{IS}\times k_{OL}+1) \qquad \text{(i)},$$

wherein the saturation S and luminosity V(S) are represented with $$S=(\text{Max}-\text{Min})/\text{Max}$$

$$V(S)=\text{Max}$$

where Max denotes the maximum value of three sub-pixel input signal values of a first sub-pixel input signal value, a second-sub pixel input signal value, and a third sub-pixel input signal value as to a pixel, and Min denotes the minimum value of three sub-pixel input signal values of the first sub-pixel input signal value, the second-sub pixel input signal value, and the third sub-pixel input signal value as to the pixel.

* * * * *